United States Patent
Tortolani et al.

(10) Patent No.: US 12,473,290 B2
(45) Date of Patent: Nov. 18, 2025

(54) IMIDAZOPYRIDAZINE COMPOUNDS USEFUL AS MODULATORS OF IL-12, IL-23 AND/OR IFN ALPHA RESPONSES

(71) Applicant: BRISTOL-MYERS SQUIBB COMPANY, Princeton, NJ (US)

(72) Inventors: David R. Tortolani, Skillman, NJ (US); Zheming Ruan, Dayton, NJ (US); Michael G. Yang, Narberth, PA (US); Zili Xiao, East Windsor, NJ (US)

(73) Assignee: Bristol Myers-Squibb Company, Princeton, NJ (US)

( * ) Notice: Subject to any disclaimer, the term of this patent is extended or adjusted under 35 U.S.C. 154(b) by 907 days.

(21) Appl. No.: 17/435,819

(22) PCT Filed: Mar. 4, 2020

(86) PCT No.: PCT/US2020/020856
§ 371 (c)(1),
(2) Date: Sep. 2, 2021

(87) PCT Pub. No.: WO2020/180907
PCT Pub. Date: Sep. 10, 2020

(65) Prior Publication Data
US 2023/0183242 A1    Jun. 15, 2023

Related U.S. Application Data

(60) Provisional application No. 62/813,837, filed on Mar. 5, 2019.

(51) Int. Cl.
*C07D 487/04* (2006.01)
*A61P 29/00* (2006.01)
*A61P 37/00* (2006.01)

(52) U.S. Cl.
CPC ................. *C07D 487/04* (2013.01)

(58) Field of Classification Search
CPC . C07D 487/04; C07D 519/00; A61K 31/5025
See application file for complete search history.

(56) References Cited

U.S. PATENT DOCUMENTS

2008/0045536 A1    2/2008  Vaccaro et al.

FOREIGN PATENT DOCUMENTS

| WO | WO-2007038314 A2 * | 4/2007 | ................ A61P 1/00 |
|----|---|---|---|
| WO | 2010042699 A1 | 4/2010 | |
| WO | 15089143 A1 | 6/2015 | |
| WO | 2017087590 A1 | 5/2017 | |

* cited by examiner

Primary Examiner — Rayna Rodriguez
(74) Attorney, Agent, or Firm — Jing G. Sun

(57) ABSTRACT

Compounds having the following formula I: or a stereoisomer or a pharmaceutically-acceptable salt thereof, wherein all substituents are as defined herein, are useful in the modulation of IL-12, IL-23 and/or IFNα by acting on Tyk-2 to cause signal transduction inhibition.

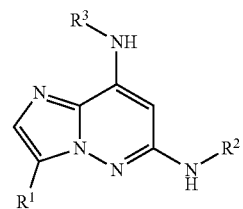

3 Claims, No Drawings

IMIDAZOPYRIDAZINE COMPOUNDS USEFUL AS MODULATORS OF IL-12, IL-23 AND/OR IFN ALPHA RESPONSES

CROSS-REFERENCE TO RELATED APPLICATIONS

This application is a national phase application under 35 U.S.C. § 371 of International Patent Application No. PCT/US2020/020856, filed Mar. 4, 2020, which claims priority to U.S. Provisional Application Ser. 62/813,837, filed Mar. 5, 2019, the contents of which are specifically incorporated fully herein by reference.

This application claims the benefit of U.S. Provisional Application No. 62/813,837, filed Mar. 5, 2019, the disclosure of which is incorporated herein by reference in its entirety.

FIELD OF THE INVENTION

This invention relates to compounds useful in the modulation of IL-12, IL-23 and/or IFNα by acting on Tyk-2 to cause signal transduction inhibition. Provided herein are alkyl-amide-substituted pyridyl compounds, compositions comprising such compounds, and methods of their use. The invention further pertains to pharmaceutical compositions containing at least one compound according to the invention that are useful for the treatment of conditions related to the modulation of IL-12, IL-23 and/or IFNα in a mammal.

BACKGROUND OF THE INVENTION

The heterodimeric cytokines interleukin (IL)-12 and IL-23, which share a common p40 subunit, are produced by activated antigen-presenting cells and are critical in the differentiation and proliferation of Th1 and Th17 cells, two effector T cell lineages which play key roles in autoimmunity. IL-23 is composed of the p40 subunit along with a unique p19 subunit. IL-23, acting through a heterodimeric receptor composed of IL-23R and IL-12Rβ1, is essential for the survival and expansion of Th17 cells which produce pro-inflammatory cytokines such as IL-17A, IL-17F, IL-6 and TNF-α (McGeachy, M. J. et al., "The link between IL-23 and Th17 cell-mediated immune pathologies", Semin. Immunol., 19:372-376 (2007)). These cytokines are critical in mediating the pathobiology of a number of autoimmune diseases, including rheumatoid arthritis, multiple sclerosis, inflammatory bowel disease, and lupus. IL-12, in addition to the p40 subunit in common with IL-23, contains a p35 subunit and acts through a heterodimeric receptor composed of IL-12Rβ1 and IL-12Rβ2. IL-12 is essential for Th1 cell development and secretion of IFNγ, a cytokine which plays a critical role in immunity by stimulating MHC expression, class switching of B cells to IgG subclasses, and the activation of macrophages (Gracie, J. A. et al., "Interleukin-12 induces interferon-gamma-dependent switching of IgG alloantibody subclass", Eur. J. Immunol., 26:1217-1221 (1996); Schroder, K. et al., "Interferon-gamma: an overview of signals, mechanisms and functions", J. Leukoc. Biol., 75(2):163-189 (2004)).

The importance of the p40-containing cytokines in autoimmunity is demonstrated by the discovery that mice deficient in either p40, p19, or IL-23R are protected from disease in models of multiple sclerosis, rheumatoid arthritis, inflammatory bowel disease, lupus and psoriasis, among others (Kyttaris, V. C. et al., "Cutting edge: IL-23 receptor deficiency prevents the development of lupus nephritis in C57BL/6-lpr/lpr mice", J. Immunol., 184:4605-4609 (2010); Hong, K. et al., "IL-12, independently of IFN-gamma, plays a crucial role in the pathogenesis of a murine psoriasis like skin disorder", J. Immunol., 162:7480-7491 (1999); Hue, S. et al., "Interleukin-23 drives innate and T cell-mediated intestinal inflammation", J. Exp. Med., 203:2473-2483 (2006); Cua, D. J. et al., "Interleukin-23 rather than interleukin-12 is the critical cytokine for autoimmune inflammation of the brain", Nature, 421:744-748 (2003); Murphy, C. A. et al., "Divergent pro- and anti-inflammatory roles for IL-23 and IL-12 in joint autoimmune inflammation", J. Exp. Med., 198:1951-1957 (2003)).

In human disease, high expression of p40 and p19 has been measured in psoriatic lesions, and Th17 cells have been identified in active lesions in the brain from MS patients and in the gut mucosa of patients with active Crohn's disease (Lee, E. et al., "Increased expression of interleukin 23 p19 and p40 in lesional skin of patients with psoriasis vulgaris", J. Exp. Med., 199:125-130 (2004); Tzartos, J. S. et al., "Interleukin-17 production in central nervous system infiltrating T cells and glial cells is associated with active disease in multiple sclerosis", Am. J Pathol., 172:146-155 (2008)). The mRNA levels of p19, p40, and p35 in active SLE patients were also shown to be significantly higher compared with those in inactive SLE patients (Huang, X. et al., "Dysregulated expression of interleukin-23 and interleukin-12 subunits in systemic lupus erythematosus patients", Mod. Rheumatol., 17:220-223 (2007)), and T cells from lupus patients have a predominant Th1 phenotype (Tucci, M. et al., "Overexpression of interleukin-12 and T helper 1 predominance in lupus nephritis", Clin. Exp. Immunol., 154:247-254 (2008)).

Moreover, genome-wide association studies have identified a number of loci associated with chronic inflammatory and autoimmune diseases that encode factors that function in the IL-23 and IL-12 pathways. These genes include IL23A, IL12A, IL12B, IL12RB1, IL12RB2, IL23R, JAK2, TYK2, STAT3, and STAT4 (Lees, C. W. et al., "New IBD genetics: common pathways with other diseases", Gut, 60:1739-1753 (2011); Tao, J. H. et al., "Meta-analysis of TYK2 gene polymorphisms association with susceptibility to autoimmune and inflammatory diseases", Mol. Biol. Rep., 38:4663-4672 (2011); Cho, J. H. et al., "Recent insights into the genetics of inflammatory bowel disease", Gastroenterology, 140:1704-1712 (2011)).

Indeed, anti-p40 treatment, which inhibits both IL-12 and IL-23, as well as IL-23-specific anti-p19 therapies have been shown to be efficacious in the treatment of autoimmunity in diseases including psoriasis, Crohn's Disease and psoriatic arthritis (Leonardi, C. L. et al., "PHOENIX 1 study investigators. Efficacy and safety of ustekinumab, a human interleukin-12/23 monoclonal antibody, in patients with psoriasis: 76-week results from a randomized, double-blind, placebo-controlled trial (PHOENIX 1)", Lancet, 371:1665-1674 (2008); Sandborn, W. J. et al., "Ustekinumab Crohn's Disease Study Group. A randomized trial of Ustekinumab, a human interleukin-12/23 monoclonal antibody, in patients with moderate-to-severe Crohn's disease", Gastroenterology, 135:1130-1141 (2008); Gottlieb, A. et al., "Ustekinumab, a human interleukin 12/23 monoclonal antibody, for psoriatic arthritis: randomized, double-blind, placebo-controlled, crossover trial", Lancet, 373:633-640 (2009)). Therefore, agents which inhibit the action of IL-12 and IL-23 may be expected to have therapeutic benefit in human autoimmune disorders.

The Type I group of interferons (IFNs), which include the IFNα members as well as IFNβ, IFNε, IFNκ and IFNω, act through a heterodimer IFNα/β receptor (IFNAR). Type I IFNs have multiple effects in both the innate and adaptive immune systems including activation of both the cellular and humoral immune responses as well as enhancing the expression and release of autoantigens (Hall, J. C. et al., "Type I interferons: crucial participants in disease amplification in autoimmunity", *Nat. Rev. Rheumatol.*, 6:40-49 (2010)).

In patients with systemic lupus erythematosus (SLE), a potentially fatal autoimmune disease, increased serum levels of interferon (IFN)α (a type I interferon) or increased expression of type I IFN-regulated genes (a so-called IFNα signature) in peripheral blood mononuclear cells and in affected organs has been demonstrated in a majority of patients (Bennett, L. et al., "Interferon and granulopoiesis signatures in systemic lupus erythematosus blood", *J. Exp. Med.*, 197:711-723 (2003); Peterson, K. S. et al., "Characterization of heterogeneity in the molecular pathogenesis of lupus nephritis from transcriptional profiles of laser-captured glomeruli", *J. Clin. Invest.*, 113:1722-1733 (2004)), and several studies have shown that serum IFNα levels correlate with both disease activity and severity (Bengtsson, A. A. et al., "Activation of type I interferon system in systemic lupus erythematosus correlates with disease activity but not with antiretroviral antibodies", *Lupus*, 9:664-671 (2000)). A direct role for IFNα in the pathobiology of lupus is evidenced by the observation that the administration of IFNα to patients with malignant or viral diseases can induce a lupus-like syndrome. Moreover, the deletion of the IFNAR in lupus-prone mice provides high protection from autoimmunity, disease severity and mortality (Santiago-Raber, M. L. et al., "Type-I interferon receptor deficiency reduces lupus-like disease in NZB mice", *J. Exp. Med.*, 197:777-788 (2003)), and genome-wide association studies have identified loci associated with lupus that encode factors that function in the type I interferon pathway, including IRF5, IKBKE, TYK2, and STAT4 (Deng, Y. et al., "Genetic susceptibility to systemic lupus erythematosus in the genomic era", *Nat. Rev. Rheumatol.*, 6:683-692 (2010); Sandling, J. K. et al., "A candidate gene study of the type I interferon pathway implicates IKBKE and IL8 as risk loci for SLE", *Eur. J. Hum. Genet.*, 19:479-484 (2011)). In addition to lupus, there is evidence that aberrant activation of type I interferon-mediated pathways are important in the pathobiology of other autoimmune diseases such as Sjögren's syndrome and scleroderma (Båve, U. et al., "Activation of the type I interferon system in primary Sjögren's syndrome: a possible etiopathogenic mechanism", *Arthritis Rheum.*, 52:1185-1195 (2005); Kim, D. et al., "Induction of interferon-alpha by scleroderma sera containing autoantibodies to topoisomerase I: association of higher interferon-alpha activity with lung fibrosis", *Arthritis Rheum.*, 58:2163-2173 (2008)). Therefore, agents which inhibit the action of type I interferon responses may be expected to have therapeutic benefit in human autoimmune disorders.

Tyrosine kinase 2 (Tyk2) is a member of the Janus kinase (JAK) family of nonreceptor tyrosine kinases and has been shown to be critical in regulating the signal transduction cascade downstream of receptors for IL-12, IL-23 and type I interferons in both mice (Ishizaki, M. et al., "Involvement of Tyrosine Kinase-2 in Both the IL-12/Th1 and IL-23/Th17 Axes In vivo", *J. Immunol.*, 187:181-189 (2011); Prchal-Murphy, M. et al., "TYK2 kinase activity is required for functional type I interferon responses in vivo", *PLoS One*, 7:e39141 (2012)) and humans (Minegishi, Y. et al., "Human tyrosine kinase 2 deficiency reveals its requisite roles in multiple cytokine signals involved in innate and acquired immunity", *Immunity*, 25:745-755 (2006)). Tyk2 mediates the receptor-induced phosphorylation of members of the STAT family of transcription factors, an essential signal that leads to the dimerization of STAT proteins and the transcription of STAT-dependent pro-inflammatory genes. Tyk2-deficient mice are resistant to experimental models of colitis, psoriasis and multiple sclerosis, demonstrating the importance of Tyk2-mediated signaling in autoimmunity and related disorders (Ishizaki, M. et al., "Involvement of Tyrosine Kinase-2 in Both the IL-12/Th1 and IL-23/Th17 Axes In vivo", *J. Immunol.*, 187:181-189 (2011); Oyamada, A. et al., "Tyrosine kinase 2 plays critical roles in the pathogenic CD4 T cell responses for the development of experimental autoimmune encephalomyelitis", *J. Immunol.* 183:7539-7546 (2009)).

In humans, individuals expressing an inactive variant of Tyk2 are protected from multiple sclerosis and possibly other autoimmune disorders (Couturier, N. et al., "Tyrosine kinase 2 variant influences T lymphocyte polarization and multiple sclerosis susceptibility", *Brain* 134:693-703 (2011)). Genome-wide association studies have shown other variants of Tyk2 to be associated with autoimmune disorders such as Crohn's Disease, psoriasis, systemic lupus erythematosus, and rheumatoid arthritis, further demonstrating the importance of Tyk2 in autoimmunity (Ellinghaus, D. et al., "Combined Analysis of Genome-wide Association Studies for Crohn Disease and Psoriasis Identifies Seven Shared Susceptibility Loci", *Am. J Hum. Genet.* 90:636-647 (2012); Graham, D. et al., "Association of polymorphisms across the tyrosine kinase gene, TYK2 in UK SLE families", *Rheumatology (Oxford)* 46:927-930 (2007); Eyre, S. et al., "High-density genetic mapping identifies new susceptibility loci for rheumatoid arthritis", *Nat. Genet.* 44:1336-1340 (2012)).

In view of the conditions that may benefit by treatment involving the modulation of cytokines and/or interferons, new compounds capable of modulating cytokines and/or interferons, such as IL-12, IL-23 and/or IFNα, and methods of using these compounds may provide substantial therapeutic benefits to a wide variety of patients in need thereof.

SUMMARY OF THE INVENTION

There is provided a compound of formula (I)

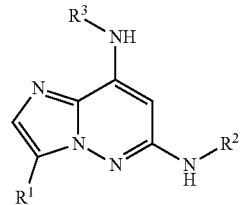

wherein the substitutents are described hereafter which are useful as modulators of IL-12, IL-23 and/or IFNα by inhibiting Tyk2-mediated signal transduction.

The present invention also provides processes and intermediates for making the compounds of the present invention.

The present invention also provides pharmaceutical compositions comprising a pharmaceutically acceptable carrier and at least one of the compounds of the present invention.

The present invention also provides a method for the modulation of IL-12, IL-23 and/or IFNα by inhibiting Tyk-2-mediated signal transduction comprising administering to a host in need of such treatment a therapeutically effective amount of at least one of the compounds of the present invention.

The present invention also provides a method for treating proliferative, metabolic, allergic, autoimmune and inflammatory diseases, comprising administering to a host in need of such treatment a therapeutically effective amount of at least one of the compounds of the present invention.

A preferred embodiment is a method for treating inflammatory and autoimmune diseases or diseases. For the purposes of this invention, an inflammatory and autoimmune disease or disorder includes any disease having an inflammatory or autoimmune component.

An alternate preferred embodiment is a method for treating metabolic diseases, including type 2 diabetes and atherosclerosis.

The present invention also provides the use of the compounds of the present invention for the manufacture of a medicament for the treatment of cancers.

The present invention also provides the compounds of the present invention for use in therapy.

These and other features of the invention will be set forth in the expanded form as the disclosure continues.

DETAILED DESCRIPTION OF THE EMBODIMENTS OF THE INVENTION

In a first aspect of the present invention, there is provided a compound of formula (I)

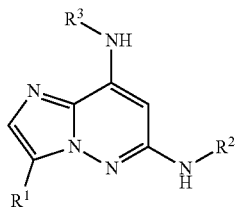

(I)

or stereoisomers, tautomers, pharmaceutically-acceptable salts, solvates, or prodrugs thereof, wherein:
$R^1$ is hydrogen, halogen, CN or $C_{1-3}$ alkyl;
$R^2$ is $C_{1-6}$ alkyl, $C_3$-$C_{12}$ cycloalkyl, $C_3$-$C_8$ cycloalkyl $C_{1-6}$ alkyl, or 5-14 membered heterocycle containing 1-4 heteroatoms selected from N, O, and S, each substituted with 0-3 $R^{2a}$ groups,
$R^{2a}$ is hydrogen, halogen, CN, hydroxy or $C_{1-3}$ alkyl;
$R^3$ is $C_{6-10}$ aryl or 5-14 membered heterocycle containing 1-4 heteroatoms selected from N, O, and S, each of said aryl or heterocycle substituted with 0-4 $R^{3a}$ groups,
$R^{3a}$ is, independently at each occurrence, hydrogen, COOH, $CF_3$, $C_{1-6}$ alkyl, $C_{1-6}$ alkoxy, $C_{1-6}$ haloalkoxy, —$CONR^5R^6$, CO-heterocyclyl substituted with 0-2 $R^a$, —$NR^4R^5$, —NHCO $C_{1-6}$ alkyl, —NHCO $C_{3-8}$ cycloalkyl substituted with 0-2 $R^a$, —NHCO hydroxy $C_{1-6}$ alkyl, —NHCO $C_{5-8}$ aryl, or 5-14 membered heterocycle containing 1-4 heteroatoms selected from N, O, and S substituted with 0-2 $R^a$;
$R^a$ is hydrogen, halogen, $CF_3$, $C_{1-6}$ alkyl, $C_{5-8}$ aryl substituted with 0-2 $R^b$ or 5-14 membered heterocycle containing 1-4 heteroatoms selected from N, O, and S;
$R^b$ is hydrogen, halogen or $C_{1-6}$ alkyl; and
$R^4$ and $R^5$ are independently hydrogen, $C_{1-4}$ alkyl or $C_{1-4}$ alkoxy.

In a second aspect of the invention, there is provided a compound of formula (I)

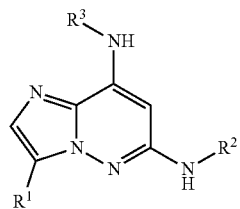

(I)

or stereoisomers, tautomers, pharmaceutically-acceptable salts, solvates, or prodrugs thereof, wherein:
$R^1$ is hydrogen, halogen or CN;
$R^2$ is $C_{1-6}$ alkyl, $C_3$-$C_{12}$ cycloalkyl, $C_3$-$C_8$ cycloalkyl $C_{1-6}$ alkyl, or 5-14 membered heterocycle containing 1-4 heteroatoms selected from N, O, and S, each substituted with 0-3 $R^{2a}$ groups,
$R^{2a}$ is hydrogen, halogen, CN, hydroxy or $C_{1-3}$ alkyl;
$R^3$ is $C_{6-10}$ aryl or 5-14 membered heterocycle containing 1-4 heteroatoms selected from N, O, and S, each of said aryl or heterocycle substituted with 0-4 $R^{3a}$ groups,
$R^{3a}$ is, independently at each occurrence, hydrogen, COOH, $CF_3$, $C_{1-6}$ alkyl, $C_{1-6}$ alkoxy, $C_{1-6}$ haloalkoxy, —$CONR^5R^6$, CO-heterocyclyl substituted with 0-2 $R^a$, —$NR^4R^5$, —NHCO $C_{1-6}$ alkyl, —NHCO $C_{3-8}$ cycloalkyl substituted with 0-2 $R^a$, —NHCO hydroxy $C_{1-6}$ alkyl, —NHCO $C_{5-8}$ aryl, or 5-14 membered heterocycle containing 1-4 heteroatoms selected from N, O, and S substituted with 0-2 $R^a$;
$R^a$ is hydrogen, halogen, $CF_3$, $C_{1-6}$ alkyl, $C_{5-8}$ aryl substituted with 0-2 $R^b$ or 5-14 membered heterocycle containing 1-4 heteroatoms selected from N, O, and S;
$R^b$ is hydrogen, halogen or $C_{1-6}$ alkyl; and
$R^4$ and $R^5$ are independently hydrogen, $C_{1-4}$ alkyl or $C_{1-4}$ alkoxy.

In a third aspect of the invention, there is provided a compound of formula (II)

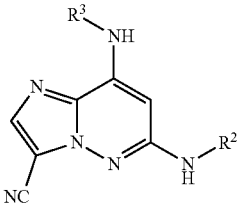

(II)

or stereoisomers, tautomers, pharmaceutically-acceptable salts, solvates, or prodrugs thereof, wherein:
$R^2$ is $C_{1-6}$ alkyl, $C_3$-$C_{12}$ cycloalkyl, $C_3$-$C_8$ cycloalkyl $C_{1-6}$ alkyl, or 5-14 membered heterocycle containing 1-4 heteroatoms selected from N, O, and S, each substituted with 0-3 $R^{2a}$ groups,
$R^{2a}$ is hydrogen, halogen, CN, hydroxy or $C_{1-3}$ alkyl;
$R^3$ is $C_{6-10}$ aryl or 5-14 membered heterocycle containing 1-4 heteroatoms selected from N, O, and S, each of said aryl or heterocycle substituted with 0-4 $R^{3a}$ groups,
$R^{3a}$ is, independently at each occurrence, hydrogen, COOH, $CF_3$, $C_{1-6}$ alkyl, $C_{1-6}$ alkoxy, $C_{1-6}$ haloalkoxy, —$CONR^5R^6$, CO-heterocyclyl substituted with 0-2 $R^a$, —$NR^4R^5$, —NHCO $C_{1-6}$ alkyl, —NHCO $C_{3-8}$ cycloalkyl substituted with 0-2 $R^a$, —NHCO hydroxy $C_{1-6}$ alkyl, —NHCO $C_{5-8}$ aryl, or 5-14 membered heterocycle containing 1-4 heteroatoms selected from N, O, and S substituted with 0-2 $R^a$;

$R^a$ is hydrogen, halogen, $CF_3$, $C_{1-6}$ alkyl, $C_{5-8}$ aryl substituted with 0-2 $R^b$ or 5-14 membered heterocycle containing 1-4 heteroatoms selected from N, O, and S;

$R^b$ is hydrogen, halogen or $C_{1-6}$ alkyl; and $R^4$ and $R^5$ are independently hydrogen, $C_{1-4}$ alkyl or $C_{1-4}$ alkoxy.

In a fourth aspect of the invention, there is provided a compound of formula (II) or stereoisomers, tautomers, pharmaceutically-acceptable salts, solvates, or prodrugs thereof, wherein:

$R^2$ is $C_{1-6}$ alkyl, $C_3$-$C_{12}$ cycloalkyl, $C_3$-$C_8$ cycloalkyl $C_{1-6}$ alkyl, or 5-8 membered heterocycle containing 1-4 heteroatoms selected from N, O, and S, each substituted with 0-3 $R^{2a}$ groups, $R^{2a}$ is hydrogen, halogen, CN, hydroxy or $C_{1-3}$ alkyl;

$R^3$ is $C_{6-10}$ aryl or 5-14 membered heterocycle containing 1-4 heteroatoms selected from N, O, and S, each of said aryl or heterocycle substituted with 0-4 $R^{3a}$ groups, $R^{3a}$ is, independently at each occurrence, hydrogen, COOH, $CF_3$, $C_{1-6}$ alkyl, $C_{1-6}$ alkoxy, $C_{1-6}$ haloalkoxy, —$CONR^5R^6$, CO-heterocyclyl substituted with 0-2 $R^a$, —$NR^4R^5$, —NHCO $C_{1-6}$ alkyl, —NHCO $C_{3-8}$ cycloalkyl substituted with 0-2 $R^a$, —NHCO hydroxy $C_{1-6}$ alkyl, —NHCO $C_{5-8}$ aryl, or 5-8 membered heterocycle containing 1-4 heteroatoms selected from N, O, and S substituted with 0-2 $R^a$;

$R^a$ is hydrogen, halogen, $CF_3$, $C_{1-6}$ alkyl, $C_{5-8}$ aryl substituted with 0-2 $R^b$ or 5-8 membered heterocycle containing 1-4 heteroatoms selected from N, O, and S;

$R^b$ is hydrogen, halogen or $C_{1-6}$ alkyl; and $R^4$ and $R^5$ are independently hydrogen, $C_{1-4}$ alkyl or $C_{1-4}$ alkoxy.

In a fifth aspect of the invention, there is provided a compound of formula (II) or stereoisomers, tautomers, pharmaceutically-acceptable salts, solvates, or prodrugs thereof, wherein:

$R^2$ is $C_{1-6}$ alkyl, $C_3$-$C_{12}$ cycloalkyl, $C_3$-$C_8$ cycloalkyl $C_{1-6}$ alkyl, or 5-8 membered heterocycle containing 1-4 heteroatoms selected from N, O, and S, each substituted with 0-2 $R^{2a}$ groups.

$R^{2a}$ is hydrogen, halogen, CN, hydroxy or $C_{1-3}$ alkyl;

$R^3$ is $C_{6-10}$ aryl or 5-14 membered heterocycle containing 1-4 heteroatoms selected from N, O, and S, each of said aryl or heterocycle substituted with 0-4 $R^{3a}$ groups, $R^{3a}$ is, independently at each occurrence, hydrogen, COOH, $CF_3$, $C_{1-6}$ alkyl, $C_{1-6}$ alkoxy, $C_{1-6}$ haloalkoxy, —$CONR^5R^6$, CO-heterocyclyl substituted with 0-2 $R^a$, —$NR^4R^5$, —NHCO $C_{1-6}$ alkyl, —NHCO $C_{3-8}$ cycloalkyl substituted with 0-2 $R^a$, —NHCO hydroxy $C_{1-6}$ alkyl, —NHCO $C_{5-8}$ aryl, or 5-8 membered heterocycle containing 1-4 heteroatoms selected from N, O, and S substituted with 0-2 $R^a$;

$R^a$ is hydrogen, halogen, $CF_3$, $C_{1-6}$ alkyl, $C_{5-8}$ aryl substituted with 0-2 $R^b$ or 5-8 membered heterocycle containing 1-4 heteroatoms selected from N, O, and S;

$R^b$ is hydrogen, halogen or $C_{1-6}$ alkyl; and $R^4$ and $R^5$ are independently hydrogen, $C_{1-4}$ alkyl or $C_{1-4}$ alkoxy.

In a sixth aspect of the invention, there is provided a compound of formula (II) or stereoisomers, tautomers, pharmaceutically-acceptable salts, solvates, or prodrugs thereof, wherein:

$R^2$ is cyclohexyl, adamantlyl or oxan, each substituted with 0-2 $R^{2a}$ groups, $R^{2a}$ is hydrogen, halogen, CN, hydroxy or $C_{1-3}$ alkyl;

$R^3$ is $C_{6-10}$ aryl or 5-14 membered heterocycle containing 1-4 heteroatoms selected from N, O, and S, each of said aryl or heterocycle substituted with 0-4 $R^{3a}$ groups, $R^{3a}$ is, independently at each occurrence, hydrogen, COOH, $CF_3$, $C_{1-6}$ alkyl, $C_{1-6}$ alkoxy, $C_{1-6}$ haloalkoxy, —$CONR^5R^6$, CO-heterocyclyl substituted with 0-2 $R^a$, —$NR^4R^5$, —NHCO $C_{1-6}$ alkyl, —NHCO $C_{3-8}$ cycloalkyl substituted with 0-2 $R^a$, —NHCO hydroxy $C_{1-6}$ alkyl, —NHCO $C_{5-8}$ aryl, or 5-8 membered heterocycle containing 1-4 heteroatoms selected from N, O, and S substituted with 0-2 $R^a$;

$R^a$ is hydrogen, halogen, $CF_3$, $C_{1-6}$ alkyl, $C_{5-8}$ aryl substituted with 0-2 $R^b$ or 5-8 membered heterocycle containing 1-4 heteroatoms selected from N, O, and S;

$R^b$ is hydrogen, halogen or $C_{1-6}$ alkyl; and $R^4$ and $R^5$ are independently hydrogen, $C_{1-4}$ alkyl or $C_{1-4}$ alkoxy.

In a seventh aspect of the invention, there is provided a compound of formula (II) or stereoisomers, tautomers, pharmaceutically-acceptable salts, solvates, or prodrugs thereof, wherein:

$R^2$ is cyclohexyl, adamantlyl or oxan, each of said substituents substituted with 0-2 $R^{2a}$ groups, $R^{2a}$ is hydrogen, halogen or hydroxy;

$R^3$ is $C_{6-10}$ aryl or 5-14 membered heterocycle containing 1-4 heteroatoms selected from N, O, and S, each of said aryl or heterocycle substituted with 0-4 $R^{3a}$ groups, $R^{3a}$ is, independently at each occurrence, hydrogen, COOH, $CF_3$, $C_{1-6}$ alkyl, $C_{1-6}$ alkoxy, $C_{1-6}$ haloalkoxy, —$CONR^5R^6$, CO-heterocyclyl substituted with 0-2 $R^a$, —$NR^4R^5$, —NHCO $C_{1-6}$ alkyl, —NHCO $C_{3-8}$ cycloalkyl substituted with 0-2 $R^a$, —NHCO hydroxy $C_{1-6}$ alkyl, —NHCO $C_{5-8}$ aryl, or 5-8 membered heterocycle containing 1-4 heteroatoms selected from N, O, and S substituted with 0-2 $R^a$;

$R^a$ is hydrogen, halogen, $CF_3$, $C_{1-6}$ alkyl, $C_{5-8}$ aryl substituted with 0-2 $R^b$ or 5-8 membered heterocycle containing 1-4 heteroatoms selected from N, O, and S;

$R^b$ is hydrogen, halogen or $C_{1-6}$ alkyl; and $R^4$ and $R^5$ are independently hydrogen, $C_{1-4}$ alkyl or $C_{1-4}$ alkoxy.

In an 8th aspect of the invention, there is provided a compound of formula (II) or stereoisomers, tautomers, pharmaceutically-acceptable salts, solvates, or prodrugs thereof, wherein:

$R^2$ is cyclohexyl, adamantlyl or oxan, each of said substituents substituted with 0-2 $R^{2a}$ groups, $R^{2a}$ is hydrogen or hydroxy;

$R^3$ is $C_{6-10}$ aryl or 5-14 membered heterocycle containing 1-4 heteroatoms selected from N, O, and S, each of said substituents substituted with 0-4 $R^{3a}$ groups, $R^{3a}$ is, independently at each occurrence, hydrogen, COOH, $CF_3$, $C_{1-6}$ alkyl, $C_{1-6}$ alkoxy, $C_{1-6}$ haloalkoxy, —$CONR^5R^6$, CO-heterocyclyl substituted with 0-2 $R^a$, —$NR^4R^5$, —NHCO $C_{1-6}$ alkyl, —NHCO $C_{3-8}$ cycloalkyl substituted with 0-2 $R^a$, —NHCO hydroxy $C_{1-6}$ alkyl, —NHCO $C_{5-8}$ aryl, or 5-8 membered heterocycle containing 1-4 heteroatoms selected from N, O, and S substituted with 0-2 $R^a$;

$R^a$ is hydrogen, halogen, $CF_3$, $C_{1-6}$ alkyl, $C_{5-8}$ aryl substituted with 0-2 $R^b$ or 5-8 membered heterocycle containing 1-4 heteroatoms selected from N, O, and S;

$R^b$ is hydrogen, halogen or $C_{1-6}$ alkyl; and

R⁴ and R⁵ are independently hydrogen, $C_{1-4}$ alkyl or $C_{1-4}$ alkoxy.

In a ninth aspect of the invention, there is provided a compound of formula (III)

(III)

or stereoisomers, tautomers, pharmaceutically-acceptable salts, solvates, or prodrugs thereof, wherein:
- $R^2$ is $C_{1-6}$ alkyl, $C_3$-$C_{12}$ cycloalkyl, $C_3$-$C_8$ cycloalkyl $C_{1-6}$ alkyl, or 5-14 membered heterocycle containing 1-4 heteroatoms selected from N, O, and S, each of said substituents substituted with 0-3 $R^{2a}$ groups,
- $R^{2a}$ is hydrogen or hydroxy;
- $R^{3a}$ is, independently at each occurrence, hydrogen, COOH, $CF_3$, $C_{1-6}$ alkyl, $C_{1-6}$ alkoxy, $C_{1-6}$ haloalkoxy, —$CONR^4R^5$, CO-heterocyclyl substituted with 0-2 $R^a$, —$NR^4R^5$, —NHCO $C_{1-6}$ alkyl, —NHCO $C_{3-8}$ cycloalkyl substituted with 0-2 $R^a$, —NHCO hydroxy $C_{1-6}$ alkyl, —NHCO $C_{5-8}$ aryl, or 5-14 membered heterocycle containing 1-4 heteroatoms selected from N, O, and S substituted with 0-2 $R^a$;
- $R^a$ is hydrogen, halogen, $CF_3$, $C_{1-6}$ alkyl, $C_{5-8}$ aryl substituted with 0-2 $R^b$ or 5-14 membered heterocycle containing 1-4 heteroatoms selected from N, O, and S;
- $R^b$ is hydrogen, halogen or $C_{1-6}$ alkyl;
- $R^4$ and $R^5$ are independently hydrogen, $C_{1-4}$ alkyl or $C_{1-4}$ alkoxy; and
- n is 0, 1, 2, or 3.

In a tenth aspect of the invention, there is provided a compound of formula (IIIa)

(IIIa)

or stereoisomers, tautomers, pharmaceutically-acceptable salts, solvates, or prodrugs thereof, wherein:
- $R^2$ is $C_{1-6}$ alkyl, $C_3$-$C_{12}$ cycloalkyl, $C_3$-$C_8$ cycloalkyl $C_{1-6}$ alkyl, or 5-14 membered heterocycle containing 1-4 heteroatoms selected from N, O, and S, each of said substituents substituted with 0-3 $R^{2a}$ groups,
- $R^{2a}$ is hydrogen or hydroxy;
- $R^{3a}$ is, independently at each occurrence, hydrogen, COOH, $CF_3$, $C_{1-6}$ alkyl, $C_{1-6}$ alkoxy, $C_{1-6}$ haloalkoxy, —$CONR^4R^5$, CO-heterocyclyl substituted with 0-2 $R^a$, —$NR^4R^5$, —NHCO $C_{1-6}$ alkyl, —NHCO $C_{3-8}$ cycloalkyl substituted with 0-2 $R^a$, —NHCO hydroxy $C_{1-6}$ alkyl, —NHCO $C_{5-8}$ aryl, or 5-14 membered heterocycle containing 1-4 heteroatoms selected from N, O, and S substituted with 0-2 $R^a$;
- $R^a$ is hydrogen, halogen, $CF_3$, $C_{1-6}$ alkyl, $C_{5-8}$ aryl substituted with 0-2 $R^b$ or 5-14 membered heterocycle containing 1-4 heteroatoms selected from N, O, and S;
- $R^b$ is hydrogen, halogen or $C_{1-6}$ alkyl;
- $R^4$ and $R^5$ are independently hydrogen, $C_{1-4}$ alkyl or $C_{1-4}$ alkoxy; and
- n is 0, 1, 2, or 3.

In another aspect, the present invention provides a compound selected from the exemplified examples or a pharmaceutically acceptable salt, a stereoisomer, a tautomer, or a solvate thereof.

In another aspect, the present invention provides a compound selected from any subset list of compounds within the scope of the prior aspect.

In another aspect, the present invention provides a compound selected from the following:

6-{[(1R,2R)-2-hydroxycyclohexyl]amino}-8-{[6-(propan-2-yloxy)-5-(pyrrolidine-1-carbonyl)pyridin-2-yl]amino}imidazo[1,2-b]pyridazine-3-carbonitrile, 6-{[(1R,2R)-2-hydroxycyclohexyl]amino}-8-{[6-(pyrrolidin-1-yl)-5-(pyrrolidine-1-carbonyl)pyridin-2-yl]amino}imidazo[1,2-b]pyridazine-3-carbonitrile, 8-{[6-(dimethylamino)-5-(pyrrolidine-1-carbonyl)pyridin-2-yl]amino}-6-{[(1R,2R)-2-hydroxycyclohexyl]amino}imidazo[1,2-b]pyridazine-3-carbonitrile, 6-{[(1R,2R)-2-hydroxycyclohexyl]amino}-8-{[5-(pyrrolidine-1-carbonyl)-6-(2,2,2-trifluoroethoxy)pyridin-2-yl]amino}imidazo[1,2-b]pyridazine-3-carbonitrile, 8-{[6-(tert-butoxy)-5-(pyrrolidine-1-carbonyl)pyridin-2-yl]amino}-6-{[(1S,2S)-2-hydroxycyclohexyl]amino}imidazo[1,2-b]pyridazine-3-carbonitrile, 8-{[6-(3-tert-butyl-2-oxoimidazolidin-1-yl)pyridin-2-yl]amino}-6-{[(1R,2R)-2-hydroxycyclohexyl]amino}imidazo[1,2-b]pyridazine-3-carbonitrile, N-{6-[(3-cyano-6-{[(1R,2R)-2-hydroxycyclohexyl]amino}imidazo[1,2-b]pyridazin-8-yl)amino]pyridin-2-yl}-2,2-dimethylpropanamide, N-{6-[(3-cyano-6-{[(1R,2R)-2-hydroxycyclohexyl]amino}imidazo[1,2-b]pyridazin-8-yl)amino]pyridin-2-yl}-1-methylcyclopropane-1-carboxamide, N-{6-[(3-cyano-6-{[(1R,2R)-2-hydroxycyclohexyl]amino}imidazo[1,2-b]pyridazin-8-yl)amino]pyridin-2-yl}-2-hydroxy-2-methylpropanamide, N-{6-[(3-cyano-6-{[(1R,2R)-2-hydroxycyclohexyl]amino}imidazo[1,2-b]pyridazin-8-yl)amino]pyridin-2-yl}benzamide, 8-{[5-(2,2-dimethylpyrrolidine-1-carbonyl)pyridin-2-yl]amino}-6-{[(1S,2S)-2-hydroxycyclohexyl]amino}imidazo[1,2-b]pyridazine-3-carbonitrile, 8-{[6-(tert-butoxy)-5-(pyrrolidine-1-carbonyl)pyridin-2-yl]amino}-6-{[(1R,2R)-2-hydroxycyclohexyl]amino}imidazo[1,2-b]pyridazine-3-carbonitrile, 8-{[6-(2,2-difluoroethoxy)-5-(pyrrolidine-1-carbonyl)pyridin-2-yl]amino}-6-{[(1S,2S)-2-hydroxycyclohexyl]amino}imidazo[1,2-b]pyridazine-3-carbonitrile, 6-{[(1S,2S)-2-hydroxycyclohexyl]amino}-8-{[6-(pyrrolidin-1-yl)-5-(pyrrolidine-1-carbonyl)pyridin-2-yl]amino}imidazo[1,2-b]pyridazine-3-carbonitrile, 8-{[6-(3-fluoroazetidin-1-yl)-5-(pyrrolidine-1-carbonyl)pyridin-2-yl]amino}-6-{[(1S,2S)-2-hydroxycyclohexyl]amino}imidazo[1,2-b]pyridazine-3-carbonitrile, 8-{[5-(2,2-dimethylpyrrolidine-1-carbonyl)pyridin-2-yl]amino}-6-{[(1R,2R)-2-hydroxycyclohexyl]amino}imidazo[1,2-b]pyridazine-3-carbonitrile, N-tert-butyl-6-({3-cyano-6-[(3-hydroxyadamantan-1-yl)amino]imidazo[1,2-b]pyridazin-8-yl}amino)pyridine-2-carboxamide, 6-[(3-hydroxyadamantan-1-yl)amino]-8-[(8-methoxyquinolin-2-yl)amino]imidazo[1,2-b]pyridazine-3-carbonitrile, 8-{[5,7-bis(trifluoromethyl)-1,8-naphthyridin-2-yl]amino}-6-[(3,5-dihydroxyadamantan-1-yl)amino]imidazo[1,2-b]pyridazine-3-carbonitrile, 6-[(3,5-dihydroxyadamantan-1-yl)amino]-8-{[6-(trifluoromethyl)pyridin-2-yl]amino}imidazo[1,2-b]pyridazine-3-carbonitrile, N-[6-({3-cyano-6-[(3,5-dihydroxyadamantan-1-yl)amino]imidazo[1,2-b]pyridazin-8-yl}amino)-3-methoxypyridin-2-yl]-2,2-dimethylpropanamide, 6-[(3-fluoro-5-hydroxyadamantan-1-yl)amino]-8-[(8-methoxyquinolin-2-yl)amino]imidazo[1,2-b]pyridazine-3-carbonitrile, 6-[(oxan-4-yl)amino]-8-{[5-(pyrrolidine-1-carbonyl)pyridin-2-yl]amino}imidazo[1,2-b]pyridazine-3-carbonitrile, 8-{[6-(tert-butoxy)-5-(pyrrolidine-1-carbonyl)pyridin-2-yl]amino}-6-[(oxan-4-yl)amino]imidazo[1,2-b]pyridazine-3-carbonitrile, N-[6-({3-cyano-6-[(oxan-4-yl)amino]imidazo[1,2-b]pyridazin-8-yl}amino)pyridin-2-yl]-2-hydroxy-2-methylpropanamide, N-[6-({3-cyano-6-[(cyclopropylmethyl)amino]imidazo[1,2-b]pyridazin-8-yl}amino)pyridin-2-yl]-2,2-dimethylpropanamide, N-[6-({3-cyano-6-[(cyclopropylmethyl)amino]imidazo[1,2-b]pyridazin-8-yl}amino)pyridin-2-yl]cyclopropanecarboxamide, N-[6-({3-cyano-6-[(2,2-dimethylpropyl)amino]imidazo[1,2-b]pyridazin-8-yl}amino)pyridin-2-yl]cyclopropanecarboxamide, 8-{[6-(ethylamino)-5-(pyrrolidine-1-carbonyl)pyridin-2-yl]amino}-6-{[(1S,2S)-2-hydroxycyclohexyl]amino}imidazo[1,2-b]pyridazine-3-carbonitrile, 8-{[6-(dimethylamino)-5-[4-(2-fluorophenyl)piperazine-1-carbonyl]pyridin-2-yl]amino}-6-{[(1R,2R)-2-hydroxycyclohexyl]amino}imidazo[1,2-b]pyridazine-3-carbonitrile, 6-[(3-cyano-6-{[(1R,2R)-2-hydroxycyclohexyl]amino}imidazo[1,2-b]pyridazin-8-yl)amino]-2-(dimethylamino)-N-methyl-N-[2-(pyridin-2-yl)ethyl]pyridine-3-carboxamide, 6-[(3-cyano-6-{[(1R,2R)-2-hydroxycyclohexyl]amino}imidazo[1,2-b]pyridazin-8-yl)amino]-2-(dimethylamino)-N-(2-methoxyethyl)pyridine-3-carboxamide, 8-{[6-(2,2-difluoroethoxy)-5-[2-(trifluoromethyl)pyrrolidine-1-carbonyl]pyridin-2-yl]amino}-6-{[(1R,2R)-2-hydroxycyclohexyl]amino}imidazo[1,2-b]pyridazine-3-carbonitrile, 8-({5-[(1R,4S)-2-azabicyclo[2.2.1]heptane-2-carbonyl]-6-(2,2-difluoroethoxy)pyridin-2-yl}amino)-6-{[(1R,2R)-2-hydroxycyclohexyl]amino}imidazo[1,2-b]pyridazine-3-carbonitrile, 6-[(3-cyano-6-{[(1R,2R)-2-hydroxycyclohexyl]amino}imidazo[1,2-b]pyridazin-8-yl)amino]-2-(2,2-difluoroethoxy)-N-[(oxolan-2-yl)methyl]pyridine-3-carboxamide, 8-{[6-(2,2-difluoroethoxy)-5-[(3R,5S)-3,5-dimethylmorpholine-4-carbonyl]pyridin-2-yl]amino}-6-{[(1S,2S)-2-hydroxycyclohexyl]amino}imidazo[1,2-b]pyridazine-3-carbonitrile, N-[(4-{6-[(3-cyano-6-{[(1R,2R)-2-hydroxycyclohexyl]amino}imidazo[1,2-b]pyridazin-8-yl)amino]pyridin-2-yl}phenyl)methyl]acetamide, N-[(4-{6-[(3-cyano-6-{[(1R,2R)-2-hydroxycyclohexyl]amino}imidazo[1,2-b]pyridazin-8-yl)amino]pyridin-2-yl}phenyl)methyl]methanesulfonamide, 6-{[(1R,2R)-2-hydroxycyclohexyl]amino}-8-({6-[4-(morpholine-4-sulfonyl)piperazin-1-yl]pyridin-2-yl}amino)imidazo[1,2-b]pyridazine-3-carbonitrile, 8-({6-[(3R,5S)-4-acetyl-3,5-dimethylpiperazin-1-yl]pyridin-2-yl}amino)-6-[(3-hydroxyadamantan-1-yl)amino]imidazo[1,2-b]pyridazine-3-carbonitrile, 6-({3-cyano-6-[(3-hydroxyadamantan-1-yl)amino]imidazo[1,2-b]pyridazin-8-yl}amino)-N-[(2R)-1,1,1-trifluoropropan-2-yl]pyridine-2-carboxamide, 3-{[6-({3-cyano-6-[(3-hydroxyadamantan-1-yl)amino]imidazo[1,2-b]pyridazin-8-yl}amino)pyridin-2-yl]formamido}-3-methylbutanamide, 6-[(oxan-4-yl)amino]-8-{[6-(propan-2-yloxy)-5-(pyrrolidine-1-carbonyl)pyridin-2-yl]amino}imidazo[1,2-b]pyridazine-3-carbonitrile, 6-({3-cyano-6-[(oxan-4-yl)amino]imidazo[1,2-b]pyridazin-8-yl}amino)-2-(2,2-difluoroethoxy)-N-methyl-N-(oxetan-3-yl)pyridine-3-carboxamide, 6-({3-cyano-6-[(oxan-4-yl)amino]imidazo[1,2-b]pyridazin-8-yl}amino)-2-(2,2-difluoroethoxy)-N-[(oxolan-2-yl)methyl]pyridine-3-carboxamide, 8-{[6-(2,2-difluoroethoxy)-5-[(1s,4s)-7-azabicyclo[2.2.1]heptane-7-carbonyl]pyridin-2-yl]amino}-6-[(oxan-4-yl)amino]imidazo[1,2-b]pyridazine-3-carbonitrile, (3R)-1-[6-({3-cyano-6-[(oxan-4-yl)amino]imidazo[1,2-b]pyridazin-8-yl}amino)-2-(2,2-difluoroethoxy)pyridine-3-carbonyl]pyrrolidine-3-carbonitrile, 8-{[6-(2,2-difluoroethoxy)-5-[3-(dimethylamino)pyrrolidine-1-carbonyl]pyridin-2-yl]amino}-6-[(oxan-4-yl)amino]imidazo[1,2-b]pyridazine-3-carbonitrile, 8-{[6-(2,2-difluoroethoxy)-5-[2-(trifluoromethyl)pyrrolidine-1-carbonyl]pyridin-2-yl]amino}-6-[(oxan-4-yl)amino]imidazo[1,2-b]pyridazine-3-carbonitrile, N-({4-[6-({3-cyano-6-[(oxan-4-yl)amino]imidazo[1,2-b]pyridazin-8-yl}amino)pyridin-2-yl]phenyl}methyl)acetamide, 6-({3-cyano-6-[(cyclopropylmethyl)amino]imidazo[1,2-b]pyridazin-8-yl}amino)-N-(cyclopropylmethyl)pyridine-3-carboxamide, N-tert-butyl-6-({3-cyano-6-[(cyclopropylmethyl)amino]imidazo[1,2-b]pyridazin-8-yl}amino)pyridine-3-carboxamide, 6-({3-cyano-6-[(cyclopropylmethyl)amino]imidazo[1,2-b]pyridazin-8-yl}amino)-N-[(1R,2S)-2-hydroxycyclopentyl]pyridine-3-carboxamide, 6-{[(1R,2R)-2-hydroxycyclohexyl]amino}-8-({6-[4-(propan-2-yl)piperazin-1-yl]pyridin-2-yl}amino)imidazo[1,2-b]pyridazine-3-carbonitrile, 6-{[(1R,2R)-2-hydroxycyclohexyl]amino}-8-({6-[4-(2-hydroxyethyl)piperazin-1-yl]pyridin-2-yl}amino)imidazo[1,2-b]pyridazine-3-carbonitrile, 6-{[(1R,2R)-2-hydroxycyclohexyl]amino}-8-{[6-(3-oxomorpholin-4-yl)pyridin-2-yl]amino}imidazo[1,2-b]pyridazine-3-carbonitrile, 8-{[6-(4-ethyl-4-methyl-2,5-dioxoimidazolidin-1-yl)pyridin-2-yl]amino}-6-{[(1R,2R)-2-hydroxycyclohexyl]amino}imidazo[1,2-b]pyridazine-3-carbonitrile, 8-[(6-{2,4-dioxo-1,3-diazaspiro[4.5]decan-3-yl}pyridin-2-yl)amino]-6-{[(1R,2R)-2-hydroxycyclohexyl]amino}imidazo[1,2-b]pyridazine-3-carbonitrile, 6-{[(1R,2R)-2-hydroxycyclohexyl]amino}-8-{[6-(2-oxoazepan-1-yl)pyridin-2-yl]amino}imidazo[1,2-b]pyridazine-3-carbonitrile, 6-{[(1R,2R)-2-hydroxycyclohexyl]amino}-8-({6-[4-(2-methylpropanoyl)piperazin-1-yl]pyridin-2-yl}amino)imidazo[1,2-b]pyridazine-3-carbonitrile, 6-{[(1R,2R)-2-hydroxycyclohexyl]amino}-8-{[6-(1H-pyrazol-1-yl)pyridin-2-yl]amino}imidazo[1,2-b]pyridazine-3-carbonitrile, 6-{[(1R,2R)-2-hydroxycyclohexyl]amino}-8-{[6-(4-methylpiperazin-1-yl)pyridin-2-yl]amino}imidazo[1,2-b]pyridazine-3-carbonitrile, 6-{[(1R,2R)-2-hydroxycyclohexyl]amino}-8-{[6-(4-methanesulfonylpiperazin-1-yl)pyridin-2-yl]amino}imidazo[1,2-b]pyridazine-3-carbonitrile, 8-{[6-(4-acetylpiperazin-1-yl)pyridin-2-yl]amino}-6-{[(1R,2R)-2-hydroxycyclohexyl]amino}imidazo[1,2-b]pyridazine-3-carbonitrile, 6-{[(1R,2R)-2-hydroxycyclohexyl]amino}-8-{[6-(morpholin-4-yl)pyridin-2-yl]amino}imidazo[1,2-b]pyridazine-3-carbonitrile, or 8-[(6-aminopyridin-2-yl)amino]-6-{[(1R,2R)-2-hydroxycyclohexyl]amino}imidazo[1,2-b]pyridazine-3-carbonitrile, or a pharmaceutically acceptable salt thereof In another embodiment, there is provided a pharmaceutical composition comprising one or more compounds of formula I and a pharmaceutically acceptable carrier or diluent.

The present invention is also directed to pharmaceutical compositions useful in treating diseases associated with the modulation of IL-12, IL-23 and/or IFNα, comprising compounds of formula I, or pharmaceutically-acceptable salts thereof, and pharmaceutically-acceptable carriers or diluents.

The invention further relates to methods of treating diseases associated with the modulation of IL-12, IL-23 and/or IFNα, comprising administering to a patient in need of such treatment a therapeutically-effective amount of a compound according to formula I.

The present invention also provides processes and intermediates for making the compounds of the present invention.

The present invention also provides a method for treating proliferative, metabolic, allergic, autoimmune and inflammatory diseases (or use of the compounds of the present invention for the manufacture of a medicament for the treatment of these diseases), comprising administering to a host in need of such treatment a therapeutically effective amount of at least one of the compounds of the present invention.

The present invention also provides a method of treating an inflammatory or autoimmune disease (or use of the compounds of the present invention for the manufacture of a medicament for the treatment of these diseases) comprising administering to a patient in need of such treatment a therapeutically-effective amount of a compound of Formula I.

The present invention also provides a method for treating a disease (or use of the compounds of the present invention for the manufacture of a medicament for the treatment of these diseases), comprising administering to a patient in need of such treatment a therapeutically-effective amount of a compound of Formula I, wherein the disease is rheumatoid arthritis, multiple sclerosis, systemic lupus erythematosus (SLE), lupus nephritis, cutaneous lupus, inflammatory bowel disease, psoriasis, Crohn's Disease, psoriatic arthritis, Sjögren's syndrome, systemic scleroderma, ulcerative colitis, Graves' disease, discoid lupus erythematosus, adult onset Stills, systemic onset juvenile idiopathic arthritis, gout, gouty arthritis, type 1 diabetes, insulin dependent diabetes mellitus, sepsis, septic shock, Shigellosis, pancreatitis (acute or chronic), glomerulonephritis, autoimmune gastritis, diabetes, autoimmune hemolytic anemia, autoimmune neutropenia, thrombocytopenia, atopic dermatitis, myasthenia gravis, pancreatitis (acute or chronic), ankylosing spondylitis, pemphigus vulgaris, Goodpasture's disease, antiphospholipid syndrome, idiopathic thrombocytopenia, ANCA-associated vasculitis, pemphigus, Kawasaki disease, Chronic Inflammatory Demyelinating Polyneuropathy (CIDP), dermatomyositis, polymyositis, uveitis, Guillain-Barre syndrome, autoimmune pulmonary inflammation, autoimmune thyroiditis, autoimmune inflammatory eye disease, and chronic demyelinating polyneuropathy.

The present invention also provides a method of treating an inflammatory or autoimmune disease (or use of the compounds of the present invention for the manufacture of a medicament for the treatment of these diseases), comprising administering to a patient in need of such treatment a therapeutically-effective amount of a compound of Formula I, wherein the disease is selected from systemic lupus erythematosus (SLE), lupus nephritis, cutaneous lupus, Crohn's Disease, ulcerative colitis, type 1 diabetes, psoriasis, rheumatoid arthritis, systemic onset juvenile idiopathic arthritis, ankylosing spondylitis, and multiple sclerosis.

The present invention also provides a method for treating a rheumatoid arthritis (or use of the compounds of the present invention for the manufacture of a medicament for the treatment of rheumatoid arthritis, comprising administering to a patient in need of such treatment a therapeutically-effective amount of a compound of Formula I.

In addition, the present invention also provides a method of treating a condition (or use of the compounds of the present invention for the manufacture of a medicament for the treatment of these conditions) comprising administering to a patient in need of such treatment a therapeutically-effective amount of a compound of Formula I, wherein the condition is selected from acute myelogenous leukemia, chronic myelogenous leukemia, metastatic melanoma, Kaposi's sarcoma, multiple myeloma, solid tumors, ocular neovasculization, and infantile haemangiomas, B cell lymphoma, systemic lupus erythematosus (SLE), rheumatoid arthritis, psoriatic arthritis, multiple vasculitides, idiopathic thrombocytopenic purpura (ITP), myasthenia gravis, allergic rhinitis, multiple sclerosis (MS), transplant rejection, Type I diabetes, membranous nephritis, inflammatory bowel disease, autoimmune hemolytic anemia, autoimmune thyroiditis, cold and warm agglutinin diseases, Evans syndrome, hemolytic uremic syndrome/thrombotic thrombocytopenic purpura (HUS/TTP), sarcoidosis, Sjögren's syndrome, peripheral neuropathies, pemphigus vulgaris and asthma.

The present invention also provides a method of treating a IL-12, IL-23 and/or IFNα mediated disease (or use of the compounds of the present invention for the manufacture of a medicament for the treatment of these diseases), comprising administering to a patient in need of such treatment a therapeutically-effective amount of a compound of formula I.

The present invention also provides a method of treating a IL-12, IL-23 and/or IFNα mediated disease (or use of the compounds of the present invention for the manufacture of a medicament for the treatment of these diseases), comprising administering to a patient in need of such treatment a therapeutically-effective amount of a compound of formula I, wherein the IL-12, IL-23 and/or IFNα mediated disease is a disease modulated by IL-12, IL-23 and/or IFNα.

The present invention also provides a method of treating diseases, comprising administering to a patient in need of such treatment a therapeutically-effective amount of a compound of formula I, or pharmaceutically-acceptable salt thereof, in combination with other therapeutic agents.

The present invention also provides the compounds of the present invention for use in therapy.

In another embodiment, compounds of formula I are selected from exemplified compounds or combinations of exemplified compounds or other embodiments herein.

In another embodiment are compounds having an $IC_{50}$<1000 nM in at least one of the assays described below.

The present invention may be embodied in other specific forms without departing from the spirit or essential attributes thereof. This invention encompasses all combinations of preferred aspects and/or embodiments of the invention noted herein. It is understood that any and all embodiments of the present invention may be taken in conjunction with any other embodiment or embodiments to describe additional more preferred embodiments. It is also to be understood that each individual element of the preferred embodiments is its own independent preferred embodiment. Furthermore, any element of an embodiment is meant to be combined with any and all other elements from any embodiment to describe an additional embodiment.

DETAILED DESCRIPTION OF THE INVENTION

The following are definitions of terms used in this specification and appended claims. The initial definition provided for a group or term herein applies to that group or term throughout the specification and claims, individually or as part of another group, unless otherwise indicated.

Compounds of this invention may have one or more asymmetric centers. Unless otherwise indicated, all chiral (enantiomeric and diastereomeric) and racemic forms of compounds of the present invention are included in the present invention. Many geometric isomers of olefins, C=N double bonds, and the like can also be present in the compounds, and all such stable isomers are contemplated in the present invention. Cis- and trans-geometric isomers of the compounds of the present invention are described and may be isolated as a mixture of isomers or as separated isomeric forms. The present compounds can be isolated in optically active or racemic forms. It is well known in the art how to prepare optically active forms, such as by resolution of racemic forms or by synthesis from optically active starting materials. All chiral, (enantiomeric and diastereomeric) and racemic forms and all geometric isomeric forms of a structure are intended, unless the specific stereochemistry or isomer form is specifically indicated.

When any variable (e.g., $R^3$) occurs more than one time in any constituent or formula for a compound, its definition at each occurrence is independent of its definition at every other occurrence. Thus, for example, if a group is shown to be substituted with 0-2 $R^3$, then said group may optionally be substituted with up to two $R^3$ groups and $R^3$ at each occurrence is selected independently from the definition of $R^3$. Also, combinations of substituents and/or variables are permissible only if such combinations result in stable compounds.

When a bond to a substituent is shown to cross a bond connecting two atoms in a ring, then such substituent may be bonded to any atom on the ring. When a substituent is listed without indicating the atom via which such substituent is bonded to the rest of the compound of a given formula, then such substituent may be bonded via any atom in such substituent. Combinations of substituents and/or variables are permissible only if such combinations result in stable compounds.

In cases wherein there are nitrogen atoms (e.g., amines) on compounds of the present invention, these can be converted to N-oxides by treatment with an oxidizing agent (e.g., MCPBA and/or hydrogen peroxides) to afford other compounds of this invention. Thus, all shown and claimed nitrogen atoms are considered to cover both the shown nitrogen and its N-oxide (N→O) derivative.

In accordance with a convention used in the art,

is used in structural formulas herein to depict the bond that is the point of attachment of the moiety or substituent to the core or backbone structure.

A dash "-" that is not between two letters or symbols is used to indicate a point of attachment for a substituent. For example, —$CONH_2$ is attached through the carbon atom.

The term "optionally substituted" in reference to a particular moiety of the compound of Formula I (e.g., an optionally substituted heteroaryl group) refers to a moiety having 0, 1, 2, or more substituents. For example, "optionally substituted alkyl" encompasses both "alkyl" and "substituted alkyl" as defined below. It will be understood by those skilled in the art, with respect to any group containing one or more substituents, that such groups are not intended to introduce any substitution or substitution patterns that are sterically impractical, synthetically non-feasible and/or inherently unstable.

As used herein, the term "at least one chemical entity" is interchangeable with the term "a compound".

As used herein, the term "alkyl" or "alkylene" is intended to include both branched and straight-chain saturated aliphatic hydrocarbon groups having the specified number of carbon atoms. For example, "$C_{1-10}$ alkyl" (or alkylene), is intended to include $C_1$, $C_2$, $C_3$, $C_4$, $C_5$, $C_6$, $C_7$, $C_8$, $C_9$, and $C_{10}$ alkyl groups. Additionally, for example, "$C_1$-$C_6$ alkyl" denotes alkyl having 1 to 6 carbon atoms. Alkyl groups can be unsubstituted or substituted so that one or more of its hydrogens are replaced by another chemical group. Example alkyl groups include, but are not limited to, methyl (Me), ethyl (Et), propyl (e.g., n-propyl and isopropyl), butyl (e.g., n-butyl, isobutyl, t-butyl), pentyl (e.g., n-pentyl, isopentyl, neopentyl), and the like.

Alkenyl" or "alkenylene" is intended to include hydrocarbon chains of either straight or branched configuration and having one or more double carbon-carbon bonds that may occur in any stable point along the chain. For example, "$C_{2-6}$ alkenyl" (or alkenylene), is intended to include $C_2$, $C_3$, $C_4$, $C_5$, and $C_6$ alkenyl groups. Examples of alkenyl include, but are not limited to, ethenyl, 1-propenyl, 2-propenyl, 2-butenyl, 3-butenyl, 2-pentenyl, 3-pentenyl, 4-pentenyl, 2-hexenyl, 3-hexenyl, 4-hexenyl, 5-hexenyl, 2-methyl-2-propenyl, 4-methyl-3-pentenyl, and the like.

"Alkynyl" or "alkynylene" is intended to include hydrocarbon chains of either straight or branched configuration and having one or more triple carbon-carbon bonds that may occur in any stable point along the chain. For example, "$C_{2-6}$ alkynyl" (or alkynylene), is intended to include $C_2$, $C_3$, $C_4$, $C_5$, and $C_6$ alkynyl groups; such as ethynyl, propynyl, butynyl, pentynyl, hexynyl and the like.

One skilled in the field will understand that, when the designation "$CO_2$" is used herein, this is intended to refer to the group

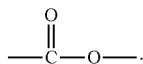

When the term "alkyl" is used together with another group, such as in "arylalkyl", this conjunction defines with more specificity at least one of the substituents that the substituted alkyl will contain. For example, "arylalkyl" refers to a substituted alkyl group as defined above where at least one of the substituents is an aryl, such as benzyl. Thus, the term aryl($C_{0-4}$)alkyl includes a substituted lower alkyl having at least one aryl substituent and also includes an aryl directly bonded to another group, i.e., aryl($C_0$)alkyl. The term "heteroarylalkyl" refers to a substituted alkyl group as defined above where at least one of the substituents is a heteroaryl.

When reference is made to a substituted alkenyl, alkynyl, alkylene, alkenylene, or alkynylene group, these groups are substituted with one to three substituents as defined above for substituted alkyl groups.

The term "alkoxy" refers to an oxygen atom substituted by alkyl or substituted alkyl, as defined herein. For example, the term "alkoxy" includes the group —O—$C_{1-6}$alkyl such as methoxy, ethoxy, propoxy, isopropoxy, n-butoxy, sec-butoxy, tert-butoxy, pentoxy, 2-pentyloxy, isopentoxy, neopentoxy, hexoxy, 2-hexoxy, 3-hexoxy, 3-methylpentoxy, and the like. "Lower alkoxy" refers to alkoxy groups having one to four carbons.

It should be understood that the selections for all groups, including for example, alkoxy, thioalkyl, and aminoalkyl, will be made by one skilled in the field to provide stable compounds.

The term "substituted", as used herein, means that any one or more hydrogens on the designated atom or group is replaced with a selection from the indicated group, provided that the designated atom's normal valence is not exceeded. When a substituent is oxo, or keto, (i.e., =O) then 2 hydrogens on the atom are replaced. Keto substituents are not present on aromatic moieties. Unless otherwise specified, substituents are named into the core structure. For example, it is to be understood that when (cycloalkyl)alkyl is listed as a possible substituent, the point of attachment of this substituent to the core structure is in the alkyl portion. Ring double bonds, as used herein, are double bonds that are formed between two adjacent ring atoms (e.g., C=C, C=N, or N=N).

Combinations of substituents and/or variables are permissible only if such combinations result in stable compounds or useful synthetic intermediates. A stable compound or stable structure is meant to imply a compound that is sufficiently robust to survive isolation from a reaction mixture to a useful degree of purity, and subsequent formulation into an efficacious therapeutic agent. It is preferred that the presently recited compounds do not contain a N-halo, S(O)$_2$H, or S(O)H group.

The term "cycloalkyl" refers to cyclized alkyl groups, including mono-, bi- or poly-cyclic ring systems. $C_{3-7}$ cycloalkyl is intended to include $C_3$, $C_4$, $C_5$, $C_6$, and $C_7$ cycloalkyl groups. Example cycloalkyl groups include, but are not limited to, cyclopropyl, cyclobutyl, cyclopentyl, cyclohexyl, norbornyl, and the like. As used herein, "carbocycle" or "carbocyclic residue" is intended to mean any stable 3-, 4-, 5-, 6-, or 7-membered monocyclic or bicyclic or 7-, 8-, 9-, 10-, 11-, 12-, or 13-membered bicyclic or tricyclic ring, any of which may be saturated, partially unsaturated, unsaturated or aromatic. Examples of such carbocycles include, but are not limited to, cyclopropyl, cyclobutyl, cyclobutenyl, cyclopentyl, cyclopentenyl, cyclohexyl, cycloheptenyl, cycloheptyl, cycloheptenyl, adamantyl, cyclooctyl, cyclooctenyl, cyclooctadienyl, [3.3.0]bicyclooctane, [4.3.0]bicyclononane, [4.4.0]bicyclodecane, [2.2.2]bicyclooctane, fluorenyl, phenyl, naphthyl, indanyl, adamantyl, anthracenyl, and tetrahydronaphthyl (tetralin). As shown above, bridged rings are also included in the definition of carbocycle (e.g., [2.2.2]bicyclooctane). Preferred carbocycles, unless otherwise specified, are cyclopropyl, cyclobutyl, cyclopentyl, cyclohexyl, and phenyl. When the term "carbocycle" is used, it is intended to include "aryl". A bridged ring occurs when one or more carbon atoms link two non-adjacent carbon atoms. Preferred bridges are one or two carbon atoms. It is noted that a bridge always converts a monocyclic ring into a bicyclic ring. When a ring is bridged, the substituents recited for the ring may also be present on the bridge.

The term "aryl" refers to monocyclic or bicyclic aromatic hydrocarbon groups having 6 to 12 carbon atoms in the ring portion, such as phenyl, and naphthyl groups, each of which may be substituted.

Accordingly, in compounds of formula I, the term "cycloalkyl" includes cyclopropyl, cyclobutyl, cyclopentyl, cyclohexyl, cycloheptyl, bicyclooctyl, etc., as well as the following ring systems:

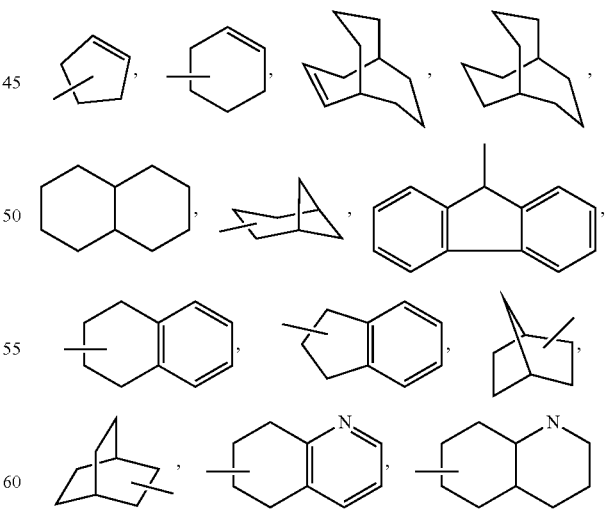

and the like, which optionally may be substituted at any available atoms of the ring(s).

Preferred cycloalkyl groups include cyclopropyl, cyclopentyl, cyclohexyl, and

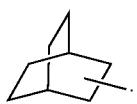

The term "halo" or "halogen" refers to chloro, bromo, fluoro and iodo.

The term "haloalkyl" means a substituted alkyl having one or more halo substituents. For example, "haloalkyl" includes mono, bi, and trifluoromethyl.

The term "haloalkoxy" means an alkoxy group having one or more halo substituents. For example, "haloalkoxy" includes $OCF_3$.

Thus, examples of aryl groups include:

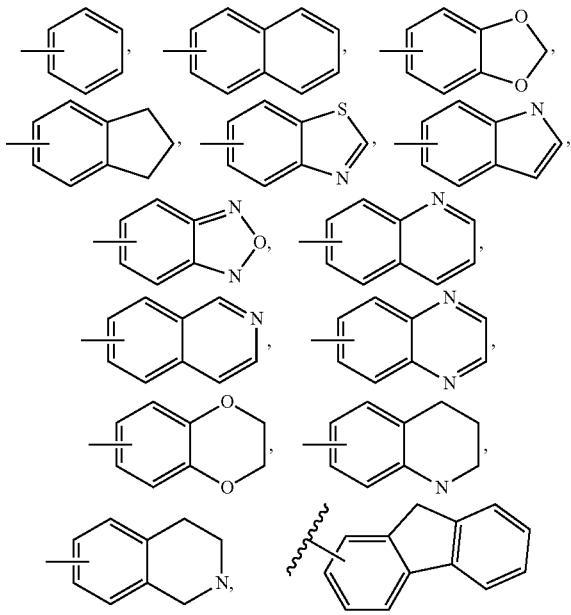

(fluorenyl) and the like, which optionally may be substituted at any available carbon or nitrogen atom. A preferred aryl group is optionally-substituted phenyl.

The terms "heterocycle", "heterocycloalkyl", "heterocyclo", "heterocyclic", or "heterocyclyl" may be used interchangeably and refer to substituted and unsubstituted 3- to 7-membered monocyclic groups, 7- to 11-membered bicyclic groups, and 10- to 15-membered tricyclic groups, in which at least one of the rings has at least one heteroatom (O, S or N), said heteroatom containing ring preferably having 1, 2, or 3 heteroatoms selected from O, S, and N. Each ring of such a group containing a heteroatom can contain one or two oxygen or sulfur atoms and/or from one to four nitrogen atoms provided that the total number of heteroatoms in each ring is four or less, and further provided that the ring contains at least one carbon atom. The nitrogen and sulfur atoms may optionally be oxidized and the nitrogen atoms may optionally be quaternized. The fused rings completing the bicyclic and tricyclic groups may contain only carbon atoms and may be saturated, partially saturated, or fully unsaturated. The heterocyclo group may be attached at any available nitrogen or carbon atom. As used herein the terms "heterocycle", "heterocycloalkyl", "heterocyclo", "heterocyclic", and "heterocyclyl" include "heteroaryl" groups, as defined below.

In addition to the heteroaryl groups described below, exemplary monocyclic heterocyclyl groups include azetidinyl, pyrrolidinyl, oxetanyl, imidazolinyl, oxazolidinyl, isoxazolinyl, thiazolidinyl, isothiazolidinyl, tetrahydrofuranyl, piperidyl, piperazinyl, 2-oxopiperazinyl, 2-oxopiperidyl, 2-oxopyrrolodinyl, 2-oxoazepinyl, azepinyl, 1-pyridonyl, 4-piperidonyl, tetrahydropyranyl, morpholinyl, thiamorpholinyl, thiamorpholinyl sulfoxide, thiamorpholinyl sulfone, 1,3-dioxolane and tetrahydro-1,1-dioxothienyl and the like. Exemplary bicyclic heterocyclo groups include quinuclidinyl. Additional monocyclic heterocyclyl groups include

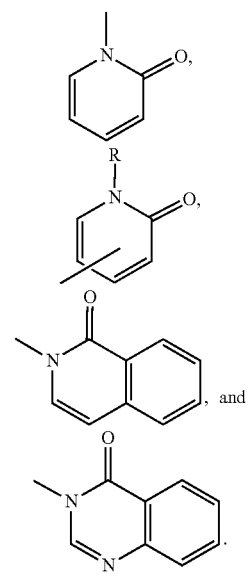

The term "heteroaryl" refers to substituted and unsubstituted aromatic 5- or 6-membered monocyclic groups, 9- or 10-membered bicyclic groups, and 11- to 14-membered tricyclic groups which have at least one heteroatom (O, S or N) in at least one of the rings, said heteroatom-containing ring preferably having 1, 2, or 3 heteroatoms selected from O, S, and N. Each ring of the heteroaryl group containing a heteroatom can contain one or two oxygen or sulfur atoms and/or from one to four nitrogen atoms provided that the total number of heteroatoms in each ring is four or less and each ring has at least one carbon atom. The fused rings completing the bicyclic and tricyclic groups may contain only carbon atoms and may be saturated, partially saturated, or unsaturated. The nitrogen and sulfur atoms may optionally be oxidized and the nitrogen atoms may optionally be quaternized. Heteroaryl groups which are bicyclic or tricyclic must include at least one fully aromatic ring but the other fused ring or rings may be aromatic or non-aromatic. The heteroaryl group may be attached at any available nitrogen or carbon atom of any ring. As valence allows, if said further ring is cycloalkyl or heterocyclo it is additionally optionally substituted with =O (oxo).

Exemplary monocyclic heteroaryl groups include pyrrolyl, pyrazolyl, pyrazolinyl, imidazolyl, oxazolyl, isoxazolyl, thiazolyl, thiadiazolyl, isothiazolyl, furanyl, thienyl, oxadiazolyl, pyridyl, pyrazinyl, pyrimidinyl, pyridazinyl, triazinyl and the like.

Exemplary bicyclic heteroaryl groups include indolyl, benzothiazolyl, benzodioxolyl, benzoxazolyl, benzothienyl, quinolinyl, tetrahydroisoquinolinyl, isoquinolinyl, benzimidazolyl, benzopyranyl, indolizinyl, benzofuranyl, chromonyl, coumarinyl, benzopyranyl, cinnolinyl, quinoxalinyl, indazolyl, pyrrolopyridyl, furopyridyl, dihydroisoindolyl, tetrahydroquinolinyl and the like.

Exemplary tricyclic heteroaryl groups include carbazolyl, benzindolyl, phenanthrollinyl, acridinyl, phenanthridinyl, xanthenyl and the like.

In compounds of formula I, preferred heteroaryl groups include

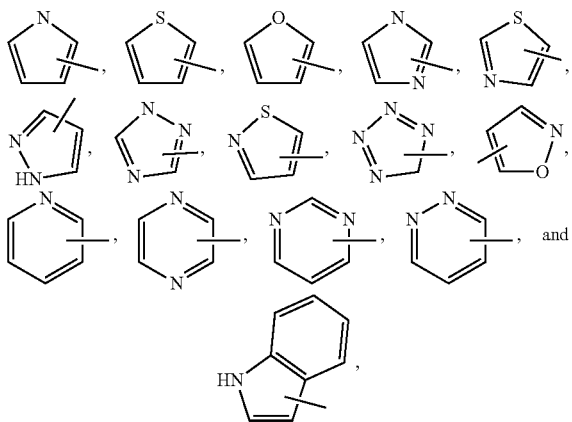

and the like, which optionally may be substituted at any available carbon or nitrogen atom.

Unless otherwise indicated, when reference is made to a specifically-named aryl (e.g., phenyl), cycloalkyl (e.g., cyclohexyl), heterocyclo (e.g., pyrrolidinyl, piperidinyl, and morpholinyl) or heteroaryl (e.g., tetrazolyl, imidazolyl, pyrazolyl, triazolyl, thiazolyl, and furyl) the reference is intended to include rings having 0 to 3, preferably 0 to 2, substituents selected from those recited above for the aryl, cycloalkyl, heterocyclo and/or heteroaryl groups, as appropriate.

The term "carbocyclyl" or "carbocyclic" refers to a saturated or unsaturated monocyclic or bicyclic ring in which all atoms of all rings are carbon. Thus, the term includes cycloalkyl and aryl rings. Monocyclic carbocycles have 3 to 6 ring atoms, still more typically 5 or 6 ring atoms. Bicyclic carbocycles have 7 to 12 ring atoms, e.g., arranged as a bicyclo [4,5], [5,5], [5,6] or [6,6] system, or 9 or 10 ring atoms arranged as a bicyclo [5,6] or [6,6] system. Examples of mono- and bicyclic carbocycles include cyclopropyl, cyclobutyl, cyclopentyl, 1-cyclopent-1-enyl, 1-cyclopent-2-enyl, 1-cyclopent-3-enyl, cyclohexyl, 1-cyclohex-1-enyl, 1-cyclohex-2-enyl, 1-cyclohex-3-enyl, phenyl and naphthyl. The carbocyclic ring may be substituted in which case the substituents are selected from those recited above for cycloalkyl and aryl groups.

The term "heteroatoms" shall include oxygen, sulfur and nitrogen.

When the term "unsaturated" is used herein to refer to a ring or group, the ring or group may be fully unsaturated or partially unsaturated.

Throughout the specification, groups and substituents thereof may be chosen by one skilled in the field to provide stable moieties and compounds and compounds useful as pharmaceutically-acceptable compounds and/or intermediate compounds useful in making pharmaceutically-acceptable compounds.

The compounds of formula I may exist in a free form (with no ionization) or can form salts which are also within the scope of this invention. Unless otherwise indicated, reference to an inventive compound is understood to include reference to the free form and to salts thereof. The term "salt(s)" denotes acidic and/or basic salts formed with inorganic and/or organic acids and bases. In addition, the term "salt(s) may include zwitterions (inner salts), e.g., when a compound of formula I, contains both a basic moiety, such as an amine or a pyridine or imidazole ring, and an acidic moiety, such as a carboxylic acid. Pharmaceutically acceptable (i.e., non-toxic, physiologically acceptable) salts are preferred, such as, for example, acceptable metal and amine salts in which the cation does not contribute significantly to the toxicity or biological activity of the salt.

However, other salts may be useful, e.g., in isolation or purification steps which may be employed during preparation, and thus, are contemplated within the scope of the invention. Salts of the compounds of the formula I may be formed, for example, by reacting a compound of the formula I with an amount of acid or base, such as an equivalent amount, in a medium such as one in which the salt precipitates or in an aqueous medium followed by lyophilization.

Exemplary acid addition salts include acetates (such as those formed with acetic acid or trihaloacetic acid, for example, trifluoroacetic acid), adipates, alginates, ascorbates, aspartates, benzoates, benzenesulfonates, bisulfates, borates, butyrates, citrates, camphorates, camphorsulfonates, cyclopentanepropionates, digluconates, dodecylsulfates, ethanesulfonates, fumarates, glucoheptanoates, glycerophosphates, hemisulfates, heptanoates, hexanoates, hydrochlorides (formed with hydrochloric acid), hydrobromides (formed with hydrogen bromide), hydroiodides, 2-hydroxyethanesulfonates, lactates, maleates (formed with maleic acid), methanesulfonates (formed with methanesulfonic acid), 2-naphthalenesulfonates, nicotinates, nitrates, oxalates, pectinates, persulfates, 3-phenylpropionates, phosphates, picrates, pivalates, propionates, salicylates, succinates, sulfates (such as those formed with sulfuric acid), sulfonates (such as those mentioned herein), tartrates, thiocyanates, toluenesulfonates such as tosylates, undecanoates, and the like.

Exemplary basic salts include ammonium salts, alkali metal salts such as sodium, lithium, and potassium salts; alkaline earth metal salts such as calcium and magnesium salts; barium, zinc, and aluminum salts; salts with organic bases (for example, organic amines) such as trialkylamines such as triethylamine, procaine, dibenzylamine, N-benzyl-β-phenethylamine, 1-ephenamine, N,N'-dibenzylethylenediamine, dehydroabietylamine, N-ethylpiperidine, benzylamine, dicyclohexylamine or similar pharmaceutically acceptable amines and salts with amino acids such as arginine, lysine and the like. Basic nitrogen-containing groups may be quaternized with agents such as lower alkyl halides (e.g., methyl, ethyl, propyl, and butyl chlorides, bromides and iodides), dialkyl sulfates (e.g., dimethyl, diethyl, dibutyl, and diamyl sulfates), long chain halides (e.g., decyl, lauryl, myristyl and stearyl chlorides, bromides and iodides), aralkyl halides (e.g., benzyl and phenethyl bromides), and others. Preferred salts include monohydrochloride, hydrogensulfate, methanesulfonate, phosphate or nitrate salts.

The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

As used herein, "pharmaceutically-acceptable salts" refer to derivatives of the disclosed compounds wherein the parent compound is modified by making acid or base salts thereof. Examples of pharmaceutically-acceptable salts include, but are not limited to, mineral or organic acid salts of basic groups such as amines; and alkali or organic salts of acidic groups such as carboxylic acids. The pharmaceutically-acceptable salts include the conventional non-toxic salts or the quaternary ammonium salts of the parent compound formed, for example, from non-toxic inorganic or organic acids. For example, such conventional non-toxic salts include those derived from inorganic acids such as hydrochloric, hydrobromic, sulfuric, sulfamic, phosphoric, and nitric; and the salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicylic, sulfanilic, 2-acetoxybenzoic, fumaric, toluenesulfonic, methanesulfonic, ethane disulfonic, oxalic, and isethionic, and the like.

The pharmaceutically-acceptable salts of the present invention can be synthesized from the parent compound which contains a basic or acidic moiety by conventional chemical methods. Generally, such salts can be prepared by reacting the free acid or base forms of these compounds with a stoichiometric amount of the appropriate base or acid in water or in an organic solvent, or in a mixture of the two; generally, nonaqueous media like ether, ethyl acetate, ethanol, isopropanol, or acetonitrile are preferred. Lists of suitable salts are found in *Remington's Pharmaceutical Sciences,* 18th Edition, Mack Publishing Company, Easton, PA (1990), the disclosure of which is hereby incorporated by reference.

All stereoisomers of the compounds of the instant invention are contemplated, either in admixture or in pure or substantially pure form. Stereoisomers may include compounds which are optical isomers through possession of one or more chiral atoms, as well as compounds which are optical isomers by virtue of limited rotation about one or more bonds (atropisomers). The definition of compounds according to the invention embraces all the possible stereoisomers and their mixtures. It very particularly embraces the racemic forms and the isolated optical isomers having the specified activity. The racemic forms can be resolved by physical methods, such as, for example, fractional crystallization, separation or crystallization of diastereomeric derivatives or separation by chiral column chromatography. The individual optical isomers can be obtained from the racemates from the conventional methods, such as, for example, salt formation with an optically active acid followed by crystallization.

The present invention is intended to include all isotopes of atoms occurring in the present compounds. Isotopes include those atoms having the same atomic number but different mass numbers. By way of general example and without limitation, isotopes of hydrogen include deuterium and tritium. Isotopes of carbon include $^{13}C$ and $^{14}C$. Isotopically-labeled compounds of the invention can generally be prepared by conventional techniques known to those skilled in the art or by processes analogous to those described herein, using an appropriate isotopically-labeled reagent in place of the non-labeled reagent otherwise employed.

Prodrugs and solvates of the inventive compounds are also contemplated. The term "prodrug" denotes a compound which, upon administration to a subject, undergoes chemical conversion by metabolic or chemical processes to yield a compound of the formula I, and/or a salt and/or solvate thereof. Any compound that will be converted in vivo to provide the bioactive agent (i.e., the compound for formula I) is a prodrug within the scope and spirit of the invention. For example, compounds containing a carboxy group can form physiologically hydrolyzable esters which serve as prodrugs by being hydrolyzed in the body to yield formula I compounds per se. Such prodrugs are preferably administered orally since hydrolysis in many instances occurs principally under the influence of the digestive enzymes. Parenteral administration may be used where the ester per se is active, or in those instances where hydrolysis occurs in the blood. Examples of physiologically hydrolyzable esters of compounds of formula I include $C_{1-6}$alkylbenzyl, 4-methoxybenzyl, indanyl, phthalyl, methoxymethyl, $C_{1-6}$alkanoyloxy-$C_{1-6}$alkyl, e.g., acetoxymethyl, pivaloyloxymethyl or propionyloxymethyl, $C_{1-6}$alkoxycarbonyloxy-$C_{1-6}$alkyl, e.g., methoxycarbonyl-oxymethyl or ethoxycarbonyloxymethyl, glycyloxymethyl, phenylglycyloxymethyl, (5-methyl-2-oxo-1,3-dioxolen-4-yl)-methyl and other well known physiologically hydrolyzable esters used, for example, in the penicillin and cephalosporin arts. Such esters may be prepared by conventional techniques known in the art.

Various forms of prodrugs are well known in the art and are described in Rautio, J. et al., *Nature Review Drug Discovery,* 17, 559-587 (2018).

Compounds of the formula I and salts thereof may exist in their tautomeric form, in which hydrogen atoms are transposed to other parts of the molecules and the chemical bonds between the atoms of the molecules are consequently rearranged. It should be understood that the all tautomeric forms, insofar as they may exist, are included within the invention. Additionally, inventive compounds may have trans and cis isomers.

It should further be understood that solvates (e.g., hydrates) of the compounds of Formula I are also with the scope of the present invention. Methods of solvation are generally known in the art.

Utility

The compounds of the invention modulate IL-23-stimulated and IFNα-stimulated cellular functions, including gene transcription. Other types of cellular functions that may be modulated by the compounds of the instant invention include, but are not limited to, IL-12-stimulated responses.

Accordingly, compounds of formula I have utility in treating conditions associated with the modulation of the function of IL-23 or IFNα, and particularly the selective inhibition of function of IL-23, IL-12 or IFNα, by acting on Tyk2 to mediate signal transduction. Such conditions include IL-23-, IL-12-, or IFNα-associated diseases in which pathogenic mechanisms are mediated by these cytokines.

As used herein, the terms "treating" or "treatment" encompass the treatment of a disease state in a mammal, particularly in a human, and include: (a) preventing or delaying the occurrence of the disease state in a mammal, in particular, when such mammal is predisposed to the disease state but has not yet been diagnosed as having it; (b) inhibiting the disease state, i.e., arresting its development; and/or (c) achieving a full or partial reduction of the symptoms or disease state, and/or alleviating, ameliorating, lessening, or curing the disease or disorder and/or its symptoms.

In view of their activity as modulators of IL-23-, IL-12 and IFNα-stimulated cellular responses, compounds of Formula I are useful in treating IL-23-, IL-12- or IFNα-associated diseases including, but not limited to, inflammatory diseases such as Crohn's disease, ulcerative colitis, asthma, graft versus host disease, allograft rejection, chronic obstructive pulmonary disease; autoimmune diseases such as Graves' disease, rheumatoid arthritis, systemic lupus erythematosis, cutaneous lupus, lupus nephritis, discoid lupus erythematosus, psoriasis; auto-inflammatory diseases including CAPS, TRAPS, FMF, adult onset stills, systemic onset juvenile idiopathic arthritis, gout, gouty arthritis; metabolic diseases including type 2 diabetes, atherosclerosis, myocardial infarction; destructive bone disorders such as bone resorption disease, osteoarthritis, osteoporosis, multiple myeloma-related bone disorder; proliferative disorders such as acute myelogenous leukemia, chronic myelogenous leukemia; angiogenic disorders such as angiogenic disorders including solid tumors, ocular neovasculization, and infantile haemangiomas; infectious diseases such as sepsis, septic shock, and Shigellosis; neurodegenerative diseases such as Alzheimer's disease, Parkinson's disease, cerebral ischemias or neurodegenerative disease caused by traumatic injury, oncologic and viral diseases such as metastatic melanoma, Kaposi's sarcoma, multiple myeloma, and HIV infection and CMV retinitis, AIDS, respectively.

More particularly, the specific conditions or diseases that may be treated with the inventive compounds include, without limitation, pancreatitis (acute or chronic), asthma, allergies, adult respiratory distress syndrome, chronic obstructive pulmonary disease, glomerulonephritis, rheumatoid arthritis, systemic lupus erythematosis, cutaneous lupus, lupus nephritis, discoid lupus erythematosus, scleroderma, chronic thyroiditis, Graves' disease, autoimmune gastritis, diabetes, autoimmune hemolytic anemia, autoimmune neutropenia, thrombocytopenia, atopic dermatitis, chronic active hepatitis, myasthenia gravis, multiple sclerosis, inflammatory bowel disease, ulcerative colitis, Crohn's disease, psoriasis, graft vs. host disease, inflammatory reaction induced by endotoxin, tuberculosis, atherosclerosis, muscle degeneration, cachexia, psoriatic arthritis, Reiter's syndrome, gout, traumatic arthritis, rubella arthritis, acute synovitis, pancreatic β-cell disease; diseases characterized by massive neutrophil infiltration; rheumatoid spondylitis, gouty arthritis and other arthritic conditions, cerebral malaria, chronic pulmonary inflammatory disease, silicosis, pulmonary sarcoidosis, bone resorption disease, allograft rejections, fever and myalgias due to infection, cachexia secondary to infection, keloid formation, scar tissue formation, ulcerative colitis, pyresis, influenza, osteoporosis, osteoarthritis, acute myelogenous leukemia, chronic myelogenous leukemia, metastatic melanoma, Kaposi's sarcoma, multiple myeloma, sepsis, septic shock, and Shigellosis; Alzheimer's disease, Parkinson's disease, cerebral ischemias or neurodegenerative disease caused by traumatic injury; angiogenic disorders including solid tumors, ocular neovasculization, and infantile haemangiomas; viral diseases including acute hepatitis infection (including hepatitis A, hepatitis B and hepatitis C), HIV infection and CMV retinitis, AIDS, ARC or malignancy, and herpes; stroke, myocardial ischemia, ischemia in stroke heart attacks, organ hyposia [should this be hypoxia], vascular hyperplasia, cardiac and renal reperfusion injury, thrombosis, cardiac hypertrophy, thrombin-induced platelet aggregation, endotoxemia and/or toxic shock syndrome, conditions associated with prostaglandin endoperoxidase syndase-2, and pemphigus vulgaris. Preferred methods of treatment are those wherein the condition is selected from Crohn's disease, ulcerative colitis, allograft rejection, rheumatoid arthritis, psoriasis, ankylosing spondylitis, psoriatic arthritis, and pemphigus vulgaris. Alternatively preferred methods of treatment are those wherein the condition is selected from ischemia reperfusion injury, including cerebral ischemia reperfusions injury arising from stroke and cardiac ischemia reperfusion injury arising from myocardial infarction. Another preferred method of treatment is one in which the condition is multiple myeloma.

When the terms "IL-23-, IL-12- or IFNα-associated condition" or "IL-23-, IL-12- or IFNα-associated disease or disorder" are used herein, each is intended to encompass all of the conditions identified above as if repeated at length, as well as any other condition that is affected by IL-23, IL-12 or IFNα.

The present invention thus provides methods for treating such conditions, comprising administering to a subject in need thereof a therapeutically-effective amount of at least one compound of Formula I or a salt thereof. "Therapeutically effective amount" is intended to include an amount of a compound of the present invention that is effective when administered alone or in combination to inhibit IL-23, IL-12 or IFNα function and/or treat diseases.

The methods of treating IL-23-, IL-12- or IFNα-associated conditions may comprise administering compounds of Formula I alone or in combination with each other and/or other suitable therapeutic agents useful in treating such conditions. Accordingly, "therapeutically effective amount" is also intended to include an amount of the combination of compounds claimed that is effective to inhibit IL-23, IL-12 or IFNα function and/or treat diseases associated with IL-23, IL-12 or IFNα.

Exemplary of such other therapeutic agents include corticosteroids, rolipram, calphostin, cytokine-suppressive anti-inflammatory drugs (CSAIDs), Interleukin-10, glucocorticoids, salicylates, nitric oxide, and other immunosuppressants; nuclear translocation inhibitors, such as deoxyspergualin (DSG); non-steroidal anti-inflammatory drugs (NSAIDs) such as ibuprofen, celecoxib and rofecoxib; steroids such as prednisone or dexamethasone; antiviral agents such as abacavir; antiproliferative agents such as methotrexate, leflunomide, FK506 (tacrolimus, PROGRAF®); anti-malarials such as hydroxychloroquine; cytotoxic drugs such as azathiprine and cyclophosphamide; TNF-α inhibitors such as tenidap, anti-TNF antibodies or soluble TNF receptor, and rapamycin (sirolimus or RAPAMUNE®) or derivatives thereof.

The above other therapeutic agents, when employed in combination with the compounds of the present invention, may be used, for example, in those amounts indicated in the *Physicians' Desk Reference* (PDR) or as otherwise determined by one of ordinary skill in the art. In the methods of the present invention, such other therapeutic agent(s) may be administered prior to, simultaneously with, or following the administration of the inventive compounds. The present invention also provides pharmaceutical compositions capable of treating IL-23-, IL-12- or IFNα-associated conditions by inhibiting Tyk2-mediated signal transduction, including IL-23-, IL-12- or IFNα-mediated diseases, as described above.

The inventive compositions may contain other therapeutic agents as described above and may be formulated, for example, by employing conventional solid or liquid vehicles or diluents, as well as pharmaceutical additives of a type appropriate to the mode of desired administration (e.g., excipients, binders, preservatives, stabilizers, flavors, etc.) according to techniques such as those well known in the art of pharmaceutical formulation.

Accordingly, the present invention further includes compositions comprising one or more compounds of Formula I and a pharmaceutically acceptable carrier.

A "pharmaceutically acceptable carrier" refers to media generally accepted in the art for the delivery of biologically active agents to animals, in particular, mammals. Pharmaceutically acceptable carriers are formulated according to a number of factors well within the purview of those of ordinary skill in the art. These include without limitation the type and nature of the active agent being formulated; the subject to which the agent-containing composition is to be administered; the intended route of administration of the composition; and, the therapeutic indication being targeted. Pharmaceutically acceptable carriers include both aqueous and non-aqueous liquid media, as well as a variety of solid and semi-solid dosage forms. Such carriers can include a number of different ingredients and additives in addition to the active agent, such additional ingredients being included in the formulation for a variety of reasons, e.g., stabilization of the active agent, binders, etc., well known to those of ordinary skill in the art. Descriptions of suitable pharmaceutically acceptable carriers, and factors involved in their selection, are found in a variety of readily available sources such as, for example, *Remington's Pharmaceutical Sciences*, 17th Edition (1985), which is incorporated herein by reference in its entirety.

The compounds of Formula I may be administered by any means suitable for the condition to be treated, which may depend on the need for site-specific treatment or quantity of drug to be delivered. Topical administration is generally preferred for skin-related diseases, and systematic treatment preferred for cancerous or pre-cancerous conditions, although other modes of delivery are contemplated. For example, the compounds may be delivered orally, such as in the form of tablets, capsules, granules, powders, or liquid formulations including syrups; topically, such as in the form of solutions, suspensions, gels or ointments; sublingually; bucally; parenterally, such as by subcutaneous, intravenous, intramuscular or intrasternal injection or infusion techniques (e.g., as sterile injectable aq. or non-aq. solutions or suspensions); nasally such as by inhalation spray; topically, such as in the form of a cream or ointment; rectally such as in the form of suppositories; or liposomally. Dosage unit formulations containing non-toxic, pharmaceutically acceptable vehicles or diluents may be administered. The compounds may be administered in a form suitable for immediate release or extended release. Immediate release or extended release may be achieved with suitable pharmaceutical compositions or, particularly in the case of extended release, with devices such as subcutaneous implants or osmotic pumps.

Exemplary compositions for topical administration include a topical carrier such as PLASTIBASE® (mineral oil gelled with polyethylene).

Exemplary compositions for oral administration include suspensions which may contain, for example, microcrystalline cellulose for imparting bulk, alginic acid or sodium alginate as a suspending agent, methylcellulose as a viscosity enhancer, and sweeteners or flavoring agents such as those known in the art; and immediate release tablets which may contain, for example, microcrystalline cellulose, dicalcium phosphate, starch, magnesium stearate and/or lactose and/or other excipients, binders, extenders, disintegrants, diluents and lubricants such as those known in the art. The inventive compounds may also be orally delivered by sublingual and/or buccal administration, e.g., with molded, compressed, or freeze-dried tablets. Exemplary compositions may include fast-dissolving diluents such as mannitol, lactose, sucrose, and/or cyclodextrins. Also included in such formulations may be high molecular weight excipients such as celluloses (AVICEL®) or polyethylene glycols (PEG); an excipient to aid mucosal adhesion such as hydroxypropyl cellulose (HPC), hydroxypropyl methyl cellulose (HPMC), sodium carboxymethyl cellulose (SCMC), and/or maleic anhydride copolymer (e.g., GANTREZ®); and agents to control release such as polyacrylic copolymer (e.g., CARBOPOL 934®). Lubricants, glidants, flavors, coloring agents and stabilizers may also be added for ease of fabrication and use.

Exemplary compositions for nasal aerosol or inhalation administration include solutions which may contain, for example, benzyl alcohol or other suitable preservatives, absorption promoters to enhance absorption and/or bioavailability, and/or other solubilizing or dispersing agents such as those known in the art.

Exemplary compositions for parenteral administration include injectable solutions or suspensions which may contain, for example, suitable non-toxic, parenterally acceptable diluents or solvents, such as mannitol, 1,3-butanediol, water, Ringer's solution, an isotonic sodium chloride solution, or other suitable dispersing or wetting and suspending agents, including synthetic mono- or diglycerides, and fatty acids, including oleic acid.

Exemplary compositions for rectal administration include suppositories which may contain, for example, suitable non-irritating excipients, such as cocoa butter, synthetic glyceride esters or polyethylene glycols, which are solid at ordinary temperatures but liquefy and/or dissolve in the rectal cavity to release the drug.

The therapeutically-effective amount of a compound of the present invention may be determined by one of ordinary skill in the art, and includes exemplary dosage amounts for a mammal of from about 0.05 to 1000 mg/kg; 1-1000 mg/kg; 1-50 mg/kg; 5-250 mg/kg; 250-1000 mg/kg of body weight of active compound per day, which may be administered in a single dose or in the form of individual divided doses, such as from 1 to 4 times per day. It will be understood that the specific dose level and frequency of dosage for any particular subject may be varied and will depend upon a variety of factors, including the activity of the specific compound employed, the metabolic stability and length of action of that compound, the species, age, body weight, general health, sex and diet of the subject, the mode and time of administration, rate of excretion, drug combination, and severity of the particular condition. Preferred subjects for treatment include animals, most preferably mammalian species such as humans, and domestic animals such as dogs, cats, horses, and the like. Thus, when the term "patient" is used herein, this term is intended to include all subjects, most preferably mammalian species that are affected by modulation of IL-23, IL-12 and/or IFNα-mediated functions.

EXAMPLES

Preparation of compounds of Formula I, and intermediates used in the preparation of compounds of Formula I, can be prepared using procedures shown in the following Examples and related procedures. The methods and conditions used in these examples, and the actual compounds prepared in these Examples, are not meant to be limiting, but are meant to demonstrate how the compounds of Formula I can be prepared. Starting materials and reagents used in these examples, when not prepared by a procedure described herein, are generally either commercially available, or are reported in the chemical literature, or may be prepared by using procedures described in the chemical literature.

In the Examples given, the phrase "dried and concentrated" generally refers to drying of a solution in an organic solvent over either sodium sulfate or magnesium sulfate, followed by filtration and removal of the solvent from the filtrate (generally under reduced pressure and at a temperature suitable to the stability of the material being prepared). Column chromatography was performed with pre-packed silica gel cartridges using an Isco medium pressure chromatography apparatus (Teledyne Corporation), eluting with the solvent or solvent mixture indicated. Chemical names were determined using ChemDraw Ultra, version 9.0.5 (CambridgeSoft). The following abbreviations are used:

NaHCO$_3$(aq)=saturated aqueous sodium bicarbonate
brine=saturated aqueous sodium chloride
DCM=dichloromethane
DIEA=N,N-diisopropylethylamine
DMAP=4-(N,N-dimethylamino)pyridine
DMF=N,N-dimethylformamide
DMSO=dimethyl sulfoxide
EDC=N-(3-dimethylaminopropyl)-N'-ethylcarbodiimide hydrochloride
EtOAc=ethyl acetate
HOAT=1-hydroxy-7-azabenzotriazole
HOBT=1-hydroxybenzotriazole hydrate
rt=ambient room temperature (generally about 20-25° C.)
TEA=triethylamine
TFA=trifluoroacetic acid
THF=tetrahydrofuran Preparations The preparations set out below are for the synthesis of reagents that were not obtained from commercial sources and were employed for the preparation of compounds of formula I of the invention. All chiral compounds in the tables and schemes are racemic unless specified otherwise.

Reverse-phase preparative high performance liquid chromatography ("HPLC") was performed with Shimadzu 8A liquid chromatographs using YMC S5 ODS columns (20× 100, 20×250, or 30×250 millimeter ("mm")). Gradient elution was performed with methanol ("MeOH")/water mixtures in the presence of 0.1% trifluoroacetic acid ("TFA").
Analytical HPLC Method Employed in Characterization of Examples Analytical HPLC was performed on Shimadzu LC10AS liquid chromatographs using the following methods:

Method A:
  Column: ZORBAX SB C18 (4.6×50) mm, 5 µm, positive mode
  Solvent A: 10% methanol, 90% water, 0.1% TFA
  Solvent B: 90% methanol, 10% water, 0.1% TFA
  Mobile Phase:
  Gradient Range: Linear gradient of 0 to 100% solvent B over 2 minutes ("min"), with 1 minute ("min") hold at 100% B.
  Gradient Time: 2 min
  Analysis Time: 3 min
  Detector: Ultraviolet ("UV") visualization at 220 nanometers ("nm")
Method B:
  Column: Waters Sunfire C18 5 µm 4.6×50 mm
  Mobile Phase: Solvent A: 10% methanol, 90% water, 0.1% TFA
    Solvent B: 90% methanol, 10% water, 0.1% TFA
  Gradient Range: 0-100% B
  Gradient Time: 4 min
  Flow Rate: 4 mL/min
  Analysis Time: 5 min
  Detector: UV at 220 nm
Method C:
  Column: SunFire-S5-C18, 4.6×50 mm×5 um
  Mobile Phase: Solvent A: 10% methanol, 90% water, 0.1% TFA
    Solvent B: 90% methanol, 10% water, 0.1% TFA
  Gradient Range: 0-100% B
  Gradient Time: 4 min
  Flow Rate: 4 mL/min
  Analysis Time: 5 min
  Detector: UV at 220 nm
Method D:
  Column: Waters XBridge C18, 4.6×50 mm, 5 µm
  Mobile Phase: Solvent A: 5:95 methanol:water with 0.05% TFA
    Solvent B: 95:5 methanol:water with 0.05% TFA
  Gradient Range: 0-100% B
  Gradient Time: 4 min
  Flow Rate: 4 mL/min
  Analysis Time: 5 min
  Detector: UV at 220 nm
Method E:
  Column: Ascentis 4.6×50 mm
  Mobile Phase: Solvent A: 10% methanol, 90% water, 0.1% TFA
    Solvent B: 90% methanol, 10% water, 0.1% TFA
  Gradient Range: 0-100% B
  Gradient Time: 4 min
  Flow Rate: 4 mL/min
  Analysis Time: 5 min
  Detector: UV at 220 nm
Method F:
  Column: Mac-mod halo C18, 4.6×50 mm, 2.7 µm
  Mobile Phase: (A) 5:95 acetonitrile:water with 0.05% TFA
    (B) 95:5 acetonitrile:water with 0.05% TFA
  Gradient Range: 0-100% B
  Gradient Time: 4 min
  Flow Rate:
    4 mL/min
  Analysis Time: 5 min
  Detector: UV at 220 nm
Method G:
  Column: Supelco Ascentis C18, 4.6×50 mm, 2.7 µm particles
  Mobile Phase: (A) 5:95 acetonitrile:water with 0.05% TFA
    (B) 95:5 acetonitrile:water with 0.05% TFA
  Gradient Range: 0-100% B
  Gradient Time: 4 min
  Flow Rate: 4 mL/min
  Analysis Time: 5 min
  Oven Temperature 35
  Detector: UV at 220 nm
Method H:
  Column: Waters XBridge C18, 4.6×50 mm, 5 µm
  Mobile Phase: Solvent A: 5:95 Acetonitrile:water with 10 mM NH4OAc
    Solvent B: 95:5 Acetonitrile:water with 10 mM NH4OAc
  Gradient Range: 0-100% B
  Gradient Time: 4 min
  Flow Rate: 4 mL/min Analysis Time:
  5 min
  Oven Temperature: 35
  Detector: UV at 220 nm
Method I:
  Column: Waters Sunfire C18 2.1×30 mm 3.5 μm
  Mobile Phase: Solvent A: 10% methanol, 90% water, 0.1% TFA
    Solvent B: 90% methanol, 10% water, 0.1% TFA
  Gradient Range: 0-100% B
  Gradient Time: 4 min
  Flow Rate: 1 mL/min
  Analysis Time: 5 min
  Oven Temperature 40
  Detector: UV at 220 nm
Method J:
  Column: Waters Sunfire C18 2.1×30 mm 2.5 μm
  Mobile Phase: Solvent A: 10% methanol, 90% water, 0.1% TFA
    Solvent B: 90% methanol, 10% water, 0.1% TFA
  Gradient Range: 0-100% B
  Gradient Time: 2 min
  Flow Rate: 1 mL/min
  Analysis Time: 3 min
  Oven Temperature 40
  Detector: JV at 220 nm
Method K:
  Column: Supelco Ascentis Express C18, 4.6×50 mm, 2.7 μm
  Mobile Phase: (A) 5:95 acetonitrile:water with 10 mM ammonium
    (B) 95:5 acetonitrile:water with 10 mM ammonium
  Gradient Range: 0-100% B
  Gradient Time: 4 min
  Flow Rate: 4 mL/min
  Analysis Time: 5 min
  Oven Temperature: 35
  Detector: UV at 220 nm
Method L:
  Column: Column-Asentis Express C18, 5×2.1 mm, 2.7 μm
  Mobile Phase: (A) 2% acetonitrile:98% water with 10 mM NH4COOH
    (B) 98% acetonitrile:2% water with 10 mM NH4COOH
  Gradient Range: 0-100% B
  Gradient Time: 1.5 min
  Flow Rate: 1 mL/min
  Analysis Time: 3.2 min
  Detector: UV at 220 nm
Method M:
  Column: BEH C18 2.1×50 mm 1.7μ
    Solvent A: 100% H$_2$O w/0.05% TFA
  Mobile Phase: Solvent B: 100% ACN w/0.05% TFA
  Gradient Range: 0-100% B
  Gradient Time: 1 min
  Flow Rate: 0.8 mL/min
  Analysis Time: 1.5 min
  Detector: UV at 254 nm
Method N:
  Column: Waters Sunfire C18 2.1×30 mm 3.5 μm
  Mobile Phase: Solvent A: 10% methanol, 90% water, 0.1% TFA
    Solvent B: 90% methanol, 10% water, 0.1% TFA
  Gradient Range: 0-100% B
  Gradient Time: 4 min
  Flow Rate: 0.8 mL/min
  Analysis Time: 5 min
  Oven Temperature 40
  Detector: UV at 220 nm
Method O:
  Column: XBridge Phe 8 4.6×30 mm 5 μm
  Mobile Phase: (A) 2% acetonitrile:98% water with 10 mM NH$_4$COOH
    (B) 98% acetonitrile:2% water with 10 mM NH$_4$COOH
  Gradient Range: 0-100% B
  Gradient Time: 1.5 min
  Flow Rate: 1.85 mL/min
  Analysis Time: 4 min
  Detector: UV at 220 nm
Method P:
  Column: Column-Asentis Express C18, 5×4.6 mm, 5 μm
    (A) 2% acetonitrile:98% water with 10 mM NH$_4$COOH
    Mobile Phase: (B) 98% acetonitrile:2% water with 10 mM NH$_4$COOH
  Gradient Range: 0-100% B
  Gradient Time: 1.5 min
  Flow Rate: 1 mL/min
  Analysis Time: 3.2 min
  Detector: UV at 220 nm
Method Q:
  Column: Column-Asentis Express C8, 50×2.1 mm, 2.7 μm
  Mobile Phase: (A) 2% acetonitrile:98% water with 10 mM NH$_4$COOH
    (B) 98% acetonitrile:2% water with 10 mM NH$_4$COOH
  Gradient Range: 0-100% B
  Gradient Time: 1.5 min
  Flow Rate: 1 mL/min
  Analysis Time: 3.2 min
  Detector: UV at 220 nm Preparation 1

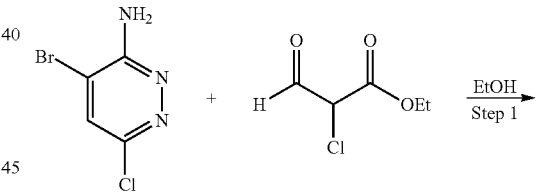

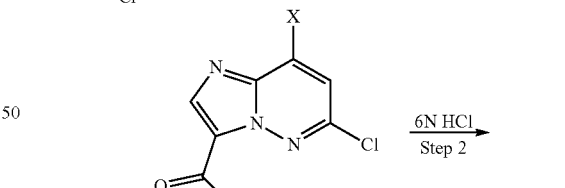

X = Cl:X = Br
80:20

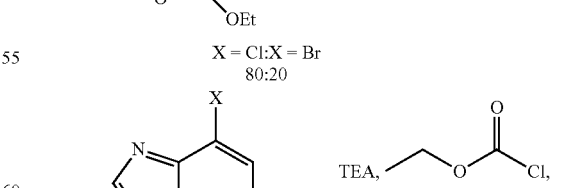

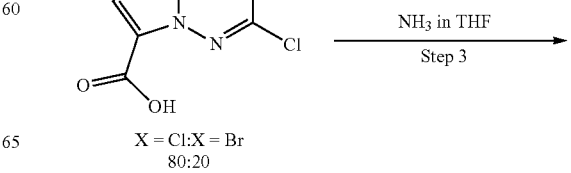

X = Cl:X = Br
80:20

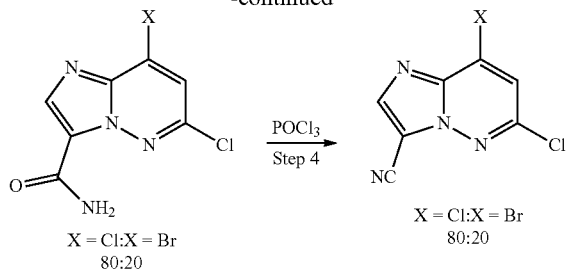

Step 1

To a solution of 4-bromo-6-chloropyridazin-3-amine (175 g, 840 mmol) in ethanol (2 L) was added ethyl 2-chloro-3-oxopropanoate (202 g, 1343 mmol) and the reaction was heated to 80° C. for 16 hours. The solvent was removed in vacuo and the residual material was diluted with water and dichloromethane. The biphasic mixture was passed through a celite bed and the filtrate was separated into two layers. The dichloromethane layer was separated and then washed with water and saturated aqueous sodium chloride (brine), it was then dried over anhydrous sodium sulfate, filtered and concentrated. The resulting crude product was purified using silica gel chromatography (0 to 20% ethyl acetate in petroleum ether). The product fractions were dried and then triturated with 10% methyl tert-butyl ether in petroleum ether (500 mL). The product was filtered off and rinsed with petroleum ether to provide the product (73 g, 33% yield) as a mixture of the C8-bromo and C8-chloro species (~80:20); the mixture was used as such in the subsequent steps (referred to as the chloride for simplicity).

$^1$H NMR (300 MHz, CDCl$_3$):

Chloro: δ 8.37 (s, 1H), 7.38 (s, 1H), 4.47 (q, J=7.2 Hz, 2H), 1.44 (t, J=7.2 Hz, 3H).

Bromo: δ 8.38 (s, 1H), 7.57 (s, 1H), 4.47 (q, J=7.2 Hz, 2H), 1.44 (t, J=7.2 Hz, 3H).

LC retention time chloro: 1.04 min [O]; bromo: 1.07 [O]. Mass Spectrometry ("MS") (E+) m z: 260 (chloro); 304 (bromo) (MH$^+$).

Step 2

Mixture of ethyl 8-bromo-6-chloroimidazo[1,2-b]pyridazine-3-carboxylate (17 g, 55.8 mmol) and its dichloride counterpart was taken in a 500 mL multi neck flask fitted with condenser. To this flask hydrochloric acid (6N in water, 250 mL) was added and the mixture was stirred and heated at 100° C. Initially the reaction mixture was turbid but slowly it became a clear and yellow solution and then again off-white solid started to appear. Reaction continued for 16 hours. Then it was cooled to room temperature. Solid was filtered and washed with small amount of water and then it was dried under vacuum overnight. An off-white solid was obtained (12.7 g, 45.9 mmol, 70.3% yield). LC retention time chloro: 1.00 min [A]; bromo: 1.09 [A]. MS (E+) m/z: 232 (chloro); 277 (bromo) (MH$^+$).

$^1$H NMR (400 MHz, d6-DMSO):

Chloro: δ 8.38 (s, 1H), 8.07 (s, 1H).

Bromo: δ 8.38 (s, 1H), 8.18 (s, 1H).

Step 3

In a 100 mL round-bottomed flask 8-bromo-6-chloroimidazo[1,2-b]pyridazine-3-carboxylic acid (4 g, 14.47 mmol) was dissolved in THF (40 mL). Ethyl chloroformate (4.17 mL, 43.4 mmol) and triethyl amine (7.06 mL, 50.6 mmol) were added to the flask at 0° C. Then reaction mixture was stirred for 1 hour. Then ammonia in THF (20 mL, 924 mmol) was added at −10° C. Then reaction mixture was stirred for 1 hour. After 1 hour, water was added to the reaction. It was filtered to get 8-bromo-6-chloroimidazo[1,2-b]pyridazine-3-carboxamide (2.8 g, 9.96 mmol, 68.8% yield). LC retention time chloro: 1.06 min [A]; bromo: 1.11 [A]. MS (E+) m/z: 231 (chloro); 276 (bromo) (MH$^+$).

$^1$H NMR (400 MHz, d6-DMSO):

Chloro: δ 8.14 (s, 1H), 7.77 (s, 1H).

Bromo: δ 8.32 (s, 1H), 7.99 (s, 1H).

Step 4

8-bromo-6-chloroimidazo[1,2-b]pyridazine-3-carboxamide (10 g, 36.3 mmol) and its chloro counterpart were taken in 250 mL single neck flask fitted with condenser. To it 1,2-dichloroethane (100 mL) and phosphorus oxychloride (47.4 mL, 508 mmol) were added and the mixture was stirred and heated at 100° C. Initially mixture was heterogeneous then slowly it became brown and clear. After 1 hour the reaction was checked with TLC, (a small amount of sample was quenched with NaHCO$_3$ aqueous solution, extracted with ethyl acetate and then used for TLC). TLC showed reaction completed. Reaction mixture was cooled to room temperature. Then 1,2-dichloroethane and phosphorus oxychloride was evaporated. Residue was diluted with dichloromethane and added to aqueous NaHCO$_3$ solution. The pH was check to be basic. Then the mixture was filtered through celite bed. The celite bed was washed with dichloromethane. Then organic layer was separated and the aqueous layer was extracted with dichloromethane (2×). The organic layers were combined, washed with water and brine and then dried over anhydrous Na$_2$SO$_4$. It was then concentrated. Residue was triturated with pet ether and dried to get a pale yellow, free-flowing solid (6.5 g, 25.2 mmol, 69.5% yield). LC retention time chloro: 1.21 min [A]; bromo: 1.29 [A]. MS (E+) m/z: 215 (chloro); 258 (bromo) (MH$^+$).

$^1$H NMR (400 MHz, d6-DMSO):

Chloro: δ 8.66 (s, 1H), 8.20 (s, 1H).

Bromo: δ 8.65 (s, 1H), 8.30 (s, 1H).

Example 1

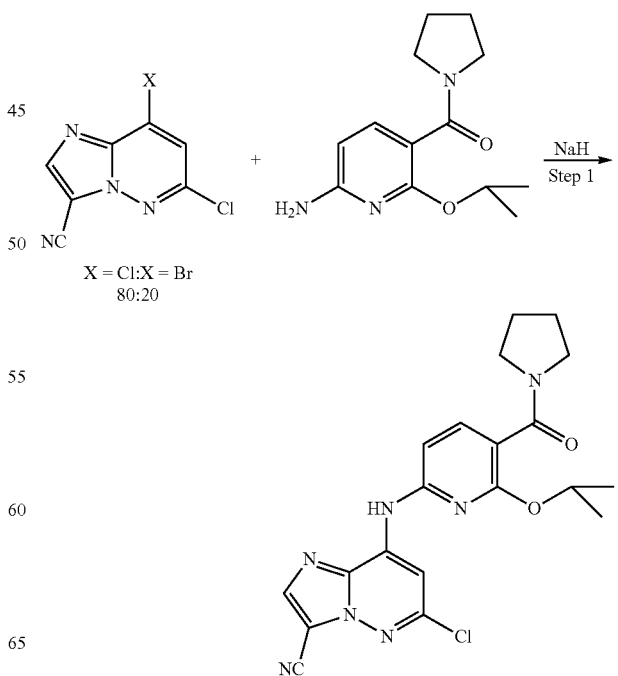

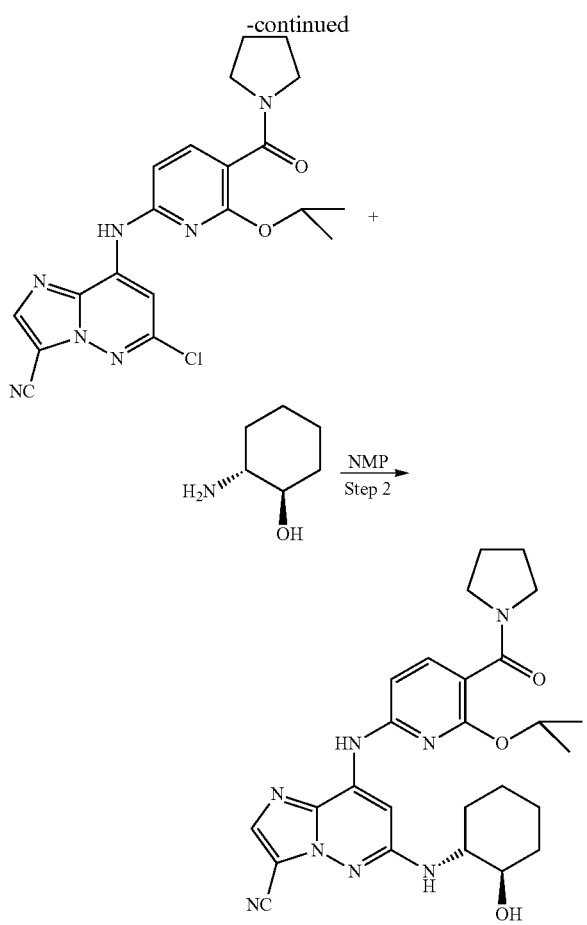

Step 1
To 6,8-dichloroimidazo[1,2-b]pyridazine-3-carbonitrile (63.2 mg, 0.297 mmol) and (6-amino-2-isopropoxypyridin-3-yl)(pyrrolidin-1-yl)methanone (74 mg, 0.297 mmol) in THF (0.5 mL) was added NaH (47.5 mg, 1.187 mmol). The reaction was stirred at room temperature for 1 hour. LC-MS showed product. The reaction mixture was quenched with water and extracted with dichloromethane. The organic layer was concentrated to give 120 mg of product. The product was used as is in next step. LC retention time 3.72 min [B]. MS (ES+) m/z: 426 (MH+).

Step 2
To 6-chloro-8-(6-isopropoxy-5-(pyrrolidine-1-carbonyl)pyridin-2-ylamino)imidazo[1,2-b]pyridazine-3-carbonitrile (60 mg, 0.141 mmol) in NMP (200 μl) was added (1R,2R)-2-aminocyclohexanol (130 mg, 1.127 mmol). The reaction mixture was heated to 135° C. for 6 hours. The next day it was diluted with MeOH and purified by preparative HPLC using TFA conditions but the product was not pure. It was purified a second time to isolate 14.90 mg (0.020 mmol, 14.44% yield) of product as a TFA salt. LC retention time 3.63 min [B]. MS (ES+) m/z: 505 (MH+).

$^1$H NMR (400 MHz, chloroform-d):
δ 9.06 (s, 1H), 7.87 (s, 1H), 7.58 (s, 1H), 7.52 (d, J=7.9 Hz, 1H), 6.53 (d, J=8.3 Hz, 1H), 5.13 (quin, J=6.2 Hz, 1H), 3.65-3.57 (m, 4H), 3.40-3.26 (m, 2H), 2.36-2.06 (m, 2H), 2.00-1.71 (m, 8H), 1.51-1.40 (m, 1H), 1.35-1.31 (d, 6H), 1.27-1.13 (m, 2H)

Table 1 discloses compounds of the invention prepared in a manner similar to Example 1.

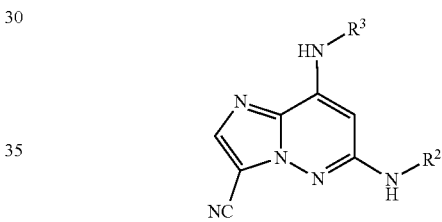

TABLE 1

| Ex. No. | R³ | R² | Rxn Temp. for step 2 | Rxn Time for step 2 | Rt (min) [Method] | m/z [M + H]⁺ |
|---|---|---|---|---|---|---|
| 2 | pyrrolidinyl-pyridine-carbonyl-pyrrolidine | cyclohexanol | 135° C. | 2 hours | 3.62 [B] | 516 |
| 3 | dimethylamino-pyridine-carbonyl-pyrrolidine | cyclohexanol | 135° C. | 2 hours | 3.49 [B] | 490 |

TABLE 1-continued

| Ex. No. | R³ | R² | Rxn Temp. for step 2 | Rxn Time for step 2 | Rt (min) [Method] | m/z [M + H]⁺ |
|---|---|---|---|---|---|---|
| 4 | 2-(2,2,2-trifluoroethoxy)-6-(pyrrolidine-1-carbonyl)pyridin-3-yl | trans-2-hydroxycyclohexyl | 135° C. | 5 hours | 3.68 [B] | 545 |
| 5 | 2-tert-butoxy-6-(pyrrolidine-1-carbonyl)pyridin-3-yl | trans-2-hydroxycyclohexyl | 135° C. | 3 hours | 3.75 [B] | 519 |
| 6 | 6-(3-tert-butyl-2-oxoimidazolidin-1-yl)pyridin-2-yl | trans-2-hydroxycyclohexyl | 145° C. | 2 hours | 3.83 [C] | 490 |
| 7 | 6-(pivalamido)pyridin-2-yl | trans-2-hydroxycyclohexyl | 150° C. | 4 hours | 3.72 [C] | 449 |
| 8 | 6-(1-methylcyclopropanecarboxamido)pyridin-2-yl | trans-2-hydroxycyclohexyl | 140° C. | 5 hours | 3.61 [C] | 447 |
| 9 | 6-(2-hydroxy-2-methylpropanamido)pyridin-2-yl | trans-2-hydroxycyclohexyl | 140° C. | 5 hours | 3.47 [C] | 451 |
| 10 | 6-benzamidopyridin-2-yl | trans-2-hydroxycyclohexyl | 140° C. | 5 hours | 3.73 [C] | 469 |

TABLE 1-continued

| Ex. No. | R³ | R² | Rxn Temp. for step 2 | Rxn Time for step 2 | Rt (min) [Method] | m/z [M + H]⁺ |
|---|---|---|---|---|---|---|
| 11 | (6-substituted pyridin-3-yl)(2,2-dimethylpyrrolidin-1-yl)methanone | trans-2-hydroxycyclohexyl | 160° C. | 2 days | 3.23 [D] | 475 |
| 12 | (2-tert-butoxy-pyridin-3-yl)(pyrrolidin-1-yl)methanone | trans-2-hydroxycyclohexyl | 135° C. | 3 hours | 3.76 [B] | 519 |
| 13 | (2-(2,2-difluoroethoxy)pyridin-3-yl)(pyrrolidin-1-yl)methanone | trans-2-hydroxycyclohexyl | 135° C. | 6 hours | 3.50 [E] | 527 |
| 14 | (2-(pyrrolidin-1-yl)pyridin-3-yl)(pyrrolidin-1-yl)methanone | trans-2-hydroxycyclohexyl | 135° C. | 5 hours | 2.25 [F] | 516 |
| 15 | (2-(3-fluoroazetidin-1-yl)pyridin-3-yl)(pyrrolidin-1-yl)methanone | trans-2-hydroxycyclohexyl | 130° C. | 9 hours | 2.21 [G] | 520 |
| 16 | (6-substituted pyridin-3-yl)(2,2-dimethylpyrrolidin-1-yl)methanone | trans-2-hydroxycyclohexyl | 160° C. | 2 days | 2.36 [H] | 475 |

TABLE 1-continued

| Ex. No. | R³ | R² | Rxn Temp. for step 2 | Rxn Time for step 2 | Rt (min) [Method] | m/z [M + H]⁺ |
|---|---|---|---|---|---|---|
| 17 | pyridine-2-carboxamide, N-tert-butyl | 1-hydroxyadamantyl | 180° C. | Overnight | 3.81 [C] | 501 |
| 18 | 8-methoxyquinolin-2-yl | 1-hydroxyadamantyl | 160° C. | Overnight | 3.31 [C] | 482 |
| 19 | 4,8-bis(trifluoromethyl)-1,8-naphthyridin-2-yl (2,7-bis-CF₃) | dihydroxyadamantyl | 160° C. | Overnight | 2.28 [G] | 605 |
| 20 | 6-(trifluoromethyl)pyridin-2-yl | dihydroxyadamantyl | 160° C. | 16 hours | 3.00 [I] | 486 |
| 21 | 3-methoxy-6-(pivalamido)pyridin-2-yl | dihydroxyadamantyl | 160° C. | 22 hours | 1.96 [J] | 547 |
| 22 | 8-methoxyquinolin-2-yl | fluoro-hydroxyadamantyl | 160° C. | Overnight | 3.10 [C] | 500 |
| 23 | 5-(pyrrolidine-1-carbonyl)pyridin-2-yl | tetrahydropyran-4-yl | 120° C. | 20 hours | 1.70 [F] | 433 |

TABLE 1-continued
| Ex. No. | R³ | R² | Rxn Temp. for step 2 | Rxn Time for step 2 | Rt (min) [Method] | m/z [M + H]⁺ |
|---|---|---|---|---|---|---|
| 24 | 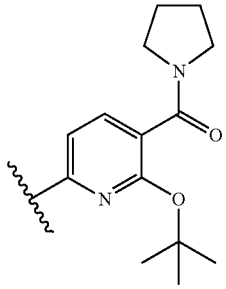 [SMILES: *c1ccc(C(=O)N2CCCC2)c(OC(C)(C)C)n1] | 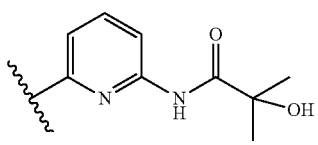 [SMILES: *c1cccc(NC(=O)C(C)(C)O)n1] | 130° C. | 11 hours | 2.42 [K] | 505 |
| 25 | 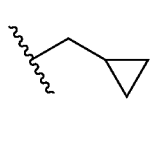 | 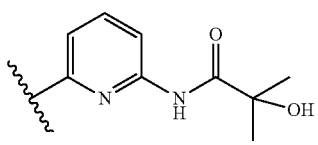 [SMILES: *c1cccc(NC(=O)C(C)(C)O)n1] | 140° C. | 5 hours | 3.42 [C] | 437 |
| 26 | 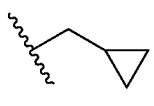 [SMILES: *CC1CC1] | 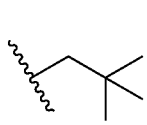 [SMILES: *CC(C)(C)C] | 110° C. | 16 hours | 3.70 [I] | 405 |
| 27 | 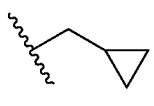 [SMILES: *CC1CC1] | 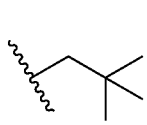 [SMILES: *CC(C)(C)C] | 110° C. | 16 hours | 3.53 [I] | 389 |
| 28 | 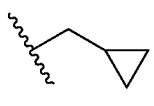 [SMILES: *CC1CC1] | 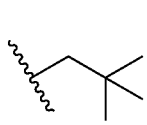 [SMILES: *CC(C)(C)C] | 110° C. | 16 hours | 3.74 [I] | 405 |
| 66 | 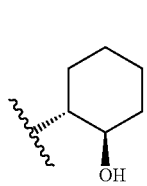 [SMILES: *[C@@H]1CCCC[C@H]1O] | 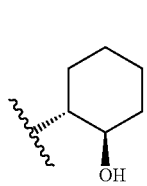 [SMILES: *[C@@H]1CCCC[C@H]1O] | 150° C. | Overnight | 1.57 [J] | 365 |
Example 43
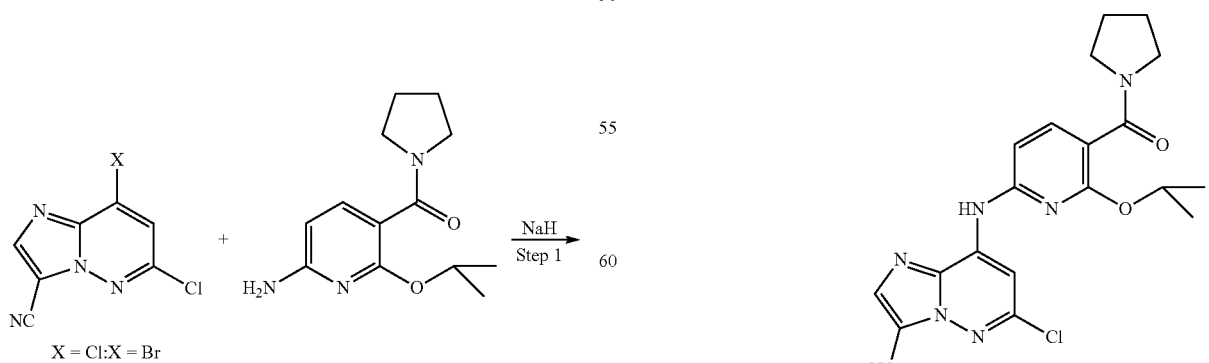

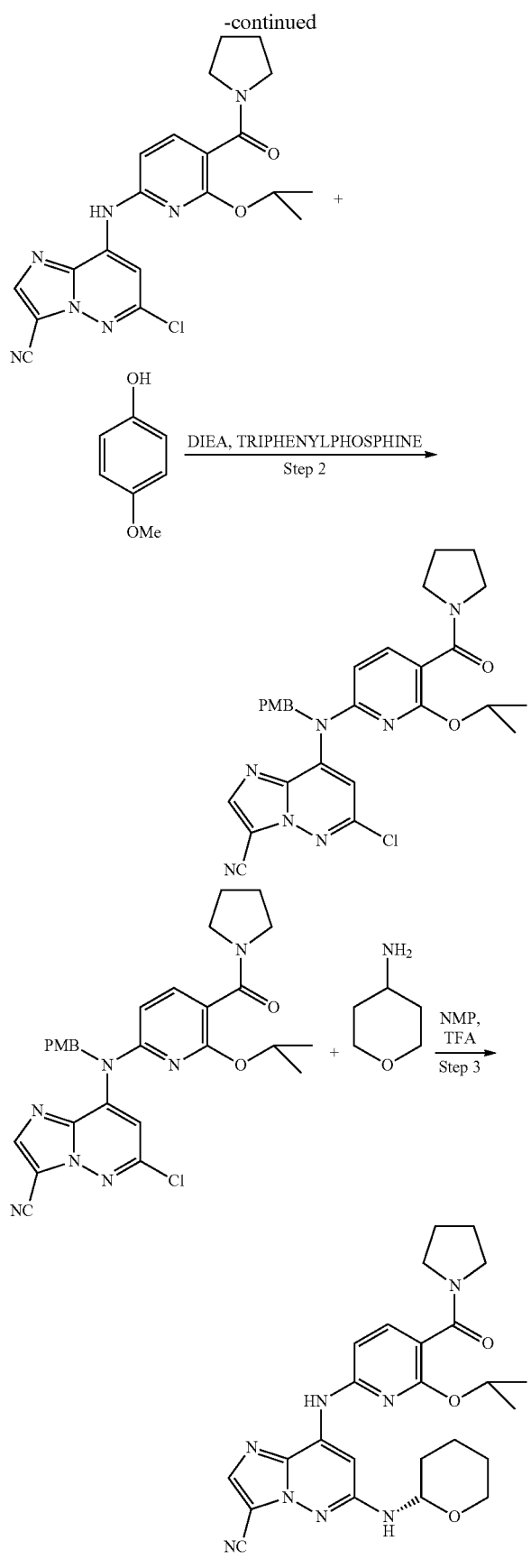

Step 1

To 6,8-dichloroimidazo[1,2-b]pyridazine-3-carbonitrile (190 mg, 0.892 mmol) and (6-amino-2-isopropoxypyridin-3-yl)(pyrrolidin-1-yl)methanone (222 mg, 0.892 mmol) in THF (0.5 mL) was added NaH (143 mg, 3.57 mmol). The reaction was stirred at room temperature for 1 hour. LC-MS showed product formation. The reaction was quenched via the addition of water resulting in the formation of a precipitate, which was collected to give 380 mg of product. The product was used as is in next step. LC retention time 3.79 min [B]. MS (ES+) m/z: 426 (MH$^+$).

Step 2

A mixture of 6-chloro-8-(6-isopropoxy-5-(pyrrolidine-1-carbonyl)pyridin-2-ylamino)imidazo[1,2-b]pyridazine-3-carbonitrile (380 mg, 0.892 mmol), 4-methoxybenzyl alcohol (167 µL, 1.338 mmol), and triphenylphosphine (351 mg, 1.338 mmol) were suspended in THF (2.97 mL) and treated with diisopropyl azodicarboxylate (0.26 mL, 1.338 mmol) in a drop wise manner. The solution was stirred for 30 min. The solvent was removed in vacuum to give an oil, which was purified by SCX column collecting 450 mg of the product. LC retention time 3.80 min [B]. MS (ES+) m/z: 546 (MH$^+$).

Step 3

To 6-chloro-8-((6-isopropoxy-5-(pyrrolidine-1-carbonyl)pyridin-2-yl)(4-methoxybenzyl)amino)imidazo[1,2-b]pyridazine-3-carbonitrile (80 mg, 0.147 mmol) in N-Methyl-2-pyrrolidone (NMP) (244 µL) was added tetrahydro-2H-pyran-4-amine (148 mg, 1.465 mmol). The reaction was heated at 130° C. for 4 hours, at which time water was added resulting in the formation of a precipitate, which was collected. 2 ml of TFA was added and the reaction was stirred at 60° C. for 1 hour. The reaction was concentrated to dryness on the rotary evaporator and the sample was diluted with dimethylformamide (DMF). The crude material was purified via Preparative LC-MS. Fractions containing the desired product were combined and dried via centrifugal evaporation. The yield of the product was 14.5 mg (0.030 mmol, 20.17% yield), and its purity was 100%. LC retention time 2.28 min [G]. MS (ES+) m/z: 491 (MH$^+$).

$^1$H NMR (500 MHz, methanol-d$_4$):

δ 7.85 (s, 1H), 7.59 (d, J=8.0 Hz, 1H), 7.44 (s, 1H), 6.67 (d, J=8.0 Hz, 1H), 5.36 (quin, J=6.1 Hz, 1H), 3.99 (dd, J=9.6, 3.5 Hz, 3H), 3.61-3.53 (m, 4H), 3.36 (t, J=6.7 Hz, 2H), 2.10 (dd, J=12.6, 2.1 Hz, 2H), 2.02-1.95 (m, 2H), 1.93-1.87 (m, 2H), 1.66-1.54 (m, 2H), 1.39 (d, J=6.4 Hz, 6H)

Example 29

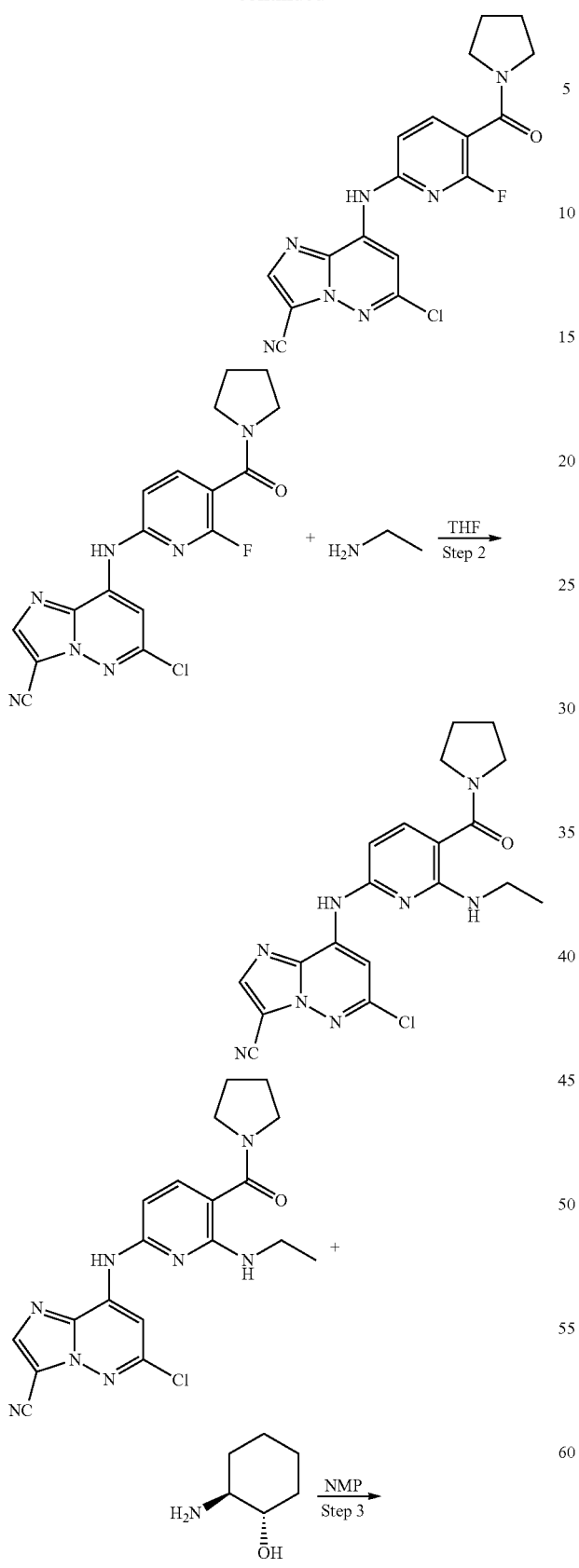

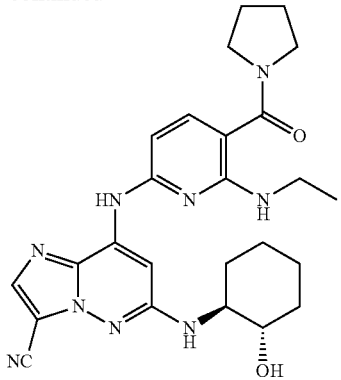

Step 1

To 6,8-dichloroimidazo[1,2-b]pyridazine-3-carbonitrile (205 mg, 0.962 mmol) and (6-amino-2-fluoropyridin-3-yl)(pyrrolidin-1-yl)methanone (201 mg, 0.962 mmol) in THF (1.0 mL) was added NaH (154 mg, 3.85 mmol). The reaction was allowed to stir at room temperature for 1 hour. The reaction was quenched with water and the precipitate was collected. It was washed with water and air dried to give 370 mg of product. It was used as is in next step. LC retention time 3.45 min [B]. MS (ES+) m/z: 386 (MH+).

Step 2

To 6-chloro-8-(6-fluoro-5-(pyrrolidine-1-carbonyl)pyridin-2-ylamino)imidazo[1,2-b]pyridazine-3-carbonitrile (70 mg, 0.181 mmol) was added ethanamine (1 mL, 2.000 mmol). The reaction was allowed to stir at 90° C. for 4 hours. LC-MS showed product. The reaction was quenched with sodium bicarbonate, extracted with dichloromethane and concentrated to dryness. 75 mg of product was isolated. It was used as is in following step. LC retention time 3.82 min [B]. MS (ES+) m/z: 411 (MH+).

Step 3

To 6-chloro-8-(6-(ethylamino)-5-(pyrrolidine-1-carbonyl)pyridin-2-ylamino)imidazo[1,2-b]pyridazine-3-carbonitrile (45 mg, 0.110 mmol) in NMP (0.2 mL) was added (1S,2S)-2-aminocyclohexanol (101 mg, 0.876 mmol). The reaction was heated to 135° C. for 4 hours. The reaction mixture was diluted with MeOH and purified by preparative LC-MS using TFA conditions. 10.00 mg (12.7% yield) of product as a TFA salt was isolated. LC retention time 3.86 min [B]. MS (ES+) m/z: 490 (MH+).

$^1$H NMR (400 MHz, chloroform-d):

δ 7.93-7.82 (m, 2H), 7.60 (d, J=7.9 Hz, 1H), 6.44 (d, J=8.3 Hz, 1H), 3.80-3.53 (m, 6H), 3.52-3.44 (m, 2H), 2.31-2.10 (m, 2H), 1.97 (br. s., 4H), 1.86-1.70 (m, 2H), 1.55-1.16 (m, 7H)

Preparation 2

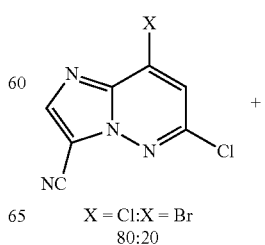

X = Cl:X = Br
80:20

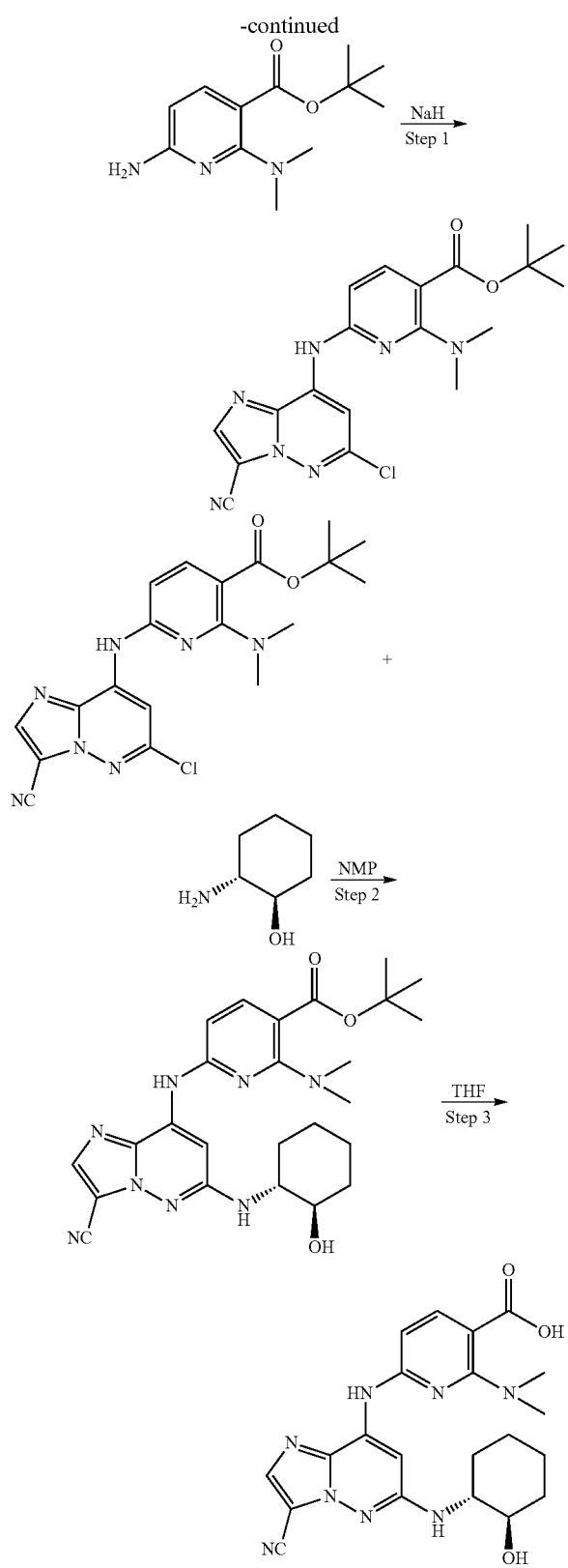

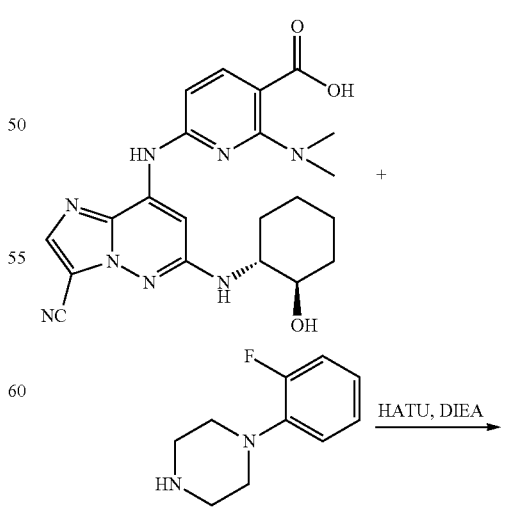

The reaction was allowed to stir at room temperature for 1 hour. LC-MS showed product. The reaction was quenched with water and the precipitate was collected. 156 mg (85% yield) of product was isolated. LC retention time 4.17 min [E]. MS (ES+) m/z: 414 (MH$^+$).

$^1$H NMR (400 MHz, DMSO-d$_6$):

δ 8.61 (s, 1H), 8.51 (s, 1H), 7.87 (d, J=8.4 Hz, 1H), 6.90 (d, J=8.1 Hz, 1H), 3.02 (s, 6H), 1.52 (s, 9H)

Step 2

To tert-butyl 6-(6-chloro-3-CNimidazo[1,2-b]pyridazin-8-ylamino)-2-(dimethylamino)nicotinate (1200 mg, 2.90 mmol) in NMP (5000 µl) was added (1R,2R)-2-aminocyclohexanol (2672 mg, 23.20 mmol). Let heat to 130° C. for 16 hours. LC-MS showed product, amidine byproduct of product, starting material and amidine byproduct of starting material. Water was added and the precipitate was collected. This reaction was combined with another batch and purified by flash chromatography eluting with 98/2 dichloromethane/MeOH. 562 mg of product was isolated to give a combined yield of 30%. LC retention time 3.96 min [E]. MS (ES+) m/z: 493 (MH$^+$).

Step 3

To tert-butyl 6-(3-CN-6-((1R,2R)-2-hydroxycyclohexylamino)imidazo[1,2-b]pyridazin-8-ylamino)-2-(dimethylamino)nicotinate (560 mg, 1.137 mmol) in dichloromethane (10 mL) was added TFA (10 ml) at 0° C. After 15 minutes, the reaction was allowed to warm to room temperature. After 8 hours, LC-MS still showed some starting material. The reaction was let stand in fridge overnight. LC-MS showed mostly TFA ester of product, a bit of starting material and a bit of decarboxylated product. The reaction mixture was concentrated to dryness, quenched with 2 N ammonia in MeOH, concentrated to dryness and then neutralized by SCX to give 432 mg of product. It was used as is in next step. LC retention time 3.05 min [E]. MS (ES+) m/z: 437 (MH$^+$).

Example 30

Step 1

To 6,8-dichloroimidazo[1,2-b]pyridazine-3-carbonitrile (94 mg, 0.442 mmol) and tert-butyl 6-amino-2-(dimethylamino)nicotinate (105 mg, 0.442 mmol) in THF (1.0 mL) and DMF (1.0 mL) was added NaH (70.8 mg, 1.770 mmol).

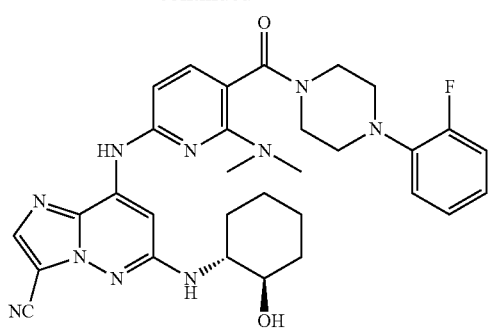

To 6-(3-CN-6-((1R,2R)-2-hydroxycyclohexylamino)imidazo[1,2-b]pyridazin-8-ylamino)-2-(dimethylamino)nicotinic acid (16 mg, 0.037 mmol) and 1-(2-fluorophenyl)piperazine (19.82 mg, 0.110 mmol) in DMF (305 μL) was added 1-[bis(dimethylamino)methylene]-1H-1,2,3-triazolo[4,5-b]pyridinium 3-oxid hexafluorophosphate (HATU) (15.33 mg, 0.040 mmol) and then N,N-diisopropylethylamine (DIEA) (19.21 μL, 0.110 mmol). Reaction was allowed to stir at room temperature for 1½ hours. The crude material was purified via preparative LC-MS. Fractions containing the desired product were combined and dried via centrifugal evaporation. The yield of the desired product was 5.7 mg, and its purity was 97%. LC retention time 2.85 min [K]. MS (ES+) m/z: 599 (MH+).

$^1$H NMR (400 MHz, methanol-$d_4$):

δ 7.84 (s, 1H), 7.76 (s, 1H), 7.45 (d, J=8.1 Hz, 1H), 7.11-6.92 (m, 4H), 6.44 (d, J=8.1 Hz, 1H), 4.08-3.78 (m, 2H), 3.67-3.51 (m, 3H), 3.51-3.42 (m, 1H), 3.15-3.07 (m, 8H), 2.98 (s, 1H), 2.86 (d, J=0.7 Hz, 1H), 2.23 (d, J=13.2 Hz, 1H), 2.05 (d, J=11.9 Hz, 1H), 1.84-1.67 (m, 2H), 1.46-1.19 (m, 5H)

Table 2 discloses compounds of the invention prepared in a manner similar to Example 30.

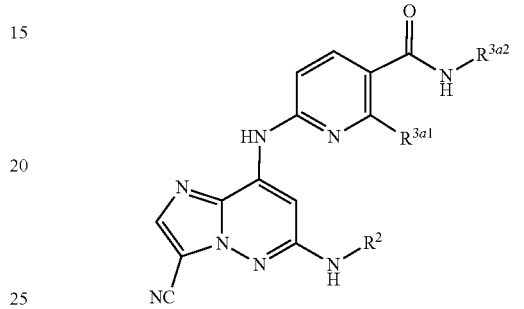

| Ex. No. | $R^{3a2}$ | $R^{3a1}$ | $R^2$ | Reaction Temp. for step 2 | Reaction Time for step 2 | Rt (min) [Method] | m/z [M + H]+ |
|---|---|---|---|---|---|---|---|
| 31 | (2-pyridylethyl) | N(CH3)2 | trans-2-hydroxycyclohexyl | 130° C. | 16 | 2.21 [K] | 555 |
| 32 | (methoxyethyl) | N(CH3)2 | trans-2-hydroxycyclohexyl | 130° C. | 16 | 2.13 [K] | 494 |
| 33 | (CF3-pyrrolidinyl) | OCH2CHF2 | trans-2-hydroxycyclohexyl | 130° C. | 16 | 2.61 [G] | 595 |
| 34 | (norbornylamino) | OCH2CHF2 | trans-2-hydroxycyclohexyl | 130° C. | 16 | 2.40 [G] | 553 |
| 35 | (tetrahydrofuranylmethyl) | OCH2CHF2 | trans-2-hydroxycyclohexyl | 130° C. | 16 | 2.49 [K] | 557 |

-continued

| Ex. No. | R³ᵃ² | R³ᵃ¹ | R² | Reaction Temp. for step 2 | Reaction Time for step 2 | Rt (min) [Method] | m/z [M + H]⁺ |
|---|---|---|---|---|---|---|---|
| 36 | (2,5-dimethylmorpholinyl) | OCH₂CHF₂ | 2-hydroxycyclohexyl | 130° C. | 8 | 2.48 [K] | 571 |
| 44 | 3-oxetanyl(methyl) | OCH₂CHF₂ | tetrahydropyran-4-yl | 130° C. | 24 | 1.94 [G] | 529 |
| 45 | (tetrahydrofuran-2-yl)methyl(methyl) | OCH₂CHF₂ | tetrahydropyran-4-yl | 130° C. | 24 | 2.25 [G] | 543 |
| 46 | 2-azabicyclo[2.2.1]heptyl | OCH₂CHF₂ | tetrahydropyran-4-yl | 130° C. | 24 | 2.35 [G] | 539 |
| 47 | 3-cyanopyrrolidinyl | OCH₂CHF₂ | tetrahydropyran-4-yl | 130° C. | 24 | 2.24 [K] | 538 |
| 48 | 3-(dimethylamino)pyrrolidinyl | OCH₂CHF₂ | tetrahydropyran-4-yl | 130° C. | 24 | 1.84 [K] | 556 |
| 49 | 2-(trifluoromethyl)pyrrolidinyl | OCH₂CHF₂ | tetrahydropyran-4-yl | 130° C. | 24 | 2.59 [K] | 581 |

Preparation 3

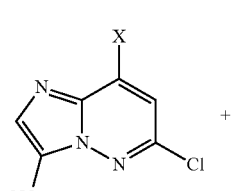

X = Cl:X = Br
80:20

+

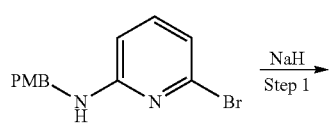

$\xrightarrow{\text{NaH}}$ Step 1

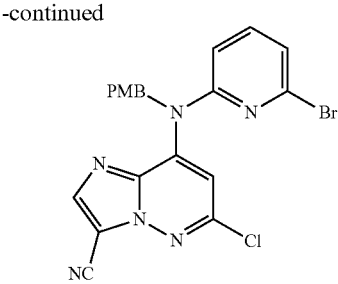

Step 1

6-bromo-N-(4-methoxybenzyl)pyridin-2-amine (5.424 g, 18.50 mmol) was dissolved in DMF (30 mL) and cooled over ice. Sodium hydride (1.110 g, 27.8 mmol) was cautiously added to the reaction mixture. After stirring for 30 minutes, 6,8-dichloroimidazo[1,2-b]pyridazine-3-carbonitrile (3.94 g, 18.50 mmol) was added and the contents stirred at room temperature. After 1 hour, LC-MS detected a single product at 1.13 minutes with a (M+H)+=470.8/472.5. Water was poured carefully into the mixture at 0° C., and then it was extracted with ethyl acetate (3×). The organic layers were collected, washed with brine, dried (sodium sulfate), and the solvent was evaporated to yield 19.32 g of a brown oil. LC-MS detected product at 1.14 minutes with a (M+H)+= 470.9/472.8. The crude mixture was purified with silica gel chromatography. 7.3 g Of a light yellow amorphous solid product was obtained. LC retention time 2.23 min [J]. MS (ES+) m/z: 470 (MH+).

$^1$H NMR (400 MHz, chloroform-d):

δ 8.01 (s, 1H), 7.55-7.47 (m, 1H), 7.32 (dd, J=7.8, 0.6 Hz, 1H), 7.27 (d, J=1.0 Hz, 2H), 6.99 (dd, J=7.9, 0.4 Hz, 1H), 6.82 (d, J=8.6 Hz, 2H), 6.73 (s, 1H), 5.61 (s, 2H), 3.77 (s, 3H)

Example 37

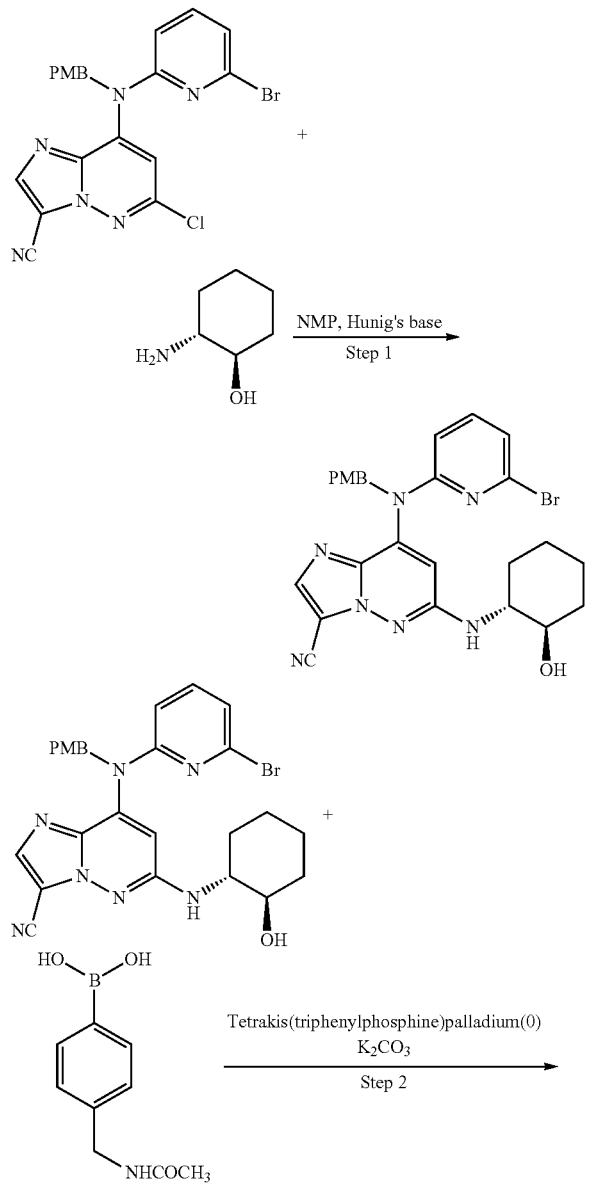

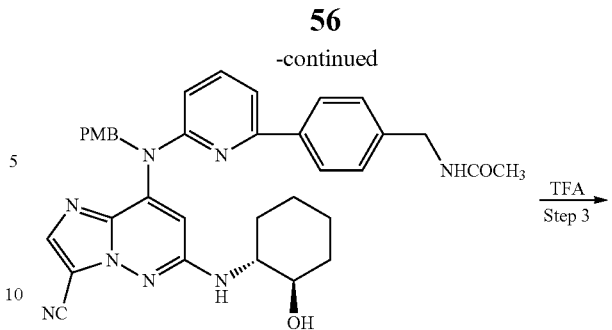

Step 1

8-((6-bromopyridin-2-yl)(4-methoxybenzyl)amino)-6-chloroimidazo[1,2-b]pyridazine-3-carbonitrile (0.094 g, 0.2 mmol), NMP (1 mL), Hunig's Base (0.349 mL, 2.000 mmol) and (1R,2R)-2-aminocyclohexanol (0.046 g, 0.400 mmol) were heated at 150° C. overnight. LC-MS showed complete reaction with no starting material. The reaction was combined with another the same reaction. The volatiles were evaporated and the crude product was purified with silica gel chromatography. Weight of crude product was 3.51 g of a brown viscous liquid. LC retention time 2.19 min [J]. MS (ES+) m/z: 549 (MH+).

Step 2

In a 10 mL micro vial 8-((6-bromopyridin-2-yl)(4-methoxybenzyl)amino)-6-(((1R,2R)-2-hydroxycyclohexyl)amino)imidazo[1,2-b]pyridazine-3-carbonitrile (150 mg, 0.274 mmol), (4-(acetamidomethyl)phenyl)boronic acid (63.3 mg, 0.328 mmol), K$_2$CO$_3$ (151 mg, 1.094 mmol) and tetrakis(triphenylphosphine)palladium(0) (22.12 mg, 0.019 mmol) were dissolved in dioxane (3.0 mL) and water (1.0 mL). Then reaction mass was degasified with nitrogen and heated to 100° C. for 12 hours. Then it was submitted to LC-MS. LC-MS showed 36% product formation. The reaction was quenched with water and extracted with ethyl acetate (3×5 mL), the combined organic layers were washed with saturated brine, dried over Na$_2$SO$_4$ and concentrated. The crude was purified by combi flash 12 gm silica chromatography on elution of 50-60% ethyl acetate: pet ether. Product fractions were combined and concentrated to get N-(4-(6-((3-CN-6-(((1R,2R)-2-hydroxycyclohexyl)amino)imidazo[1,2-b]pyridazin-8-yl)(4-methoxybenzyl)amino)pyridin-2-yl)benzyl)acetamide (100 mg, 0.149 mmol, 54.5% yield). LC retention time 2.26 min [A]. MS (ES+) m/z: 617 (MH+).

Step 3

To a 25 mL round-bottomed flask N-(4-(6-((3-CN-6-(((1R,2R)-2-hydroxycyclohexyl)amino)imidazo[1,2-b]

pyridazin-8-yl)(4-methoxybenzyl) amino)pyridin-2-yl)benzyl)acetamide (100 mg, 0.162 mmol) and TFA (3.5 mL) were added. Then reaction mixture was stirred at 70° C. for 2 hours. LC-MS showed 89% product formation. The reaction was concentrated to remove most of the residual TFA, to the residue was added NaHCO₃ (saturated aqueous solution), and the product was extracted with ethyl acetate (3×5 mL). The combined organic layers were washed with water and brine, dried over Na₂SO₄ and concentrated. Crude product was purified by preparative HPLC to afford N-(4-(6-((3-CN-6-(((1R,2R)-2-hydroxycyclohexyl)amino)imidazo[1,2-b]pyridazin-8-yl)amino)pyridin-2-yl)benzyl)acetamide (68.45 mg, 0.136 mmol, 84% yield). LC retention time 1.82 min [L]. MS (ES+) m/z: 497 (MH⁺).

Table 3 discloses compounds of the invention prepared in a manner similar to Example 37.

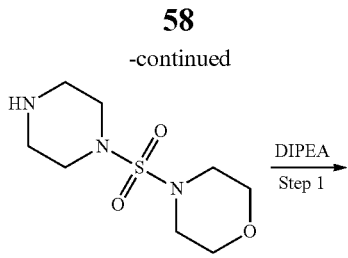

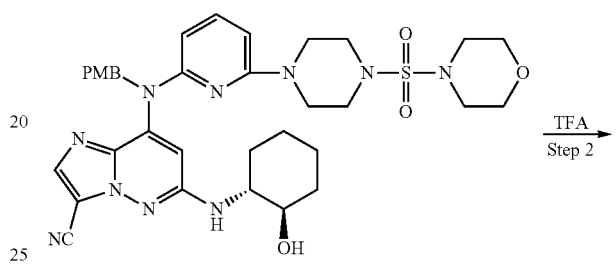

| Ex. No. | R³ | R² | Reaction Temp. for step 1 | Reaction Time for step 1 | Rt (min) [Method] | m/z [M + H]⁺ |
|---|---|---|---|---|---|---|
| 38 | | | 150° C. | Overnight | 1.89 [L] | 533 |
| 50 | | | 140° C. | Overnight | 1.81 [L] | 483 |

Example 39

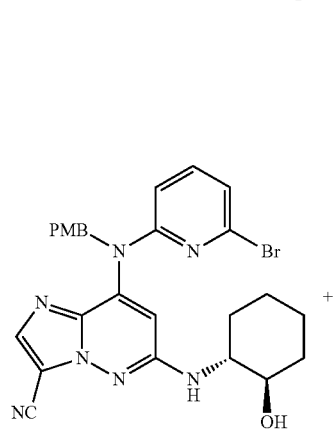

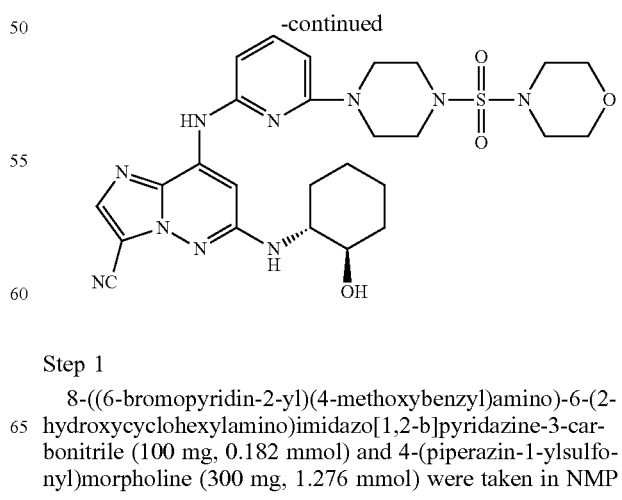

Step 1

8-((6-bromopyridin-2-yl)(4-methoxybenzyl)amino)-6-(2-hydroxycyclohexylamino)imidazo[1,2-b]pyridazine-3-carbonitrile (100 mg, 0.182 mmol) and 4-(piperazin-1-ylsulfonyl)morpholine (300 mg, 1.276 mmol) were taken in NMP (0.6 mL) N,N-diisopropylethylamine (DIPEA) (0.318 ml, 1.823 mmol) was added and the reaction was heated at 150° C. overnight. The crude sample was submitted for LC-MS analysis, which showed 70% product formation. The reaction mixture was diluted by adding water and extracted with ethyl acetate (3×25 mL). The organic layers were combined, dried over sodium sulphate, filtered and then concentrated. The crude sample was purified using 4 g silicycle column to afford 77 mg compound with 93% purity by LC-MS. The sample was carried to the next step. LC retention time 2.01 min [A]. MS (ES+) m/z: 703 (MH+).

Step 2

6-((1R,2R)-2-hydroxycyclohexylamino)-8-((4-methoxybenzyl)(6-(4-(morpholinosulfonyl)piperazin-1-yl)pyridin-2-yl)amino)imidazo[1,2-b]pyridazine-3-carbonitrile (77 mg, 0.110 mmol) was taken in TFA (volume: 1.5 mL) and the reaction mixture was heated at 50° C. for one hour. The crude sample was submitted for LC-MS. LC-MS showed 70% product. TFA was concentrated and the crude sample was submitted for Preparative HPLC purification to afford 24.72 mg off-white TFA salt (0.041 mmol, 37.2% yield). LC retention time 1.97 min [L]. MS (ES+) m/z: 583 (MH+).

Example 40

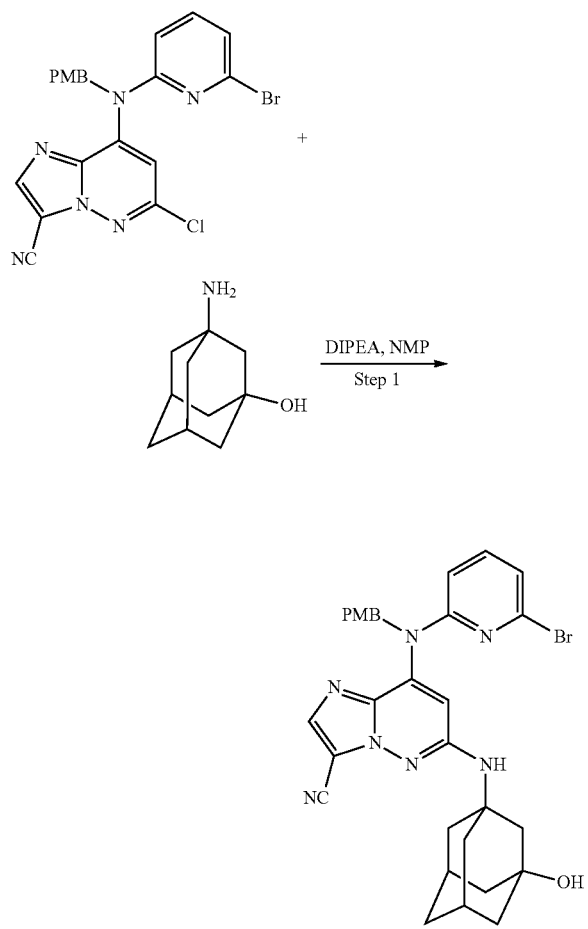

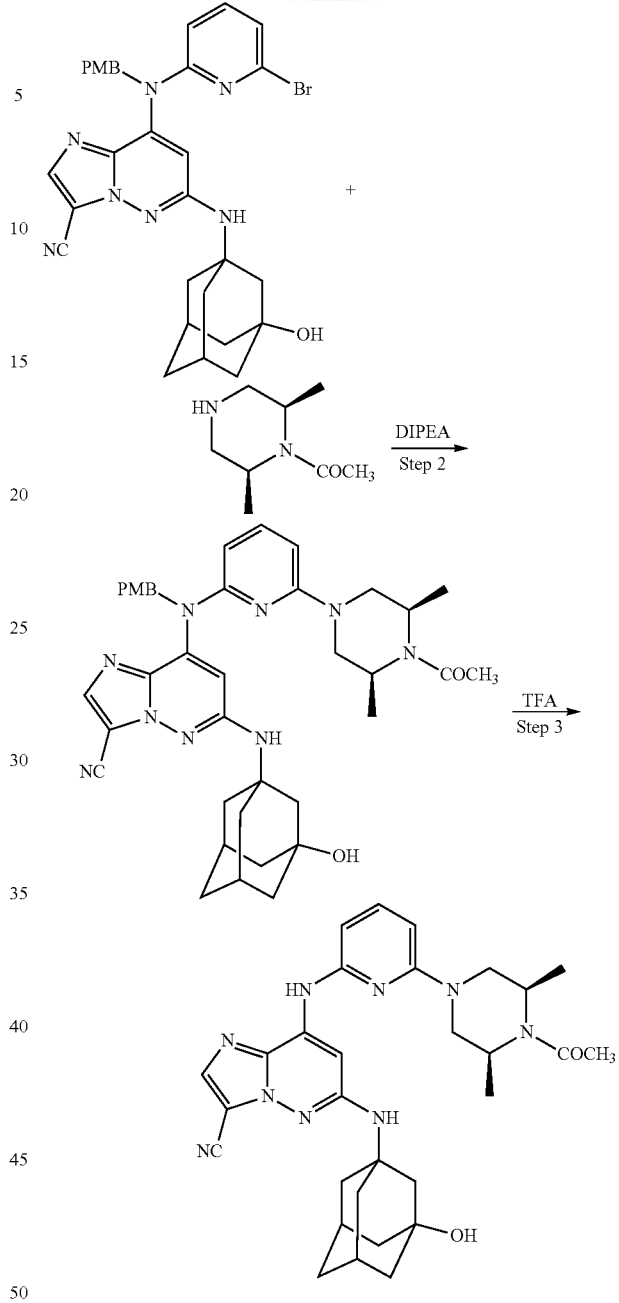

Step 1

8-((6-Bromopyridin-2-yl)(4-methoxybenzyl)amino)-6-chloroimidazo[1,2-b]pyridazine-3-carbonitrile (4.4 g, 9.37 mmol) and 3-amino-1-adamantanol (4.70 g, 28.1 mmol) were taken in N-methyl-2-pyrrolidinone (4 mL) in a 100 ml pressure tube, then DIPEA (8.19 mL, 46.9 mmol) was added and the reaction mixture was stirred at 150° C. for three days. The crude sample was diluted with water and then extracted with ethyl acetate (3×50 ml). The combined organic layers were washed with brine. The crude sample was purified using 120 g silicycle column. 3.4 g compound was obtained. LC retention time 2.11 min [L]. MS (ES+) m/z: 602 (MH+).

Step 2

In a small microwave tube 8-((6-bromopyridin-2-yl)(4-methoxybenzyl)amino)-6-(((1r,3s,5R,7S)-3-hydroxyadamantan-1-yl)amino)imidazo[1,2-b]pyridazine-3-carbonitrile (100 mg, 0.167 mmol), 1-((2S,6R)-2,6-dimethylpiperazin-1-yl)ethanone (130 mg, 0.833 mmol), DIPEA (0.5 mL, 2.86 mmol) and NMP (2 mL) were combined and heated to 150° C. for 10 hours. Reaction was monitored every 10 hours. After 40 hours, LC-MS indicated 68% product formation. The reaction mass was quenched with water and extracted with ethyl acetate (3×30 mL). The organic layers were combined, washed with water and brine solution. The organic layer was separated, dried over sodium sulphate and concentrated under vacuum. The crude residue was purified with combi 12 g column by eluting with 5-10% methanol/chloroform mixture to get the desired product as a light-yellow solid (60 mg, 0.089 mmol, 53.3% yield). LC retention time 2.09 min [L]. MS (ES+) m/z: 676 (MH+).

Step 3

In a 25 mL single neck round bottle flask reactant (60 mg, 0.089 mmol) and TFA (2 mL) were added at 0° C. under nitrogen atmosphere and heated to 50° C. for 2 hours. TFA was removed under vacuum and the sample was then diluted and re-concentrated twice from dichloromethane (10 mL). To the residue, 5 mL of 10% NaOH solution was added and the mixture stirred at room temperature for 2 hours. The reaction was diluted with water and extracted with ethyl acetate (3×15 mL). The organic layers were combined and washed with water and brine solution. The organic layer was separated, dried over sodium sulfate and concentrate under vacuum. The crude residue was purified by preparative HPLC to get the desired product as an off-white solid (4.18 mg, 0.0745 mmol, 8.39% yield). LC retention time 1.91 min [L]. MS (ES+) m/z: 556 (MH+).

$^1$H NMR (400 MHz, DMSO-d$_6$):

δ 8.12 (s, 1H), 7.51 (t, J=8.0 Hz, 1H), 7.34 (s, 1H), 6.66 (d, J=7.8 Hz, 1H), 6.48 (d, J=8.3 Hz, 1H), 4.10 (d, J=13.0 Hz, 2H), 3.08 (d, J=10.5 Hz, 2H), 2.72-2.62 (m, 1H), 2.38-2.31 (m, 1H), 2.26-2.04 (m, 7H), 2.01-1.88 (m, 4H), 1.67-1.48 (m, 6H), 1.23 (d, J=5.0 Hz, 6H)

Table 4 discloses compounds of the invention prepared in a manner similar to Example 40

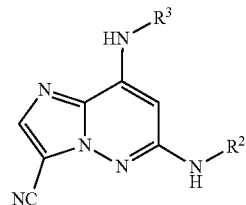

| Example number | R³ | R² | Rt (min) [Method] | m/z [M + H]⁺ |
|---|---|---|---|---|
| 54 | 6-(4-isopropylpiperazin-1-yl)pyridin-2-yl | trans-2-hydroxycyclohexyl | 1.64 [A] | 476 |
| 55 | 6-(4-(2-hydroxyethyl)piperazin-1-yl)pyridin-2-yl | trans-2-hydroxycyclohexyl | 1.62 [A] | 478 |
| 56 | 6-(3-oxomorpholino)pyridin-2-yl | trans-2-hydroxycyclohexyl | 1.52 [O] | 449 |
| 57 | 6-(4-ethyl-4-methyl-2,5-dioxoimidazolidin-1-yl)pyridin-2-yl | trans-2-hydroxycyclohexyl | 1.90 [A] | 490 |

-continued

| Example number | R³ | R² | Rt (min) [Method] | m/z [M + H]⁺ |
|---|---|---|---|---|
| 58 | pyridine-hydantoin-spirocyclohexane | cyclohexane-OH | 2.03 [A] | 516 |
| 59 | pyridine-caprolactam | cyclohexane-OH | 1.89 [P] | 461 |
| 60 | pyridine-piperazine-isobutyryl | cyclohexane-OH | 2.04 [A] | 504 |
| 61 | pyridine-pyrazole | cyclohexane-OH | | |
| 62 | pyridine-N-methylpiperazine | cyclohexane-OH | | |
| 63 | pyridine-piperazine-methanesulfonyl | cyclohexane-OH | | |
| 64 | pyridine-piperazine-acetyl | cyclohexane-OH | 1.77 [Q] | 476 |
| 65 | pyridine-morpholine | cyclohexane-OH | | |

Preparation 4

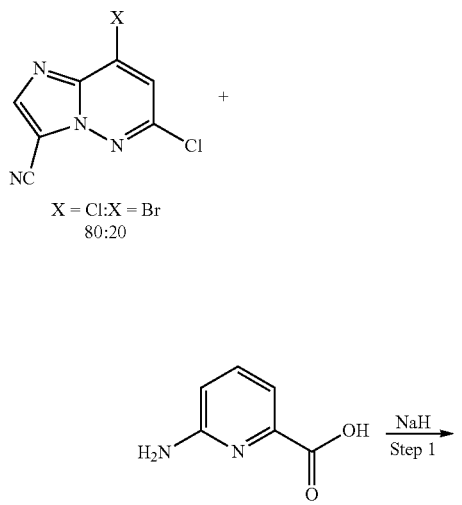

Step 1

6-aminopicolinic acid (2.68 g, 19.42 mmol) was dissolved in DMF (30 mL) at 25° C., with stirring under nitrogen, NaH (60% by weight, 3.11 g, 78 mmol) was added in 5 portions, waiting for gas evolution to cease before the next portion was added. 8-Bromo-6-chloroimidazo[1,2-b]pyridazine-3-carbonitrile (5.00 g, 19.42 mmol) was subsequently added. The mixture was stirred for 1 hour as an off-white suspension, during which time the reaction turned dark brown in color but it was still a suspension. The reaction was a very thick, very dark suspension. Water (25 mL) was added very carefully to control the hydrogen evolution. The mixture was a thick, dark suspension and was left stirring overnight, methanol was added to transfer the mixture to a larger flask. The mixture was stripped to remove the methanol to give a dark film. A little methanol was added and about 20 mL of water was added too. Some solids were still present. The mixture was stirred overnight. The solids were filtered and rinsed with a little heptane. The solids were stirred overnight in 1:1 Et$_2$O/MeOH (150 mL). The solids were filtered off and rinsed with a little Et$_2$O. The solids were pumped under high vacuum to give 6-(6-chloro-3-CNimidazo[1,2-b]pyridazin-8-ylamino)picolinic acid (6.00 g, 17.16 mmol, 88% yield) of dark tan solids as product. LC retention time 0.77 min [M]. MS (ES+) m/z: 315 (MH$^+$).

$^1$H NMR (400 MHz, DMSO-d$_6$):

δ 8.98 (s, 1H), 8.53 (s, 1H), 8.02-7.96 (m, 1H), 7.81 (d, J=8.4 Hz, 1H), 7.77 (d, J=7.5 Hz, 1H)

Example 41

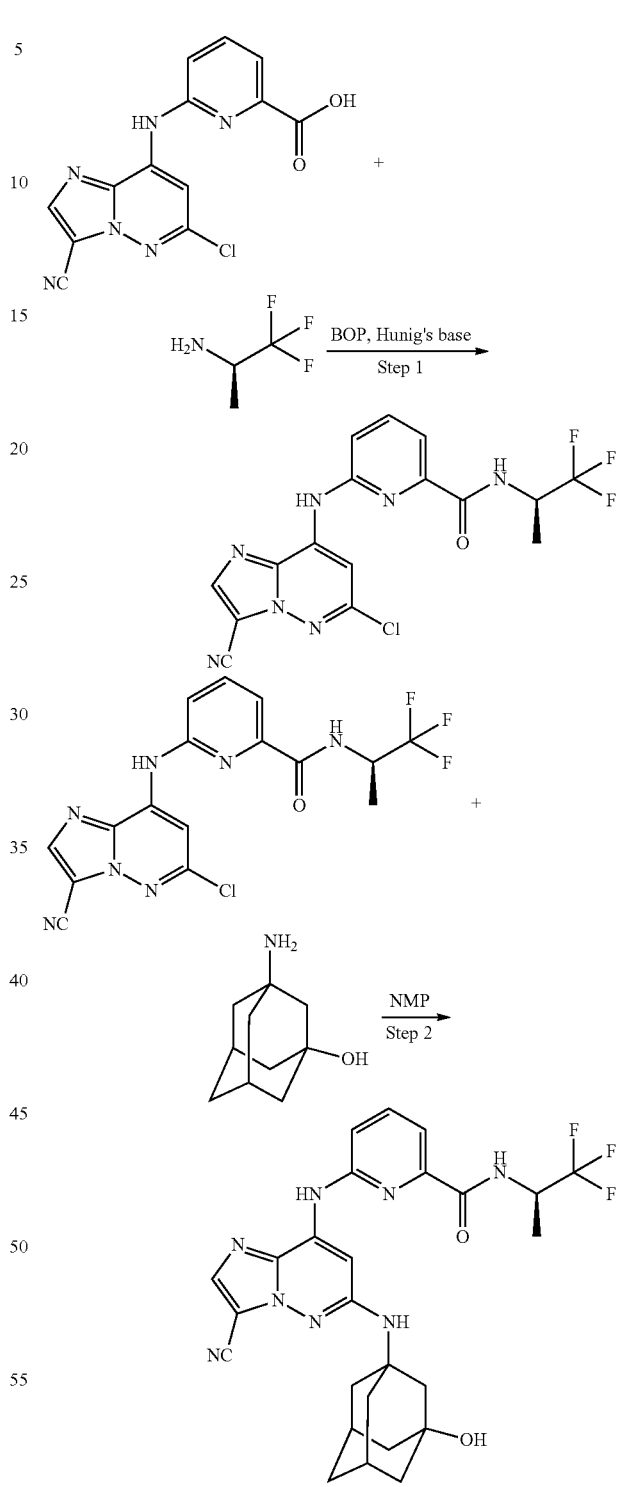

Step 1

6-(6-Chloro-3-CNimidazo[1,2-b]pyridazin-8-ylamino)picolinic acid (150 mg, 0.477 mmol), (R)-1,1,1-trifluoropropan-2-amine (53.9 mg, 0.477 mmol) and (benzotriazol-1-yloxy)tris(dimethylamino)phosphonium hexafluorophosphate (BOP) (253 mg, 0.572 mmol) were mixed in DMF (5 mL) at 25° C., followed by the addition of Hunig's Base (0.167 mL, 0.953 mmol). Water (5 mL) was added and the slurry was stirred for 15 minutes, at which point the solids were filtered off and collected. (R)-6-(6-chloro-3-CNimidazo[1,2-b]pyridazin-8-ylamino)-N-(1,1,1-trifluoropropan-2-yl)picolinamide (140 mg, 0.308 mmol, 64.5% yield) of tan solid was obtained as product. LC retention time 1.0 min [M]. MS (ES+) m/z: 410 (MH+).

Step 2

(R)-6-(6-Chloro-3-CNimidazo[1,2-b]pyridazin-8-ylamino)-N-(1,1,1-trifluoropropan-2-yl)picolinamide (86771-046-01) (25 mg, 0.061 mmol), 3-amino-1-adamantanol (20.41 mg, 0.122 mmol) and Hunig's Base (0.021 mL, 0.122 mmol) were mixed in NMP (Volume: 0.2 mL) at room temperature and then heated at 160° C. overnight. The crude material was purified via preparative LC-MS. Fractions containing the desired product were combined and dried via centrifugal evaporation. The yield of the product was 9.7 mg (0.015 mmol, 24.3% yield), and its purity was 100%. LC retention time 0.96 min [M]. MS (ES+) m/z: 541 (MH+).

Example 42

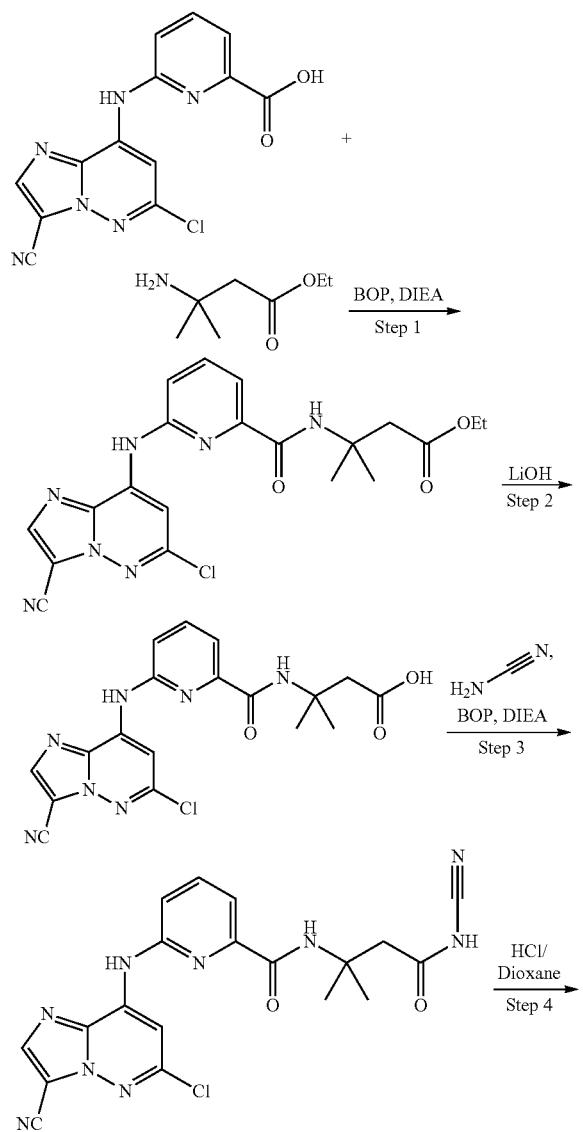

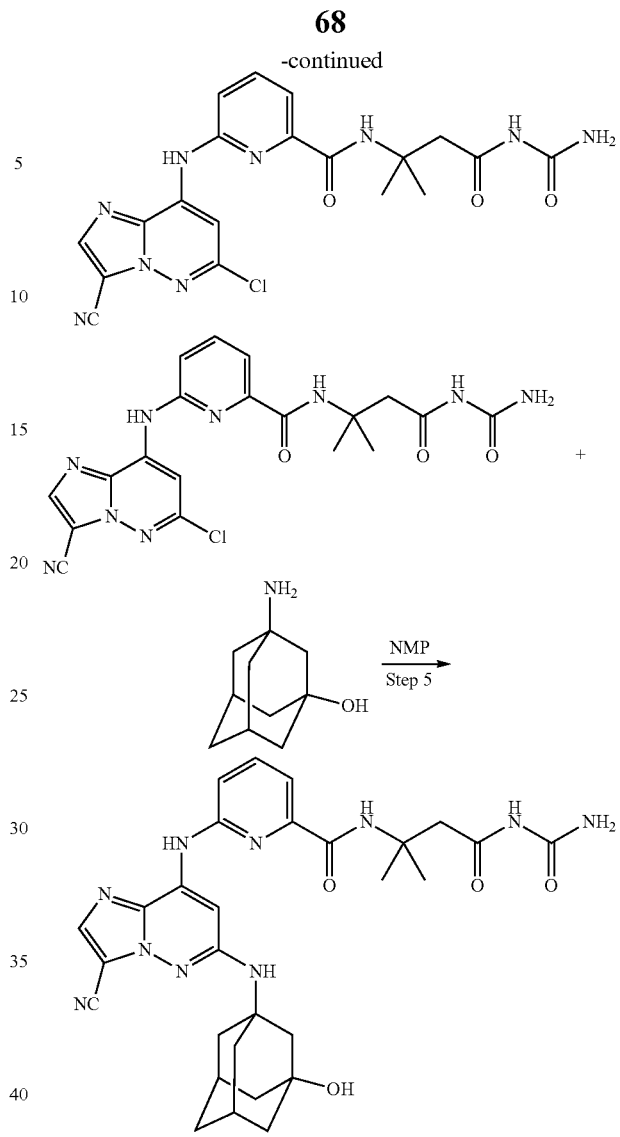

Step 1

To a solution of 6-(6-chloro-3-CNimidazo[1,2-b]pyridazin-8-ylamino)picolinic acid (300 mg, 0.953 mmol) in DMF (5 mL) was added ethyl 3-amino-3-methylbutanoate (180 mg, 1.239 mmol), DIEA (0.50 mL, 2.86 mmol), BOP (506 mg, 1.144 mmol), and stirred at room temperature for 16 hours. The reaction was diluted with water (10 mL) and then acidified using 1N (aq.) HCl (pH~6). The solid was collected, washed with water and Et₂O to give ethyl 3-(6-(6-chloro-3-CNimidazo[1,2-b]pyridazin-8-ylamino)picolinamido)-3-methylbutanoate. LC retention time 3.54 min [I]. MS (ES+) m/z: 442 (MH+).

Step 2

To a solution of ethyl 3-(6-(6-chloro-3-CNimidazo[1,2-b]pyridazin-8-ylamino)picolinamido)-3-methylbutanoate (0.398 g, 0.9 mmol) in THF (5 mL) and water (1 mL) was added lithium hydroxide (0.108 g, 4.50 mmol), and stirred at room temperature for 16 hours. The reaction was diluted with water (10 mL) and then acidified using 1N (aq.) HCl (pH~6). The solid was collected, washed with water and Et₂O to give 3-(6-(6-chloro-3-CNimidazo[1,2-b]pyridazin-8-ylamino)picolinamido)-3-methylbutanoic acid. LC retention time 3.17 min [I]. MS (ES+) m/z: 414 (MH+).

Step 3
To a solution of 3-(6-(6-chloro-3-CNimidazo[1,2-b]pyridazin-8-ylamino)picolinamido)-3-methylbutanoic acid (150 mg, 0.362 mmol) in DMF (5 mL) was added cyanamide (30.5 mg, 0.725 mmol), DIEA (0.19 mL, 1.087 mmol), BOP (192 mg, 0.435 mmol), and stirred at room temperature for 16 hours. The reaction was diluted with water (10 mL) and then acidified using 1N (aq.) HCl (pH~6). The solid was collected, washed with water and Et$_2$O to give 6-(6-chloro-3-CNimidazo[1,2-b]pyridazin-8-ylamino)-N-(4-cyanamido-2-methyl-4-oxobutan-2-yl)picolinamide. LC retention time 3.06 min [I]. MS (ES+) m/z: 438 (MH$^+$).

Step 4
To a solution of 6-(6-chloro-3-CNimidazo[1,2-b]pyridazin-8-ylamino)-N-(4-cyanamido-2-methyl-4-oxobutan-2-yl)picolinamide (30 mg, 0.069 mmol) in 4N HCl/1,4-dioxane (0.5 mL) was added water (0.2 mL) and stirred at 50° C. for 1 hour. The reaction was diluted with water (10 mL) and then acidified using 1N (aq.) HCl (pH~6). The solid was collected, washed with water and Et$_2$O to give 6-(6-chloro-3-CNimidazo[1,2-b]pyridazin-8-ylamino)-N-(2-methyl-4-oxo-4-ureidobutan-2-yl)picolinamide, LC retention time 3.03 min [I]. MS (ES+) m/z: 456 (MH$^+$).

Step 5
To a solution of 6-(6-chloro-3-CNimidazo[1,2-b]pyridazin-8-ylamino)-N-(2-methyl-4-oxo-4-ureidobutan-2-yl)picolinamide (40 mg, 0.088 mmol) in NMP (0.3 mL) was added (1s,3r,5R,7S)-3-aminoadamantan-1-ol (73.4 mg, 0.439 mmol), and stirred at 150° C. for 2 days. The reaction mixture was purified using preparative LCMS to provide the product. LC retention time 3.52 min [I]. MS (ES+) m/z: 544 (MH$^+$).

$^1$H NMR (500 MHz, DMSO-d$_6$):
δ 8.83 (s, 1H), 8.15 (s, 1H), 7.90-7.85 (t, 1H), 7.70-7.65 (m, 2H), 2.19 (br. s., 2H), 2.06-1.92 (m, 7H), 1.65-1.54 (m, 5H), 1.52 (s, 8H)

Preparation 5

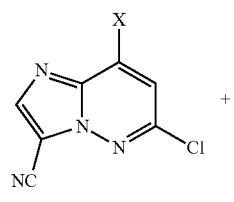

X = Cl:X = Br
80:20

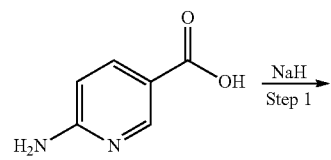

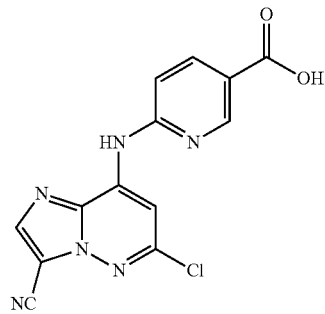

Step 1
6-Aminonicotinic acid (1.80 g, 13.03 mmol) was dissolved in DMF (10 mL), at 25° C., with stirring under nitrogen, NaH (2.085 g, 52.1 mmol) was added in 5 portions, waiting for gas evolution to cease before the next portion was added. Then 8-bromo-6-chloroimidazo[1,2-b]pyridazine-3-carbonitrile (5.00 g, 19.42 mmol) was added in 3 portions. LC-MS (TFA) detected (M+H)$^+$314.80 for product. The reaction was dark brown in color. Water (20 mL) was added carefully to control the hydrogen evolution. The mixture was a thick, dark suspension. Some solids were present. The reaction was carefully acidified to pH 5-6 with concentrated HCl and then stirred overnight. The solids were collected via filtration. The solids were pumped under high vacuum to give 6-(6-chloro-3-cyanoimidazo[1,2-b]pyridazin-8-ylamino)nicotinic acid (3.20 g, 8.64 mmol, 66.3% yield) as a tan solid. LC retention time 0.84 min [M]. MS (ES+) m/z: 315 (MH$^+$).

Example 51

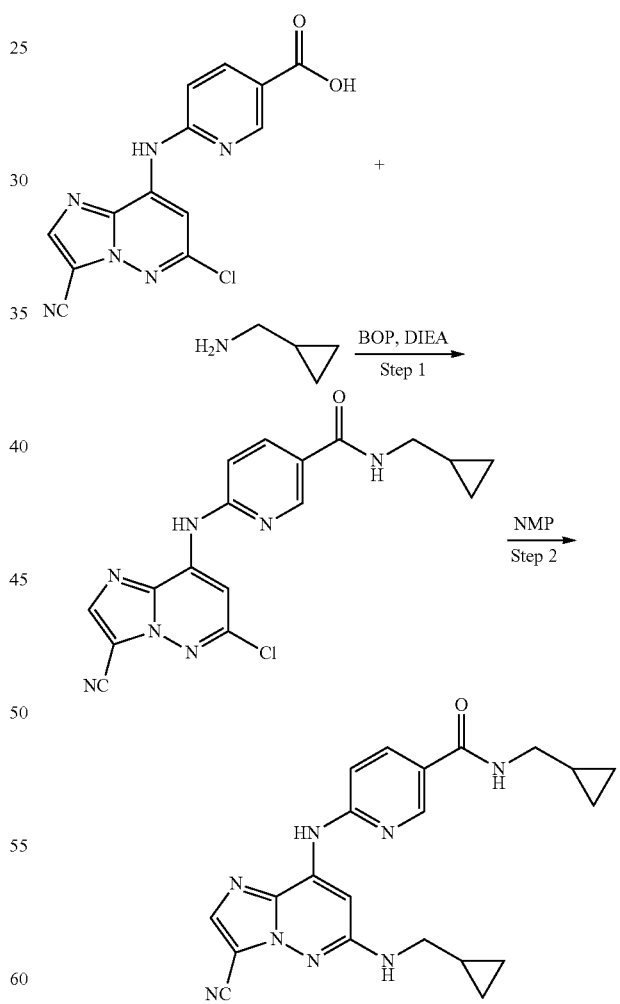

Step 1
The mixture of 6-(6-chloro-3-CNimidazo[1,2-b]pyridazin-8-ylamino)nicotinic acid (200 mg, 0.636 mmol), cyclopropylmethanamine (67.8 mg, 0.953 mmol), BOP (337 mg, 0.763 mmol), DIEA (0.222 mL, 1.271 mmol) and DMF (5 mL) were stirred at room temperature overnight. The mixture was diluted with ethyl acetate (40 mL), washed with saturated NaHCO₃ (2×) dried over Na₂SO₄ and concentrated under vacuum. The residue was used as recovered. LC retention time 1.90 min [J]. MS (ES+) m/z: 368 (MH⁺).

Step 2

The mixture of 6-(6-chloro-3-CNimidazo[1,2-b]pyridazin-8-ylamino)-N-(cyclopropylmethyl)nicotinamide (50 mg, 0.136 mmol), cyclopropylmethanamine (14.50 mg, 0.204 mmol) and NMP (0.3 mL) was stirred at 150° C. for overnight. The mixture was filtered and purified with preparative HPLC. The product was collected and dried (25 mg, 0.036 mmol, 26.3% yield). LC retention time 2.00 min [J]. MS (ES+) m/z: 403 (MH⁺).

¹H NMR (400 MHz, methanol-d₄):

δ 8.86-8.81 (m, 1H), 8.12 (dd, J=8.8, 2.4 Hz, 1H), 8.10 (s, 1H), 7.94 (s, 1H), 7.18 (dd, J=8.8, 0.7 Hz, 1H), 3.26 (d, J=6.8 Hz, 2H), 3.21 (d, J=7.0 Hz, 2H), 1.23-1.06 (m, 2H), 0.61-0.50 (m, 4H), 0.31 (quin, J=5.1 Hz, 4H)

Table 5 discloses compounds of the invention prepared in a manner similar to Example 51

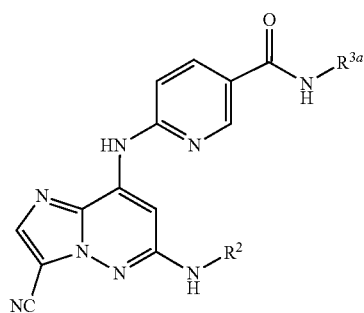

TABLE 5

| Ex. No. | R³ᵃ | R² | Rt (min) [Method] | m/z [M + H]⁺ |
|---|---|---|---|---|
| 52 | | | 3.64 [I] | 405 |

Example 53

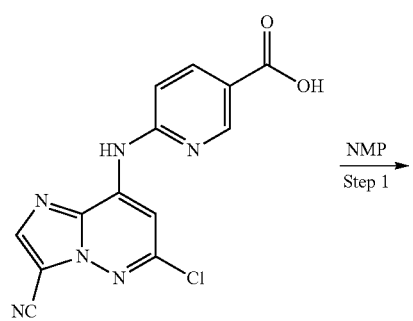

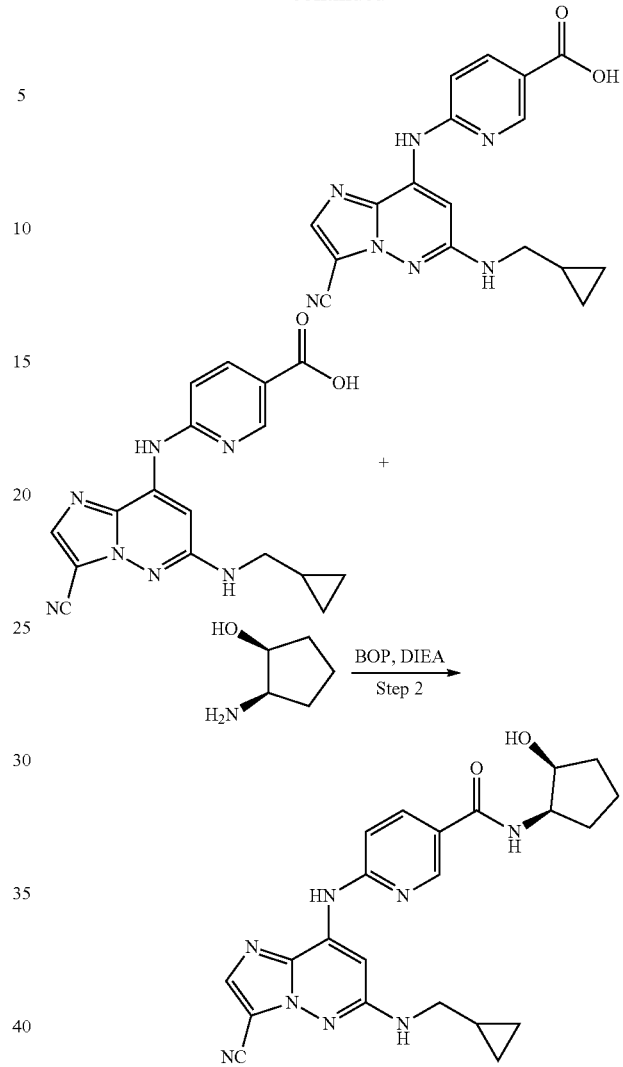

Step 1

The mixture of 6-(6-chloro-3-CNimidazo[1,2-b]pyridazin-8-ylamino)nicotinic acid (300 mg, 0.953 mmol) and cyclopropylmethanamine (237 mg, 3.34 mmol) in NMP (1 mL) was stirred at 110° C. for overnight. After cooling, the mixture was diluted with DMF (5 mL) and water (5 mL), the solid formed was collected and washed with water (2×), dried and used to next step without further purification. LC retention time 2.00 min [J]. MS (ES+) m/z: 350 (MH⁺).

Step 2

The mixture of 6-(3-CN-6-(cyclopropylmethylamino)imidazo[1,2-b]pyridazin-8-ylamino)nicotinic acid (35 mg, 0.100 mmol), (1S,2R)-2-aminocyclopentanol, HCl (20.68 mg, 0.150 mmol), BOP (53.2 mg, 0.120 mmol), DIEA (0.052 mL, 0.301 mmol) and DMF (2 mL) was stirred at room temperature for 2 hours. The mixture was diluted with water and extracted with ethyl acetate, the combined organic layers were washed with brine, dried over sodium sulfate, filtered and concentrated. The crude material was purified via preparative LC-MS. Fractions containing the desired product were combined and dried via centrifugal evaporation. The yield of the product was 9.4 mg (0.017 mmol, 17.200 yield), and its purity was 99%. LC retention time 3.46 min [I]. MS (ES+) m/z: 433 (MH⁺).

¹H NMR (500 MHz, methanol-d₄):

δ 8.81 (d, J=2.0 Hz, 1H), 8.11 (dd, J=8.9, 2.5 Hz, 1H), 8.04 (s, 1H), 7.91 (s, 1H), 7.11 (d, J=8.4 Hz, 1H), 4.27-4.15 (m, 2H), 3.20 (d, J=6.9 Hz, 2H), 2.12-2.02 (m, 1H), 2.00-1.83 (m, 2H), 1.79-1.68 (m, 2H), 1.66-1.58 (m, 1H), 1.19-1.08 (m, 1H), 0.57-0.51 (m, 2H), 0.32-0.25 (m, 2H)

NMR Data for Compounds in the Tables:

Example 2

¹H NMR (400 MHz, chloroform-d) δ 7.99 (s, 1H), 7.78 (s, 1H), 7.70 (s, 1H), 7.38 (d, J=7.9 Hz, 1H), 6.20 (d, J=7.9 Hz, 1H), 3.59 (t, J=6.8 Hz, 4H), 3.46 (td, J=9.8, 4.2 Hz, 4H), 3.27 (br. s., 2H), 2.04-1.83 (m, 11H), 1.43-1.20 (m, 5H)

Example 3

¹H NMR (400 MHz, chloroform-d) δ 7.94 (s, 1H), 7.88 (s, 1H), 7.55 (d, J=8.3 Hz, 1H), 6.57 (d, J=8.3 Hz, 1H), 3.60-3.49 (m, 4H), 3.34 (t, J=6.6 Hz, 2H), 3.08 (s, 6H), 2.28-2.10 (m, 2H), 2.08-1.88 (m, 4H), 1.86-1.70 (m, 2H), 1.53-1.15 (m, 4H)

Example 3

¹H NMR (400 MHz, METHANOL-D₃) δ 7.95 (s, 1H), 7.75 (d, J=7.9 Hz, 1H), 7.48 (s, 1H), 6.90 (d, J=7.9 Hz, 1H), 5.03 (q, J=8.8 Hz, 2H), 3.81-3.71 (m, 1H), 3.59 (t, J=7.0 Hz, 2H), 3.56-3.48 (m, 1H), 3.39 (t, J=6.4 Hz, 2H), 2.24 (d, J=13.2 Hz, 1H), 2.07 (d, J=11.4 Hz, 1H), 1.96 (dq, J=19.6, 6.5 Hz, 4H), 1.83-1.70 (m, 2H), 1.50-1.33 (m, 3H), 1.32-1.25 (m, 1H)

Example 4

¹H NMR (500 MHz, methanol-d₄) δ 7.95 (s, 1H), 7.64 (d, J=8.0 Hz, 1H), 7.26 (s, 1H), 6.84 (d, J=8.0 Hz, 1H), 3.73-3.66 (m, 1H), 3.57 (t, J=6.9 Hz, 2H), 3.51 (td, J=9.8, 4.3 Hz, 1H), 3.40 (t, J=6.1 Hz, 2H), 2.33-2.26 (m, 1H), 2.03 (br. s., 1H), 2.01-1.97 (m, 2H), 1.95-1.91 (m, 2H), 1.81-1.72 (m, 2H), 1.67-1.57 (m, 10H), 1.38 (d, J=9.4 Hz, 2H), 1.30-1.24 (m, 1H)

Example 5

¹H NMR (500 MHz, methanol-d₄) δ 7.95 (s, 1H), 7.64 (d, J=8.0 Hz, 1H), 7.26 (s, 1H), 6.84 (d, J=8.0 Hz, 1H), 3.74-3.65 (m, 1H), 3.57 (t, J=6.9 Hz, 2H), 3.51 (td, J=9.8, 4.3 Hz, 1H), 3.40 (t, J=6.1 Hz, 2H), 2.36-2.23 (m, 1H), 2.04-1.97 (m, 3H), 1.95-1.91 (m, 2H), 1.83-1.71 (m, 3H), 1.62 (s, 9H), 1.41-1.34 (m, 2H), 1.30-1.25 (m, 1H)

Example 6

¹H NMR (500 MHz, methanol-d₄) δ 7.82 (s, 1H), 7.68 (d, J=7.8 Hz, 1H), 7.62 (s, 1H), 7.60-7.55 (m, 1H), 6.64 (d, J=7.5 Hz, 1H), 4.03 (qd, J=7.7, 2.5 Hz, 2H), 3.67-3.53 (m, 3H), 3.46 (td, J=9.9, 4.3 Hz, 1H), 2.27-2.18 (m, 1H), 2.10-2.03 (m, 1H), 1.80-1.68 (m, 2H), 1.48-1.19 (m, 13H)

Example 7

¹H NMR (400 MHz, methanol-d₄) δ 7.87 (s, 1H), 7.83 (s, 1H), 7.76-7.72 (m, 1H), 7.69-7.63 (m, 1H), 6.79 (dd, J=7.9, 0.7 Hz, 1H), 3.72-3.64 (m, 1H), 3.47 (td, J=10.0, 4.3 Hz, 1H), 2.31-2.22 (m, 1H), 2.06 (d, J=12.5 Hz, 1H), 1.83-1.67 (m, 2H), 1.38-1.16 (m, 13H)

Example 8

NA

Example 9

NA

Example 10

¹H NMR (400 MHz, methanol-d₄) δ 8.14 (s, 1H), 7.97-7.89 (m, 2H), 7.84 (s, 1H), 7.71 (t, J=8.0 Hz, 1H), 7.60-7.50 (m, 4H), 6.82 (d, J=8.0 Hz, 1H), 3.67 (td, J=10.2, 3.9 Hz, 1H), 3.42 (td, J=9.9, 4.1 Hz, 1H), 2.25 (d, J=12.5 Hz, 1H), 2.01 (d, J=10.0 Hz, 1H), 1.79-1.62 (m, 2H), 1.37-1.23 (m, 4H)

Example 11

¹H NMR (400 MHz, DMSO-d₆) δ 8.39 (d, J=2.0 Hz, 1H), 8.13 (s, 1H), 7.99 (s, 1H), 7.48 (d, J=8.6 Hz, 1H), 6.98 (d, J=7.5 Hz, 1H), 3.53 (d, J=6.8 Hz, 1H), 3.48 (t, J=6.3 Hz, 2H), 3.42-3.39 (m, 1H), 2.09 (d, J=11.9 Hz, 1H), 1.92 (d, J=10.3 Hz, 1H), 1.86-1.73 (m, 4H), 1.66 (br. s., 2H), 1.49 (br. s., 6H), 1.34-1.18 (m, 4H)

Example 12

¹H NMR (500 MHz, methanol-d₄) δ 7.95 (s, 1H), 7.64 (d, J=8.0 Hz, 1H), 7.26 (s, 1H), 6.84 (d, J=8.0 Hz, 1H), 3.73-3.65 (m, 1H), 3.57 (t, J=6.8 Hz, 2H), 3.51 (td, J=9.8, 4.3 Hz, 1H), 3.40 (t, J=6.2 Hz, 2H), 2.32-2.25 (m, 1H), 2.10-1.88 (m, 7H), 1.82-1.70 (m, 2H), 1.62 (s, 9H), 1.38 (d, J=9.2 Hz, 1H), 1.30-1.22 (m, 1H)

Example 13

¹H NMR (400 MHz, methanol-d₄) δ 7.93 (s, 1H), 7.71 (d, J=8.1 Hz, 1H), 7.51 (s, 1H), 6.86 (d, J=8.1 Hz, 1H), 6.43-6.09 (m, 1H), 4.74 (td, J=14.6, 3.2 Hz, 2H), 3.79-3.69 (m, 1H), 3.59 (t, J=6.9 Hz, 2H), 3.56-3.49 (m, 1H), 3.40 (t, J=6.5 Hz, 2H), 2.29-2.20 (m, 1H), 2.06 (d, J=12.3 Hz, 1H), 2.02-1.90 (m, 5H), 1.82-1.72 (m, 2H), 1.44-1.36 (m, 2H), 1.29 (br. s., 1H)

Example 14

¹H NMR (400 MHz, methanol-d₄) δ 7.83 (s, 1H), 7.79 (s, 1H), 7.56 (s, 1H), 7.42 (d, J=8.1 Hz, 1H), 6.33 (d, J=8.1 Hz, 1H), 4.18 (s, 1H), 3.64-3.40 (m, 8H), 2.23 (d, J=13.0 Hz, 1H), 2.13-1.85 (m, 9H), 1.83-1.67 (m, 2H), 1.49-1.16 (m, 4H)

Example 15

¹H NMR (500 MHz, DMSO-d₆) δ 8.12 (s, 1H), 7.74 (s, 1H), 7.44 (d, J=8.0 Hz, 1H), 6.81 (d, J=8.0 Hz, 1H), 4.36-4.25 (m, 2H), 4.14-4.04 (m, 2H), 3.50 (br. s., 1H), 3.46-3.41 (m, 3H), 3.29-3.25 (m, 3H), 2.05 (br. s., 1H), 1.96-1.79 (m, 6H), 1.66 (br. s., 2H), 1.23 (br. s., 3H)

Example 16

¹H NMR (400 MHz, methanol-d₄) δ 8.42 (s, 1H), 8.02 (s, 1H), 7.84 (s, 1H), 7.79-7.72 (m, 1H), 7.06 (d, J=8.6 Hz, 1H), 3.75-3.64 (m, 1H), 3.59-3.42 (m, 3H), 2.25 (d, J=13.2 Hz, 1H), 2.04 (d, J=11.4 Hz, 1H), 1.95-1.82 (m, 4H), 1.80-1.68 (m, 2H), 1.57 (s, 6H), 1.43-1.23 (m, 4H)

Example 17

NA

Example 18

¹H NMR (400 MHz, methanol-d₄) δ 8.29 (d, J=9.0 Hz, 1H), 8.00 (s, 1H), 7.51-7.38 (m, 4H), 7.28 (dd, J=7.5, 1.3 Hz, 1H), 4.16 (s, 3H), 2.31 (br. s., 2H), 2.16-2.08 (m, 6H), 1.77-1.58 (m, 6H)

Example 19

¹H NMR (400 MHz, methanol-d₄) δ 8.81 (s, 1H), 8.46 (dd, J=9.2, 1.8 Hz, 1H), 8.02 (s, 1H), 7.88 (s, 1H), 7.61 (d, J=9.2 Hz, 1H), 2.63 (s, 4H), 2.40 (d, J=2.9 Hz, 1H), 2.15 (s, 3H), 2.08 (br. s., 2H), 1.84-1.78 (m, 1H), 1.64 (br. s., 2H)

Example 20

NA

Example 21

¹H NMR (400 MHz, methanol-d₄) δ 8.25 (s, 1H), 7.95 (s, 1H), 7.48 (d, J=8.8 Hz, 1H), 6.93 (d, J=8.8 Hz, 1H), 3.92 (s, 3H), 2.38 (br. s., 1H), 2.13-2.06 (m, 5H), 1.72-1.62 (m, 6H), 1.37 (s, 10H)

Example 22

NA

Example 23

¹H NMR (500 MHz, methanol-d₄) δ 8.53 (d, J=2.2 Hz, 1H), 8.02 (s, 1H), 7.56 (s, 2H), 7.08 (d, J=8.6 Hz, 1H), 4.05-3.93 (m, 3H), 3.66-3.53 (m, 6H), 2.10 (d, J=10.3 Hz, 2H), 2.04-1.91 (m, 4H), 1.64-1.51 (m, 2H)

Example 24

¹H NMR (400 MHz, methanol-d₄) δ 7.87 (s, 1H), 7.59-7.58 (m, 1H), 7.16 (s, 1H), 6.78 (d, J=8.1 Hz, 1H), 4.04-3.95 (m, 3H), 3.62-3.52 (m, 4H), 3.37 (t, J=6.4 Hz, 2H), 2.10 (d, J=10.3 Hz, 2H), 2.03-1.86 (m, 5H), 1.59 (s, 10H)

Example 25

¹H NMR (500 MHz, methanol-d₄) δ 7.98 (s, 1H), 7.84 (s, 1H), 7.79-7.73 (m, 1H), 7.71-7.65 (m, 1H), 6.83-6.77 (m, 1H), 4.04-3.95 (m, 3H), 3.59 (td, J=11.6, 2.1 Hz, 2H), 2.17-2.07 (m, 2H), 1.66-1.54 (m, 2H), 1.51 (s, 6H)

Example 26

¹H NMR (400 MHz, methanol-d₄) δ 7.93 (s, 1H), 7.88 (s, 1H), 7.73-7.68 (m, 2H), 6.87 (dd, J=5.3, 3.3 Hz, 1H), 3.24 (d, J=7.0 Hz, 2H), 1.37 (s, 9H), 1.22-1.14 (m, 1H), 0.61-0.52 (m, 2H), 0.37-0.29 (m, 2H)

Example 27

¹H NMR (400 MHz, methanol-d₄) δ 8.20 (s, 1H), 7.92 (s, 1H), 7.71-7.67 (m, 2H), 6.86-6.81 (m, 1H), 3.25 (d, J=7.0 Hz, 2H), 1.94-1.84 (m, 1H), 1.24-1.14 (m, 1H), 1.06-1.00 (m, 2H), 0.97-0.90 (m, 2H), 0.64-0.55 (m, 2H), 0.39-0.30 (m, 2H)

Example 28

¹H NMR (500 MHz, methanol-d₄) δ 8.23 (s, 1H), 7.97 (s, 1H), 7.66-7.61 (m, 1H), 7.60-7.55 (m, 1H), 6.78 (d, J=7.9 Hz, 1H), 3.25 (s, 2H), 1.89-1.82 (m, 1H), 1.04 (dd, J=4.5, 3.0 Hz, 2H), 1.01 (s, 9H), 0.92-0.88 (m, 2H)

Example 31

NA

Example 32

¹H NMR (500 MHz, methanol-d₄) δ 7.89 (d, J=8.0 Hz, 1H), 7.84 (s, 1H), 7.78 (s, 1H), 6.57 (d, J=8.0 Hz, 1H), 3.67-3.60 (m, 1H), 3.57 (s, 4H), 3.48 (td, J=9.9, 4.3 Hz, 1H), 3.39 (s, 3H), 3.00 (s, 6H), 2.29-2.20 (m, 1H), 2.10-2.02 (m, 1H), 1.81-1.69 (m, 2H), 1.43-1.31 (m, 3H), 1.29-1.21 (m, 1H)

Example 33

¹H NMR (400 MHz, methanol-d₄) δ 7.85 (s, 1H), 7.72 (d, J=7.9 Hz, 1H), 7.56 (s, 1H), 6.80 (d, J=8.1 Hz, 1H), 6.34-5.99 (m, 1H), 4.99 (br. s., 1H), 4.80-4.66 (m, 2H), 3.77-3.56 (m, 2H), 3.52-3.37 (m, 2H), 2.64 (s, 1H), 2.30-2.00 (m, 5H), 1.80-1.65 (m, 2H), 1.44-1.24 (m, 4H)

Example 34

¹H NMR (400 MHz, methanol-d₄) δ 7.88 (d, J=2.4 Hz, 1H), 7.67-7.62 (m, 1H), 7.51 (d, J=0.7 Hz, 1H), 6.82 (dd, J=10.3, 8.1 Hz, 1H), 6.42-6.00 (m, 1H), 4.86-4.74 (m, 1H), 4.68-4.60 (m, 2H), 3.97 (s, 1H), 3.77-3.66 (m, 1H), 3.53-3.44 (m, 2H), 3.26-3.16 (m, 1H), 2.65 (s, 1H), 2.25 (d, J=12.8 Hz, 1H), 2.10-2.01 (m, 1H), 1.83-1.63 (m, 6H), 1.53-1.26 (m, 6H)

Example 35

¹H NMR (500 MHz, methanol-d₄) δ 8.37 (d, J=8.3 Hz, 1H), 7.85 (s, 1H), 7.48 (s, 1H), 6.85 (d, J=8.3 Hz, 1H), 6.45-6.18 (m, 1H), 4.91-4.72 (m, 2H), 4.08 (qd, J=6.8, 4.2 Hz, 1H), 3.95-3.89 (m, 1H), 3.82-3.75 (m, 1H), 3.73-3.59 (m, 2H), 3.51-3.43 (m, 2H), 2.29-2.21 (m, 1H), 2.11-1.99 (m, 2H), 1.98-1.87 (m, 2H), 1.83-1.69 (m, 2H), 1.68-1.59 (m, 1H), 1.42-1.32 (m, 3H), 1.27-1.20 (m, 1H)

Example 36

NA

Example 44

NA

Example 45

¹H NMR (500 MHz, methanol-d₄) δ 8.37 (d, J=8.3 Hz, 1H), 7.86 (s, 1H), 7.43 (s, 1H), 6.85 (d, J=8.6 Hz, 1H), 6.43-6.16 (m, 1H), 4.92-4.67 (m, 2H), 4.11-4.06 (m, 1H), 4.00 (td, J=7.7, 3.7 Hz, 3H), 3.96-3.89 (m, 1H), 3.83-3.75

(m, 1H), 3.66-3.54 (m, 3H), 3.45 (dd, J=13.7, 6.8 Hz, 1H), 2.11 (d, J=12.5 Hz, 2H), 2.07-2.00 (m, 1H), 1.98-1.90 (m, 2H), 1.69-1.53 (m, 3H)

Example 46

$^1$H NMR (500 MHz, methanol-$d_4$) δ 7.86 (s, 1H), 7.68 (d, J=8.3 Hz, 1H), 7.43 (s, 1H), 6.78 (d, J=8.0 Hz, 1H), 6.34-6.02 (m, 1H), 4.68 (td, J=14.0, 3.9 Hz, 3H), 4.06-3.94 (m, 3H), 3.91-3.86 (m, 1H), 3.57 (td, J=11.6, 2.1 Hz, 2H), 2.11 (d, J=11.1 Hz, 2H), 1.95-1.78 (m, 4H), 1.63-1.45 (m, 6H)

Example 47

$^1$H NMR (500 MHz, methanol-$d_4$) δ 7.86 (s, 1H), 7.73 (d, J=8.0 Hz, 1H), 7.44 (s, 1H), 6.80 (d, J=8.0 Hz, 1H), 6.36-6.06 (m, 1H), 4.86 (dd, J=7.8, 4.4 Hz, 1H), 4.76-4.65 (m, 2H), 4.06-3.95 (m, 3H), 3.57 (td, J=11.6, 2.1 Hz, 3H), 3.51-3.43 (m, 1H), 2.44-2.28 (m, 2H), 2.24-1.98 (m, 4H), 1.68-1.49 (m, 2H)

Example 48

NA

Example 49

$^1$H NMR (400 MHz, methanol-$d_4$) δ 7.87 (s, 1H), 7.72 (d, J=8.1 Hz, 1H), 7.45 (s, 1H), 6.80 (d, J=8.1 Hz, 1H), 6.35-5.99 (m, 1H), 4.99 (br. s., 1H), 4.81-4.67 (m, 2H), 4.08-3.94 (m, 3H), 3.66-3.52 (m, 3H), 3.42 (br. s., 1H), 2.17-2.06 (m, 4H), 1.92 (br. s., 1H), 1.65-1.52 (m, 2H), 1.25 (br. s., 1H)

Example 38

Example 50

Example 52

$^1$H NMR (400 MHz, methanol-$d_4$) δ 8.74 (dd, J=2.5, 0.8 Hz, 1H), 8.08 (s, 1H), 8.05 (dd, J=8.7, 2.5 Hz, 1H), 7.93 (s, 1H), 7.14 (dd, J=8.7, 0.8 Hz, 1H), 3.21 (d, J=7.0 Hz, 2H), 1.47 (s, 9H), 1.22-1.11 (m, 1H), 0.60-0.52 (m, 2H), 0.35-0.27 (m, 2H)

Example 54

$^1$H NMR (400 MHz, DMSO-$d_6$) δ 8.13 (s, 1H), 7.59 (t, J=8.2 Hz, 1H), 7.47 (s, 1H), 6.83 (d, J=8.0 Hz, 1H), 6.55 (d, J=8.3 Hz, 1H), 3.62-3.43 (m, 4H), 3.24-3.06 (m, 5H), 2.06 (br. s., 1H), 1.93 (d, J=9.3 Hz, 1H), 1.65 (br. s., 2H), 1.37-1.11 (m, 12H)

Example 55

$^1$H NMR (400 MHz, DMSO-$d_6$) δ 8.13 (s, 1H), 7.58 (t, J=8.2 Hz, 1H), 7.46 (s, 1H), 6.82 (d, J=7.8 Hz, 1H), 6.54 (d, J=8.3 Hz, 1H), 4.62 (br. s., 1H), 4.33 (d, J=12.5 Hz, 2H), 3.77 (br. s., 2H), 3.58 (d, J=9.5 Hz, 2H), 3.46 (br. s., 1H), 3.17-3.06 (m, 3H), 2.07 (br. s., 1H), 1.92 (d, J=10.8 Hz, 1H), 1.65 (br. s., 2H), 1.34-1.13 (m, 7H)

Example 56

$^1$H NMR (400 MHz, DMSO-$d_6$) δ 8.14 (s, 1H), 7.81-7.73 (m, 1H), 7.61 (d, J=7.8 Hz, 1H), 7.57 (s, 1H), 7.29 (d, J=7.8 Hz, 1H), 4.29 (s, 2H), 4.15-3.95 (m, 4H), 3.57-3.46 (m, 1H), 3.45-3.38 (m, 1H), 2.07 (d, J=8.5 Hz, 1H), 1.92 (d, J=9.5 Hz, 1H), 1.65 (br. s., 2H), 1.40-1.10 (m, 5H)

Example 57

$^1$H NMR (400 MHz, DMSO-$d_6$) δ 8.53 (s, 1H), 7.95-7.83 (m, 2H), 7.50 (d, J=8.3 Hz, 1H), 7.02 (d, J=7.5 Hz, 1H), 3.44 (br. s., 2H), 2.06 (d, J=11.5 Hz, 1H), 1.93-1.77 (m, 2H), 1.75-1.58 (m, 3H), 1.43 (d, J=0.8 Hz, 3H), 1.37-1.18 (m, 4H), 0.97-0.87 (m, 3H)

Example 58

$^1$H NMR (400 MHz, DMSO-$d_6$) δ 8.15 (s, 1H), 7.96-7.82 (m, 2H), 7.50 (d, J=8.3 Hz, 1H), 7.05 (d, J=7.8 Hz, 1H), 3.45-3.34 (m, 2H), 2.12-1.98 (m, 2H), 1.88 (d, J=10.8 Hz, 1H), 1.81-1.55 (m, 10H), 1.41-1.13 (m, 5H)

Example 59

$^1$H NMR (400 MHz, DMSO-$d_6$) δ 8.14 (s, 1H), 7.71 (t, J=7.9 Hz, 1H), 7.55 (s, 1H), 7.22 (d, J=7.8 Hz, 1H), 7.17 (d, J=7.8 Hz, 1H), 4.19-3.89 (m, 2H), 3.49 (br. s., 1H), 3.45-3.39 (m, 1H), 2.80-2.65 (m, 2H), 2.08 (d, J=8.8 Hz, 1H), 1.91 (d, J=9.5 Hz, 1H), 1.75 (br. s., 6H), 1.65 (br. s., 2H), 1.41-1.16 (m, 4H)

Example 60

$^1$H NMR (400 MHz, DMSO-$d_6$) δ 8.12 (s, 1H), 7.56-7.49 (m, 2H), 6.75 (d, J=7.8 Hz, 1H), 6.46 (d, J=8.5 Hz, 1H), 3.64 (br. s., 4H), 3.53 (d, J=13.0 Hz, 4H), 3.43 (br. s., 2H), 2.98-2.85 (m, 1H), 2.03 (br. s., 1H), 1.91 (br. s., 1H), 1.65 (br. s., 2H), 1.24 (br. s., 4H), 1.03 (d, J=6.8 Hz, 6H)

Example 61

$^1$H NMR (400 MHz, DMSO-$d_6$) δ 8.71 (d, J=2.3 Hz, 1H), 8.16 (s, 1H), 7.97-7.87 (m, 1H), 7.84 (d, J=1.0 Hz, 1H), 7.71 (s, 1H), 7.53 (d, J=7.8 Hz, 1H), 7.42 (d, J=7.8 Hz, 1H), 6.65-6.58 (m, 1H), 3.52 (br. s., 2H), 2.07 (br. s., 1H), 1.94 (d, J=10.8 Hz, 1H), 1.66 (br. s., 2H), 1.33-1.20 (m, 4H)

Example 62

$^1$H NMR (400 MHz, DMSO-$d_6$) δ 8.13 (s, 1H), 7.58 (t, J=8.2 Hz, 1H), 7.46 (s, 1H), 6.77 (d, J=8.0 Hz, 1H), 6.55 (d, J=8.3 Hz, 1H), 3.57-3.35 (m, 6H), 3.14 (d, J=11.0 Hz, 4H), 2.87 (br. s., 3H), 2.07 (d, J=11.8 Hz, 1H), 1.91 (br. s., 1H), 1.65 (br. s., 2H), 1.24 (br. s., 4H)

Example 63

$^1$H NMR (400 MHz, DMSO-$d_6$) δ 8.12 (s, 1H), 7.53 (t, J=8.0 Hz, 1H), 7.48 (s, 1H), 6.77 (d, J=8.0 Hz, 1H), 6.50 (d, J=8.3 Hz, 1H), 3.68-3.61 (m, 4H), 3.44 (br. s., 2H), 3.28-3.22 (m, 4H), 2.91 (s, 3H), 2.10-1.99 (m, 1H), 1.91 (br. s., 1H), 1.65 (br. s., 2H), 1.32-1.24 (m, 4H)

Example 65

$^1$H NMR (400 MHz, DMSO-$d_6$) δ 8.12 (s, 1H), 7.56-7.47 (m, 2H), 6.76 (d, J=8.0 Hz, 1H), 6.44 (d, J=8.3 Hz, 1H), 3.80-3.71 (m, 4H), 3.52-3.42 (m, 5H), 2.09-1.87 (m, 2H), 1.65 (br. s., 2H), 1.23 (d, J=3.8 Hz, 5H)

BIOLOGICAL ASSAYS

Kit225 T Cell Assay

Kit225 T cells with a stably-integrated STAT-dependent luciferase reporter were plated in RPMI (Gibco) containing 10% heat-inactivated FBS (Gibco) and 100 U/mL PenStrep (Gibco). The cells were then stimulated with either 20 ng/mL human recombinant IL-23 or 200 U/mL human recombinant IFNα (PBL InterferonSource) for 5-6 hours. Luciferase expression was measured using the STEADY-GLO® Luciferase Assay System (Promega) according to the manufacturer's instructions. Inhibition data were calculated by comparison to no inhibitor control wells for 0% inhibition and non-stimulated control wells for 100% inhibition. Dose response curves were generated to determine the concentration required to inhibit 50% of cellular response ($IC_{50}$) as derived by non-linear regression analysis.

Kit225 T Cell Inhibition Data

| Example No. | IL-23 Kit225 Reporter ($IC_{50}$, μM) | IFNα Kit225 Reporter ($IC_{50}$, μM) |
|---|---|---|
| 1 | 0.24 | 0.83 |
| 2 | 0.28 | 0.69 |
| 3 | 0.14 | 0.19 |
| 4 | 0.46 | 0.52 |
| 5 | 1.13 | 1.30 |
| 6 | 0.58 | 0.45 |
| 7 | 0.61 | 0.81 |
| 8 | 0.49 | 0.28 |
| 9 | 0.22 | 0.39 |
| 10 | 0.15 | 0.27 |
| 11 | 0.56 | 0.36 |
| 12 | 2.73 | 0.38 |
| 13 | 0.45 | 0.64 |
| 14 | 0.66 | 0.49 |
| 15 | 0.65 | 0.82 |
| 16 | 0.09 | 0.13 |
| 17 | 0.42 | 0.49 |
| 18 | 0.19 | 0.46 |
| 19 | 0.59 | 0.81 |
| 20 | 0.44 | 0.15 |
| 21 | 0.43 | 0.76 |
| 22 | 0.36 | 0.85 |
| 23 | 0.47 | 0.34 |
| 24 | 0.70 | 0.60 |
| 25 | 0.34 | 0.45 |
| 26 | 0.90 | 0.20 |
| 27 | 0.31 | 0.16 |
| 28 | 0.26 | 0.46 |
| 29 | 0.14 | 0.38 |
| 30 | 0.39 | 0.73 |
| 31 | 0.65 | 0.87 |
| 32 | 0.67 | 0.76 |
| 33 | 0.67 | 0.85 |
| 34 | 0.43 | 0.58 |
| 35 | 0.63 | 0.61 |
| 36 | 0.50 | 0.76 |
| 37 | 0.47 | 0.55 |
| 38 | 0.89 | 0.76 |
| 39 | 0.56 | 0.79 |
| 40 | 0.26 | 0.39 |
| 41 | 0.11 | 0.32 |
| 42 | 0.71 | 0.64 |
| 43 | 0.16 | 0.45 |
| 44 | 0.24 | 0.86 |
| 45 | 0.74 | 0.26 |
| 46 | 0.06 | 0.36 |
| 47 | 0.34 | 0.16 |
| 48 | 0.74 | 0.34 |
| 49 | 0.16 | 0.22 |
| 50 | 1.10 | 0.76 |
| 51 | 0.15 | 0.16 |
| 52 | 0.14 | 0.08 |
| 53 | 0.24 | 0.14 |
| 54 | 0.63 | 0.88 |
| 55 | 0.53 | 0.62 |
| 56 | 0.43 | 0.38 |
| 57 | 0.92 | 0.75 |
| 58 | 0.55 | 0.81 |
| 59 | 0.66 | 0.93 |
| 60 | 0.35 | 0.37 |
| 61 | 0.94 | 0.45 |
| 62 | 0.29 | 0.20 |
| 63 | 0.11 | 0.55 |
| 64 | 0.35 | 0.50 |
| 65 | 0.55 | 0.11 |
| 66 | 0.71 | 0.34 |

What is claimed is:

1. A compound which is

6-{[(1R,2R)-2-hydroxycyclohexyl]amino}-8-{[6-(propan-2-yloxy)-5-(pyrrolidine-1-carbonyl)pyridin-2-yl]amino}imidazo[1,2-b]pyridazine-3-carbonitrile, 6-{[(1R,2R)-2-hydroxycyclohexyl]amino}-8-{[6-(pyrrolidin-1-yl)-5-(pyrrolidine-1-carbonyl)pyridin-2-yl]amino}imidazo[1,2-b]pyridazine-3-carbonitrile, 8-{[6-(dimethylamino)-5-(pyrrolidine-1-carbonyl)pyridin-2-yl]amino}-6-{[(1R,2R)-2-hydroxycyclohexyl]amino}imidazo[1,2-b]pyridazine-3-carbonitrile, 6-{[(1R,2R)-2-hydroxycyclohexyl]amino}-8-{[5-(pyrrolidine-1-carbonyl)-6-(2,2,2-trifluoroethoxy)pyridin-2-yl]amino}imidazo[1,2-b]pyridazine-3-carbonitrile, 8-{[6-(tert-butoxy)-5-(pyrrolidine-1-carbonyl)pyridin-2-yl]amino}-6-{[(1S,2S)-2-hydroxycyclohexyl]amino}imidazo[1,2-b]pyridazine-3-carbonitrile, 8-{[6-(3-tert-butyl-2-oxoimidazolidin-1-yl)pyridin-2-yl]amino}-6-{[(1R,2R)-2-hydroxycyclohexyl]amino}imidazo[1,2-b]pyridazine-3-carbonitrile, N-{6-[(3-cyano-6-{[(1R,2R)-2-hydroxycyclohexyl]amino}imidazo[1,2-b]pyridazin-8-yl)amino]pyridin-2-yl}-2,2-dimethylpropanamide, N-{6-[(3-cyano-6-{[(1R,2R)-2-hydroxycyclohexyl]amino}imidazo[1,2-b]pyridazin-8-yl)amino]pyridin-2-yl}-1-methylcyclopropane-1-carboxamide, N-{6-[(3-cyano-6-{[(1R,2R)-2-hydroxycyclohexyl]amino}imidazo[1,2-b]pyridazin-8-yl)amino]pyridin-2-yl}-2-hydroxy-2-methylpropanamide, N-{6-[(3-cyano-6-{[(1R,2R)-2-hydroxycyclohexyl]amino}imidazo[1,2-b]pyridazin-8-yl)amino]pyridin-2-yl}benzamide, 8-{[5-(2,2-dimethylpyrrolidine-1-carbonyl)pyridin-2-yl]amino}-6-{[(1S,2S)-2-hydroxycyclohexyl]amino}imidazo[1,2-b]pyridazine-3-carbonitrile, 8-{[6-(tert-butoxy)-5-(pyrrolidine-1-carbonyl)pyridin-2-yl]amino}-6-{[(1R,2R)-2-hydroxycyclohexyl]amino}imidazo[1,2-b]pyridazine-3-carbonitrile, 8-{[6-(2,2-difluoroethoxy)-5-(pyrrolidine-1-carbonyl)pyridin-2-yl]amino}-6-{[(1S,2S)-2-hydroxycyclohexyl]amino}imidazo[1,2-b]pyridazine-3-carbonitrile, 6-{[(1S,2S)-2-hydroxycyclohexyl]amino}-8-{[6-(pyrrolidin-1-yl)-5-(pyrrolidine-1-carbonyl)pyridin-2-yl]amino}imidazo[1,2-b]pyridazine-3-carbonitrile, 8-{[6-(3-fluoroazetidin-1-yl)-5-(pyrrolidine-1-carbonyl)pyridin-2-yl]amino}-6-{[(1S,2S)-2-hydroxycyclohexyl]amino}imidazo[1,2-b]pyridazine-3-carbonitrile, 8-{[5-(2,2-dimethylpyrrolidine-1-carbonyl)pyridin-2-yl]amino}-6-{[(1R,2R)-2-hydroxycyclohexyl]amino}imidazo[1,2-b]pyridazine-3-carbonitrile, N-tert-butyl-6-({3-cyano-6-[(3-hydroxyadamantan-1-yl)amino]imidazo[1,2-b]pyridazin-8-yl}amino)pyridine-2-carboxamide, 6-[(3-hydroxyadamantan-1-yl)amino]-8-[(8-methoxyquinolin-2-yl)amino]imidazo[1,2-b]pyridazine-3-carbonitrile, 8-{[5,7-bis(trifluoromethyl)-1,8-naphthyridin-2-yl]amino}-6-[(3,5-dihydroxyadamantan-1-yl)amino]imidazo[1,2-b]pyridazine-3-carbonitrile, 6-[(3,5-dihydroxyadamantan-1-yl)amino]-8-{[6-(trifluoromethyl)pyridin-2-yl]amino}imidazo[1,2-b]pyridazine-3-carbonitrile, N-6-({3-cyano-6-[(3,5-dihydroxyadamantan-1-yl)amino]imidazo[1,2-b]pyridazin-8-yl}amino)-3-methoxypyridin-2-yl]-2,2-dimethylpropanamide, 6-[(3-fluoro-5-hydroxyadamantan-1-yl)amino]-8-[(8-methoxyquinolin-2-yl)amino]imidazo[1,2-b]pyridazine-3-carbonitrile, 6-[(oxan-4-yl)amino]-8-{[5-(pyrrolidine-1-carbonyl)pyridin-2-yl]amino}imidazo[1,2-b]pyridazine-3-carbonitrile, 8-{[6-(tert-butoxy)-5-(pyrrolidine-1-carbonyl)pyridin-2-yl]amino}-6-[(oxan-4-yl)amino]imidazo[1,2-b]pyridazine-3-carbonitrile, N-[6-({3-cyano-6-[(oxan-4-yl)amino]imidazo[1,2-b]pyridazin-8-yl}amino)pyridin-2-yl]-2-hydroxy-2-methylpropanamide, N-[6-({3-cyano-6-[(cyclopropylmethyl)amino]imidazo[1,2-b]pyridazin-8-yl}amino)pyridin-2-yl]-2,2-dimethylpropanamide, N-[6-({3-cyano-6-[(cyclopropylmethyl)amino]imidazo[1,2-b]pyridazin-8-yl}amino)pyridin-2-yl]cyclopropanecarboxamide, N-[6-({3-cyano-6-[(2,2-dimethylpropyl)amino]imidazo[1,2-b]pyridazin-8-yl}amino)pyridin-2-yl]cyclopropanecarboxamide, 8-{[6-(ethylamino)-5-(pyrrolidine-1-carbonyl)pyridin-2-yl]amino}-6-{[(1S,2S)-2-hydroxycyclohexyl]amino}imidazo[1,2-b]pyridazine-3-carbonitrile, 8-{[6-(dimethylamino)-5-[4-(2-fluorophenyl)piperazine-1-carbonyl]pyridin-2-yl]amino}-6-{[(1R,2R)-2-hydroxycyclohexyl]amino}imidazo[1,2-b]pyridazine-3-carbonitrile, 6-[(3-cyano-6-{[(1R,2R)-2-hydroxycyclohexyl]amino}imidazo[1,2-b]pyridazin-8-yl)amino]-2-(dimethylamino)-N-methyl-N-[2-(pyridin-2-yl)ethyl]pyridine-3-carboxamide, 6-[(3-cyano-6-{[(1R,2R)-2-hydroxycyclohexyl]amino}imidazo[1,2-b]pyridazin-8-yl)amino]-2-(dimethylamino)-N-(2-methoxyethyl)pyridine-3-carboxamide, 8-{[6-(2,2-difluoroethoxy)-5-[2-(trifluoromethyl) pyrrolidine-1-carbonyl]pyridin-2-yl]amino}-6-{[(1R,2R)-2-hydroxycyclohexyl]amino}imidazo[1,2-b]pyridazine-3-carbonitrile, 8-({5-[(1R,4S)-2-azabicyclo[2.2.1]heptane-2-carbonyl]-6-(2,2-difluoroethoxy)pyridin-2-yl}amino)-6-{[(1R,2R)-2-hydroxycyclohexyl]amino}imidazo[1,2-b]pyridazine-3-carbonitrile, 6-[(3-cyano-6-{[(1R,2R)-2-hydroxycyclohexyl]amino}imidazo[1,2-b]pyridazin-8-yl)amino]-2-(2,2-difluoroethoxy)-N-[(oxolan-2-yl)methyl]pyridine-3-carboxamide, 8-{[6-(2,2-difluoroethoxy)-5-[(3R,5S)-3,5-dimethylmorpholine-4-carbonyl]pyridin-2-yl]amino}-6-{[(1S,2S)-2-hydroxycyclohexyl]amino}imidazo[1,2-b]pyridazine-3-carbonitrile, N-[(4-{6-[(3-cyano-6-{[(1R,2R)-2-hydroxycyclohexyl]amino}imidazo[1,2-b]pyridazin-8-yl)amino]pyridin-2-yl}phenyl)methyl]acetamide, N-[(4-{6-[(3-cyano-6-{[(1R,2R)-2-hydroxycyclohexyl]amino}imidazo[1,2-b]pyridazin-8-yl)amino]pyridin-2-yl}phenyl)methyl]methanesulfonamide, 6-{[(1R,2R)-2-hydroxycyclohexyl]amino}-8-({6-[4-(morpholine-4-sulfonyl)piperazin-1-yl]pyridin-2-yl}amino)imidazo[1,2-b]pyridazine-3-carbonitrile, 8-({6-[(3R,5S)-4-acetyl-3,5-dimethylpiperazin-1-yl]pyridin-2-yl}amino)-6-[(3-hydroxyadamantan-1-yl)amino]imidazo[1,2-b]pyridazine-3-carbonitrile, 6-({3-cyano-6-[(3-hydroxyadamantan-1-yl)amino]imidazo[1,2-b]pyridazin-8-yl}amino)-N-[(2R)-1,1,1-trifluoropropan-2-yl]pyridine-2-carboxamide, 3-{[6-({3-cyano-6-[(3-hydroxyadamantan-1-yl)amino]imidazo[1,2-b]pyridazin-8-yl}amino)pyridin-2-yl]formamido}-3-methylbutanamide, 6-[(oxan-4-yl)amino]-8-{[6-(propan-2-yloxy)-5-(pyrrolidine-1-carbonyl)pyridin-2-yl]amino}imidazo[1,2-b]pyridazine-3-carbonitrile, 6-({3-cyano-6-[(oxan-4-yl)amino]imidazo[1,2-b]pyridazin-8-yl}amino)-2-(2,2-difluoroethoxy)-N-methyl-N-(oxetan-3-yl)pyridine-3-carboxamide, 6-({3-cyano-6-[(oxan-4-yl)amino]imidazo[1,2-b]pyridazin-8-yl}amino)-2-(2,2-difluoroethoxy)-N-[(oxolan-2-yl)methyl]pyridine-3-carboxamide, 8-{[6-(2,2-difluoroethoxy)-5-[(1s,4s)-7-azabicyclo[2.2.1]heptane-7-carbonyl]pyridin-2-yl]amino}-6-[(oxan-4-yl)amino]imidazo[1,2-b]pyridazine-3-carbonitrile, (3R)-1-[6-({3-cyano-6-[(oxan-4-yl)amino]imidazo[1,2-b]pyridazin-8-yl}amino)-2-(2,2-difluoroethoxy)pyridine-3-carbonyl]pyrrolidine-3-carbonitrile, 8-{[6-(2,2-difluoroethoxy)-5-[3-(dimethylamino) pyrrolidine-1-carbonyl]pyridin-2-yl]amino}-6-[(oxan-4-yl)amino]imidazo[1,2-b]pyridazine-3-carbonitrile, 8-{[6-(2,2-difluoroethoxy)-5-[2-(trifluoromethyl) pyrrolidine-1-carbonyl]pyridin-2-yl]amino}-6-[(oxan-4-yl)amino]imidazo[1,2-b]pyridazine-3-carbonitrile, N-({4-[6-({3-cyano-6-[(oxan-4-yl)amino]imidazo[1,2-b]pyridazin-8-yl}amino)pyridin-2-yl]phenyl}methyl)acetamide, 6-({3-cyano-6-[(cyclopropylmethyl)amino]imidazo[1,2-b]pyridazin-8-yl}amino)-N-(cyclopropylmethyl)pyridine-3-carboxamide, N-tert-butyl-6-({3-cyano-6-[(cyclopropylmethyl)amino]imidazo[1,2-b]pyridazin-8-yl}amino)pyridine-3-carboxamide, 6-({3-cyano-6-[(cyclopropylmethyl)amino]imidazo[1,2-b]pyridazin-8-yl}amino)-N-[(1R,2S)-2-hydroxycyclopentyl]pyridine-3-carboxamide, 6-{[(1R,2R)-2-hydroxycyclohexyl]amino}-8-({6-[4-(propan-2-yl)piperazin-1-yl]pyridin-2-yl}amino)imidazo[1,2-b]pyridazine-3-carbonitrile, 6-{[(1R,2R)-2-hydroxycyclohexyl]amino}-8-({6-[4-(2-hydroxyethyl)piperazin-1-yl]pyridin-2-yl}amino)imidazo[1,2-b]pyridazine-3-carbonitrile, 6-{[(1R,2R)-2-hydroxycyclohexyl]amino}-8-{[6-(3-oxomorpholin-4-yl)pyridin-2-yl]amino}imidazo[1,2-b]pyridazine-3-carbonitrile, 8-{[6-(4-ethyl-4-methyl-2,5-dioxoimidazolidin-1-yl)pyridin-2-yl]amino}-6-{[(1R,2R)-2-hydroxycyclohexyl]amino}imidazo[1,2-b]pyridazine-3-carbonitrile, 8-[(6-{2,4-dioxo-1,3-diazaspiro [4.5]decan-3-yl}pyridin-2-yl)amino]-6-{[(1R,2R)-2-hydroxycyclohexyl]amino}imidazo[1,2-b]pyridazine-3-carbonitrile, 6-{[(1R,2R)-2-hydroxycyclohexyl]amino}-8-{[6-(2-oxoazepan-1-yl)pyridin-2-yl]amino}imidazo[1,2-b]pyridazine-3-carbonitrile, 6-{[(1R,2R)-2-hydroxycyclohexyl]amino}-8-({6-[4-(2-methylpropanoyl)piperazin-1-yl]pyridin-2-yl}amino)imidazo[1,2-b]pyridazine-3-carbonitrile, 6-{[(1R,2R)-2-hydroxycyclohexyl]amino}-8-{[6-(1H-pyrazol-1-yl)pyridin-2-yl]amino}imidazo[1,2-b]pyridazine-3-carbonitrile, 6-{[(1R,2R)-2-hydroxycyclohexyl]amino}-8-{[6-(4-methylpiperazin-1-yl)pyridin-2-yl]amino}imidazo[1,2-b]pyridazine-3-carbonitrile, 6-{[(1R,2R)-2-hydroxycyclohexyl]amino}-8-{[6-(4-methanesulfonylpiperazin-1-yl)pyridin-2-yl]amino}imidazo[1,2-b]pyridazine-3-carbonitrile, 8-{[6-(4-acetylpiperazin-1-yl)pyridin-2-yl]amino}-6-{[(1R,2R)-2-hydroxycyclohexyl]amino}imidazo[1,2-b]pyridazine-3-carbonitrile, 6-{[(1R,2R)-2-hydroxycyclohexyl]amino}-8-{[6-(morpholin-4-yl)pyridin-2-yl]amino}imidazo[1,2-b]pyridazine-3-carbonitrile, or 8-[(6-aminopyridin-2-yl)amino]-6-{[(1R,2R)-2-hydroxycyclohexyl]amino}imidazo[1,2-b]pyridazine-3-carbonitrile, or a pharmaceutically acceptable salt thereof.

2. A pharmaceutical composition comprising one or more compounds according to claim 1 and a pharmaceutically acceptable carrier or diluent.

3. A method of treating a disease, comprising administering a compound according to claim 1, wherein the disease is an inflammatory or autoimmune disease selected from multiple sclerosis, rheumatoid arthritis, ankylosing spondylitis, inflammatory bowel disease, systemic lupus erythematosus, psoriasis, psoriatic arthritis Crohn's syndrome, Sjögren's syndrome or scleroderma.

* * * * *